(12) United States Patent
Deng et al.

(10) Patent No.: US 12,508,589 B2
(45) Date of Patent: Dec. 30, 2025

(54) CHIP, MICROFLUIDIC DEVICE, AND METHOD FOR SORTING TARGET DROPLETS

(71) Applicants: Beijing BOE Technology Development Co., Ltd., Beijing (CN); BOE TECHNOLOGY GROUP CO., LTD., Beijing (CN)

(72) Inventors: Lin Deng, Beijing (CN); Fan Yang, Beijing (CN); Da Li, Beijing (CN); Xiangguo Ma, Beijing (CN); Ding Ding, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 785 days.

(21) Appl. No.: 17/731,746

(22) Filed: Apr. 28, 2022

(65) Prior Publication Data
US 2022/0339630 A1   Oct. 27, 2022

Related U.S. Application Data

(63) Continuation-in-part of application No. PCT/CN2021/090291, filed on Apr. 27, 2021.

(30) Foreign Application Priority Data

Jan. 29, 2022   (CN) .......................... 202210112214.2

(51) Int. Cl.
   *B01L 3/00*   (2006.01)
   *C12Q 1/24*   (2006.01)

(52) U.S. Cl.
   CPC ... *B01L 3/502715* (2013.01); *B01L 3/502761* (2013.01); *C12Q 1/24* (2013.01);
   (Continued)

(58) Field of Classification Search
   CPC ......... B01L 3/502715; B01L 3/502761; B01L 3/502753; B01L 2200/027;
   (Continued)

(56) References Cited

U.S. PATENT DOCUMENTS

2005/0100946 A1   5/2005   Lipshutz et al.
2007/0268489 A1*  11/2007  Schwabe ............ G01N 21/6428
                                                   356/337
(Continued)

FOREIGN PATENT DOCUMENTS

CN   101099082 A   1/2008
CN   102068409 A   5/2011
(Continued)

OTHER PUBLICATIONS

CN patent novelty search and analysis report with translation, Apr. 8, 2021, 26 pages.
(Continued)

*Primary Examiner* — Brian J. Sines
(74) *Attorney, Agent, or Firm* — Myers Bigel, P.A.

(57) ABSTRACT

The present disclosure provides a chip, a microfluidic device including the chip, and a method for sorting target droplets. The chip includes a first container for accommodating a first fluid, a second container for accommodating a second fluid, a delivery channel including a first flow channel communicating with the first container and a second flow channel communicating with the second container, the first flow channel and the second flow channel intersecting and communicating with each other at a junction, and at least one collector. A portion of the first flow channel includes the junction and is divided into two sections by the junction, in each section, the section thickens gradually along a first direction away from the junction. The second flow channel includes the junction and is divided into two sections by the (Continued)

junction, in each section, the section thickens gradually along a second direction away from the junction.

27 Claims, 17 Drawing Sheets

(52) U.S. Cl.
CPC ... *B01L 3/502753* (2013.01); *B01L 2200/027* (2013.01); *B01L 2200/0652* (2013.01); *B01L 2200/16* (2013.01); *B01L 2300/047* (2013.01); *B01L 2300/0681* (2013.01); *B01L 2300/165* (2013.01); *B01L 2400/00* (2013.01); *B01L 2400/0406* (2013.01)

(58) Field of Classification Search
CPC ......... B01L 2200/0652; B01L 2200/16; B01L 2300/047; B01L 2300/0681; B01L 2300/165; B01L 2400/00; B01L 2400/0406; B01L 2300/0645; B01L 2300/0816; B01L 2300/0864; B01L 2300/0867; B01L 3/502784; C12Q 1/24; G01N 15/147; G01N 15/149; G01N 2015/1006
See application file for complete search history.

(56) References Cited

U.S. PATENT DOCUMENTS

| | | | |
|---|---|---|---|
| 2009/0250347 A1* | 10/2009 | Powell | G01N 27/44717 204/549 |
| 2010/0181195 A1 | 7/2010 | Garcia | |
| 2012/0122084 A1* | 5/2012 | Wagner | B01L 3/502761 435/6.1 |
| 2012/0196288 A1 | 8/2012 | Beer | |
| 2014/0199720 A1 | 7/2014 | Qiu et al. | |
| 2019/0381506 A1* | 12/2019 | Foster | B01L 3/0265 |
| 2020/0141886 A1 | 5/2020 | Ros et al. | |
| 2020/0376488 A1* | 12/2020 | Wu | G01N 15/1484 |
| 2021/0096125 A1* | 4/2021 | Srinivasan | G01N 33/56966 |
| 2022/0339630 A1 | 10/2022 | Deng et al. | |

FOREIGN PATENT DOCUMENTS

| | | | |
|---|---|---|---|
| CN | 102242055 | A | 11/2011 |
| CN | 103865795 | A | 6/2014 |
| CN | 104549587 | A | 4/2015 |
| CN | 105944775 | A | 9/2016 |
| CN | 107008517 | A | 8/2017 |
| CN | 107429426 | A | 12/2017 |
| CN | 107999155 | A | 5/2018 |
| CN | 108485910 | A | 9/2018 |
| CN | 108949496 | A | 12/2018 |
| CN | 109603932 | A | 4/2019 |
| CN | 109735429 | A | 5/2019 |
| CN | 109913352 | A | 6/2019 |
| CN | 110093247 | A | 8/2019 |
| CN | 110302849 | A | 10/2019 |
| CN | 111266140 | A | 6/2020 |
| CN | 111378556 | A | 7/2020 |
| CN | 111500440 | A | 8/2020 |
| CN | 111676129 | A | 9/2020 |
| CN | 111718836 | A | 9/2020 |
| CN | 111889153 | A | 11/2020 |
| CN | 112275336 | A | 1/2021 |
| CN | 212388025 | U | 1/2021 |
| CN | 112354573 | A | 2/2021 |
| CN | 112538428 | A | 3/2021 |
| CN | 112553063 | A | 3/2021 |
| CN | 112657565 | A | 4/2021 |
| CN | 109946230 | B | 4/2022 |
| CN | 218281795 | U | 1/2023 |
| WO | 2009004533 | A1 | 1/2009 |
| WO | 2021023352 | A1 | 2/2021 |

OTHER PUBLICATIONS

First Office Action for corresponding CN application No. 202220244666.1 mailed Jul. 21, 2022, with translation, 5 pages.
Office Action for Chinese Patent Application No. 202180000922.0 mailed Mar. 27, 2024, with translation, 18 pages.
International Search Report and Written Opinion for PCT/CN2022/078956 mailed May 23, 2022, with translation of the ISR, 13 pages.
Chinese Office Action corresponding to Chinese Patent Application No. 202210112214.2 (Foreign Text, 18 Pages, English Translation Thereof, 20 Pages) (mailed Oct. 21, 2025),.
Examination Report under Section 18(3) for corresponding GB Application No. 2317811.4 (mailed Oct. 15, 2025),.

* cited by examiner

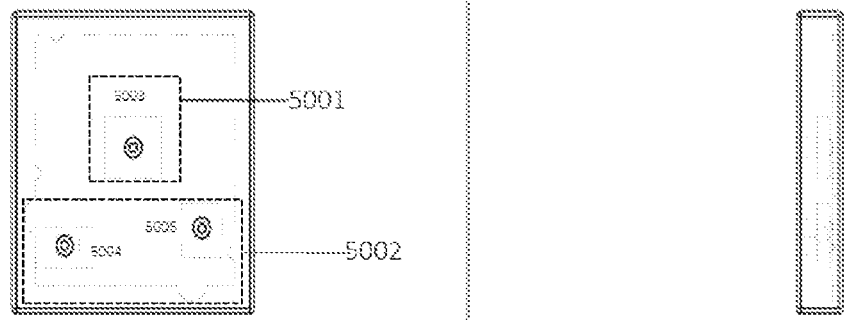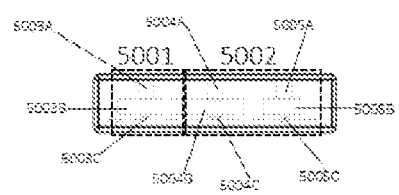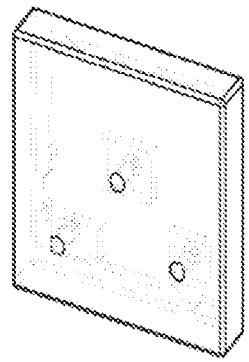
FIG. 16
FIG. 17

CHIP, MICROFLUIDIC DEVICE, AND METHOD FOR SORTING TARGET DROPLETS

RELATED APPLICATION

The present application is a continuation-in-part of PCT International Application No. PCT/CN2021/090291 filed on Apr. 27, 2021, the entire disclosure of which is incorporated herein by reference. In addition, the present application claims the benefit of and priority to CN Application No. 202210112214.2 filed on Jan. 29, 2022, the entire disclosure of which is incorporated herein by reference.

TECHNICAL FIELD

The present disclosure relates to the field of biomedical detection, and in particular to a chip, a microfluidic device comprising the chip and a method for sorting target droplets.

BACKGROUND

Cell is the basic structural and functional unit of organism. Because there is usually a high degree of heterogeneity among cells, the average data obtained by analyzing the cell population actually covers up the differences among individual cells, hence it can't express the random of gene expression and can't reflect the real situation. With the development of life science and precision medicine, cell population analysis is gradually developing to single cell analysis. A key technology of single cell analysis is how to separate a single cell from a highly heterogeneous biological sample comprising many cells. Single cell sorting technology provides a new choice for popular medical fields such as single cell analysis, early cancer diagnosis and accompanying diagnosis.

SUMMARY

According to an aspect of the present disclosure, a chip is provided, which comprises: a first container configured to accommodate a first fluid; a second container configured to accommodate a second fluid comprising a cell suspension; a delivery channel comprising a first flow channel and a second flow channel, the first flow channel communicating with the first container and the second flow channel communicating with the second container, the first flow channel and the second flow channel intersecting and communicating with each other at a junction, and the delivery channel being configured such that the first fluid and the second fluid meet at the junction and generate at least one droplet, each of at least a portion of the at least one droplet comprising a single cell from the cell suspension; and at least one collector configured to collect the at least one droplet. A portion of the first flow channel comprises the junction and is divided into a first section and a second section by the junction, in each of the first section and the second section, an area of a first cross-section of each section gradually increases along a first direction away from the junction, the first cross-section is perpendicular to the first direction. The second flow channel comprises the junction and is divided into a third section and a fourth section by the junction, in each of the third section and the fourth section, an area of a second cross-section of each section gradually increases along a second direction away from the junction, the second cross-section is perpendicular to the second direction.

In some embodiments, the portion of the first flow channel comprises a first sub-portion, a second sub-portion comprising the junction, and a third sub-portion, the first sub-portion belongs to the first section, the third sub-portion belongs to the second section, the second sub-portion spans the first section and the second section and is between the first sub-portion and the third sub-portion, and the areas of the first cross-section of the first sub-portion and the third sub-portion are both larger than the area of the first cross-section of the second sub-portion.

In some embodiments, a size of the first cross-section of the second sub-portion of the first flow channel at the junction is configured to allow the first fluid with a specific particle size to flow in the second sub-portion, the specific particle size of the first fluid is larger than the particle size of the single cell.

In some embodiments, the second flow channel comprises a first portion, a second portion and a third portion, the first portion and the second portion belong to the third section, and the third portion belongs to the fourth section. A first end of the first portion of the second flow channel communicates with the second container, a second end of the first portion of the second flow channel communicates with a first end of the second portion of the second flow channel, a second end of the second portion of the second flow channel communicates with a first end of the third portion of the second flow channel, both the second end of the second portion of the second flow channel and the first end of the third portion of the second flow channel are at the junction, and a second end of the third portion of the second flow channel communicates with the at least one collector. The areas of the second cross-section of the first portion and the third portion of the second flow channel are both larger than the area of the second cross-section of the second portion of the second flow channel.

In some embodiments, a size of the second cross-section of the second portion of the second flow channel is configured to allow the second fluid with a specific particle size to flow in the second portion of the second flow channel, the specific particle size of the second fluid is greater than 1 time of the particle size of the single cell and less than 2 times of the particle size of the single cell.

In some embodiments, the area of the second cross-section of the third portion of the second flow channel gradually increases in a direction from the first end to the second end of the third portion of the second flow channel.

In some embodiments, the area of the first cross-section of the second sub-portion of the first flow channel at the junction is greater than or equal to the areas of the second cross-section of the second portion and the third portion of the second flow channel at the junction.

In some embodiments, the second container comprises at least one sub-container.

In some embodiments, the second fluid comprises a first reagent and a second reagent, the first reagent comprises the cell suspension. The second container comprises a first sub-container and a second sub-container separated from each other, the first sub-container is configured to accommodate the first reagent, and the second sub-container is configured to accommodate the second reagent.

In some embodiments, the first portion of the second flow channel comprises a first branch and a second branch, the first branch communicates with the first sub-container, the second branch communicates with the second sub-container, and the first branch and the second branch intersect and communicate with each other at a first point. An angle between the first branch and the second branch at the first point is an acute angle.

In some embodiments, the at least one collector comprises a first collector configured to collect the at least one droplet via the delivery channel.

In some embodiments, the at least one collector comprises a second collector, the second collector comprises at least two sub-collectors configured to collect the at least one droplet via the delivery channel.

In some embodiments, the at least one collector comprises a first collector and a second collector, the second collector comprises at least two sub-collectors. The first collector communicates with the second collector, and the first collector is between the junction and the second collector.

In some embodiments, the chip further comprises an electrode structure between the junction and the second collector.

In some embodiments, the delivery channel further comprises a sorting channel between the junction and the second collector. The sorting channel comprises at least two branches, one of the at least two branches is configured to sort out non-target droplets from the at least one droplet, and the remaining branches of the at least two branches are configured to sort out target droplets from the at least one droplet. The at least two sub-collectors of the second collector correspond to the at least two branches of the sorting channel one by one, one of the at least two sub-collectors communicates with one of the at least two branches of the sorting channel and is configured to collect the non-target droplets, the remaining sub-collectors of the at least two sub-collectors respectively communicate with the remaining branches of the at least two branches of the sorting channel and are configured to collect the target droplets.

In some embodiments, the at least two branches of the sorting channel comprise a first branch and a second branch configured to sort out the target droplets from the at least one droplet, and a third branch configured to sort out the non-target droplets from the at least one droplet. The first branch, the second branch and the third branch intersect at a second point and the third branch is between the first branch and the second branch, both a first angle between the first branch and the third branch at the second point and a second angle between the second branch and the third branch at the second point are greater than 10°.

In some embodiments, a space between the first branch and the third branch of the sorting channel defines a first right triangle, and a space between the second branch and the third branch of the sorting channel defines a second right triangle, the first angle faces a first right-angled side of the first right triangle, and the second angle faces a second right-angled side of the second right triangle. The length of the first right-angled side of the first right triangle and the length of the second right-angled side of the second right triangle are both greater than or equal to the particle size of a single droplet.

In some embodiments, a surface of the inner wall of the delivery channel has hydrophobicity.

In some embodiments, the contours of both the first container and the second container comprise four chamfers.

In some embodiments, the shape of each chamfer comprises an arc shape.

In some embodiments, both the first container and the second container are provided with a filter structure, the filter structure comprises a plurality of microstructures, a gap between two adjacent microstructures of the plurality of microstructures is greater than 1 time of the particle size of the single cell and less than 2 times of the particle size of the single cell.

In some embodiments, the chip is a microfluidic chip.

According to another aspect of the present disclosure, a microfluidic device comprising the chip described in any of the foregoing embodiments is provided.

According to yet another aspect of the present disclosure, a method for sorting target droplets is provided, the method comprises: providing a first fluid and a second fluid comprising a cell suspension respectively to the first container and the second container of the chip described in any of the foregoing embodiments, such that the first fluid and the second fluid meet at the junction of the delivery channel and generate at least one droplet, each of at least a portion of the at least one droplet comprising a single cell from the cell suspension; and applying a voltage to the chip described in any of the foregoing embodiments to sort out target droplets with a target property from the at least one droplet, each of the target droplets comprising the single cell.

In some embodiments, the chip further comprises an electrode structure between the junction and the at least one collector. The step of applying a voltage to the chip described in any of the foregoing embodiments to sort out target droplets with a target property from the at least one droplet comprises: detecting an optical signal of the at least one droplet in real time with an optical device, in response to the optical device detecting a droplet with a target optical signal, applying an instantaneous voltage of 800-1000V to the electrode structure to sort out the target droplets with the target optical signal from the at least one droplet, each of the target droplets comprising the single cell.

In some embodiments, before the step of applying a voltage to the chip described in any of the foregoing embodiments, the method further comprises: transferring the at least one droplet in the chip to another reaction vessel for polymerase chain reaction or fluorescent staining.

In some embodiments, the first fluid is an oil phase, the second fluid is an aqueous phase, and the droplet has a water-in-oil structure.

BRIEF DESCRIPTION OF THE DRAWINGS

In order to more clearly describe the technical solutions in the embodiments of the present disclosure, the drawings needed in the embodiments will be briefly introduced below. Obviously, the drawings in the following description are only some embodiments of the present disclosure, and for those ordinary skill in the art, other drawings can be obtained according to these drawings without creative efforts.

FIG. 16 shows a schematic structural diagram of a box device according to yet another embodiment of the present disclosure;

FIG. 17 shows a block diagram of a microfluidic device according to an embodiment of the present disclosure;

DETAILED DESCRIPTION OF THE DISCLOSURE

Figure 1A:
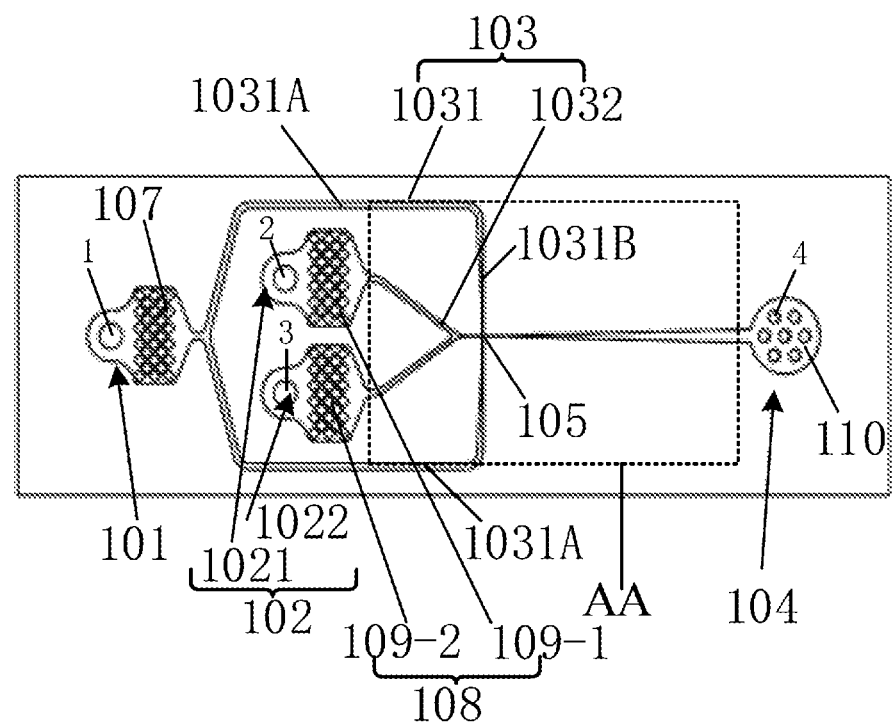
FIG. 1A schematically shows a front view of a chip according to an embodiment of the present disclosure.

The technical solutions in the embodiments of the present disclosure will be described clearly and completely in the following with reference to the drawings in the embodiments of the present disclosure. Obviously, the described embodiments are only a part, not all, of the embodiments of the present disclosure. Based on the embodiments in the present disclosure, all other embodiments obtained by those ordinary skill in the art without paying creative work are within the scope of protection of the present disclosure.

Before formally describing the technical solutions in the embodiments of the present disclosure, the following explanations and definitions are made for the terms used in the embodiments, so as to help those skilled in the art to understand the technical solutions in the embodiments of the present disclosure more clearly.

As used herein, the term "fluid" refers to all substances that can flow, and is a general term for liquids and gases. Fluid is a substance that can be continuously deformed under the action of tiny shearing force. Fluid can be composed of a single substance or a mixture of many different substances. Fluid can be a continuous phase (such as an oil phase), a dispersed phase (such as an aqueous phase), or a mixture of continuous and dispersed phases. Fluid has characteristics such as fluidity, compressibility and viscosity.

As used herein, the term "oil phase" means that substances that are not soluble in water belong to the oil phase according to the principle of similar compatibility. For example, when a substance is mixed with water, if the mixed liquid shows stratification or turbidity, the substance belongs to the oil phase. Oil may have a density higher or lower than that of water and/or a viscosity higher or lower than that of water. For example, liquid paraffin, silicone oil, vaseline, mineral oil and perfluorinated oil all belong to the oil phase.

As used herein, the term "aqueous phase" means that substances that are easily soluble in water belong to the aqueous phase according to the principle of similar compatibility. For example, when a substance is mixed with water, if the mixed liquid presents a transparent and uniform solution, the substance belongs to the aqueous phase. For example, water, glycerin, alcohol and acetone all belong to the aqueous phase.

As used herein, the term "cell suspension" refers to a cell solution obtained by separating cells from tissues by mechanical or chemical methods and diluted uniformly with cell culture solution. A large number of cells can be included in the cell suspension, such as hundreds, thousands, tens of thousands, millions, tens of millions or more cells. The cells in the cell suspension can be any type of cells, including but not limited to prokaryotic cells, eukaryotic cells, bacteria, fungi, plants, mammals or other animal cell types, mycoplasma, normal tissue cells, tumor cells or any other cell types, whether or not they are derived from single-cell or multicellular organisms. The cells in the cell suspension may include DNA, RNA, organelles, protein or any combination thereof.

As used herein, the term "A communicates with B" means that element A and element B are connected and communicated with each other, which allows fluid to flow between element A and element B, that is, fluid can flow from element A to element B or from element B to element A according to product design requirements. Element A and element B can communicate directly, that is, fluid can flow directly from element A to element B or from element B to element A without passing through other intermediate elements (such as pipes). Alternatively, element A and element B can communicate indirectly, that is, fluid can flow from element A to element B or from element B to element A via one or more intermediate elements (such as pipes).

As used herein, the term "polymerase chain reaction (PCR)" is a molecular biology technique for amplifying specific deoxyribonucleic acid (DNA) fragments. It can be regarded as a special DNA replication in vitro, which can replicate a large amount of trace DNA and greatly increase its quantity. The basic principle of PCR is that DNA can denature and unwind into a single strand at high temperature (for example, about 95° C.), and when the temperature drops to low temperature (for example, about 60° C.), the primer and the single strand combine according to the principle of base complementary pairing and then become a double strand. Therefore, the denaturation and renaturation of DNA can be controlled by temperature change, and a large number of DNA replication can be achieved by adding the designed primers. PCR reactions include but are not limited to digital PCR (dPCR), quantitative PCR and real-time PCR. DPCR technology can provide quantitative analysis technology of digitized DNA quantitative information, which can provide higher sensitivity and accuracy when combined with microfluidic technology.

As used herein, the term "microfluidic chip" refers to a chip with micro-scale microchannels, which can integrate basic operation units such as sample preparation, reaction, separation and detection involved in the fields of biology, chemistry and medicine into the micro-scale chip to automatically complete the whole process of reaction and analysis. The analysis and detection device based on microfluidic chip can have the following advantages: controllable liquid flow, less sample consumption, fast detection speed, simple operation, multi-functional integration, small volume and portability, etc.

As used herein, the term "particle size of XX" refers to the size of the substance XX, that is, the length of the substance XX in a certain direction. The substance XX can be a single cell or a single droplet. For example, when the shape of a cell or a droplet is spherical, the term "particle size of a single cell" refers to the diameter of a single cell, and "particle size of a single droplet" refers to the diameter of a single droplet. When the shape of a cell or a droplet is a rod, the term "particle size of a single cell" refers to the length of a single cell in the direction of the shorter side, and "particle size of a single droplet" refers to the length of a single droplet in the direction of the shorter side.

The inventor(s) of this application found that in the conventional technology, the methods for sorting single cells are mainly divided into two categories: one is to use fluorescence activated cell sorting (FACS) to automatically sort single cells, but the fluorescence activated cell sorting is expensive and costly to maintain; the other is to sort single cells manually by professional operators, but this manual sorting method not only depends on the skills and proficiency of operators, but also needs large and medium-sized instruments such as micro-pipetting platform and optical tweezers. In addition, the single cell sorting process is easily polluted by aerosols and microorganisms floating in the environment, which is usually difficult to remove in the subsequent detection. Therefore, the existing single cell sorting methods have some shortcomings such as high cost, high requirements for operators' skills, limited instruments required by the site, easy to be polluted by the environment and so on.

In view of this, the embodiments of the present disclosure provide a chip, a microfluidic device including the chip and a method for sorting target droplets. The chip can be used to prepare a droplet comprising a single cell derived from cell suspension, or to sort out target droplets from the prepared droplets, or to prepare a droplet comprising a single cell derived from cell suspension and sort out target droplets from the prepared droplets. The chip may be a microfluidic chip. With this chip, the preparation and/or sorting of a single cell can be realized, the automatic operation can be effectively improved, the use cost can be reduced, the cross-contamination can be eliminated, and the cell survival rate can be improved.

Figure 1B:
FIG. 1B schematically shows a side view of a chip according to an embodiment of the present disclosure.
Figure 1C:
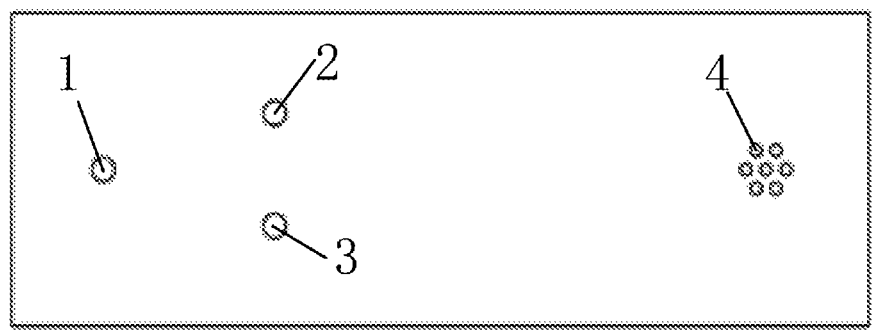
FIG. 1C schematically shows a rear view of a chip according to an embodiment of the present disclosure.
Figure 1D:
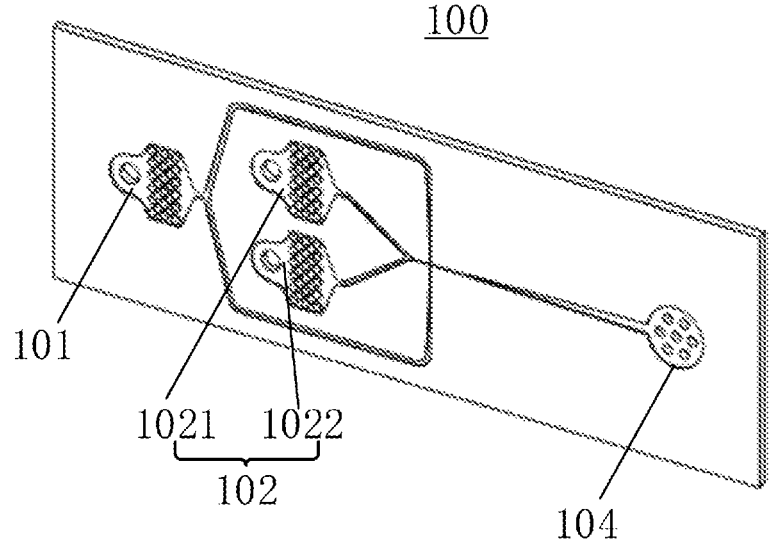
FIG. 1D schematically shows a trimetric view of a chip according to an embodiment of the present disclosure.

FIGS. 1A-1D show a chip 100 (hereinafter referred to as a first chip 100) according to some embodiments of the present disclosure, which can be used to prepare a droplet including a single cell. FIG. 1A is a front view of the first chip 100, FIG. 1B is a side view of the first chip 100, FIG. 1C is a rear view of the first chip 100, and FIG. 1D is a trimetric view of the first chip 100. As shown in FIGS. 1A-1D, the first chip 100 includes: a first container 101 configured to accommodate a first fluid 107; a second container 102 configured to accommodate a second fluid 108 including a cell suspension; a delivery channel 103 (hereinafter referred to as a first delivery channel 103) including a first flow channel 1031 and a second flow channel 1032, the first flow channel 1031 communicating with the first container 101 and the second flow channel 1032 communicating with the second container 102, the first flow channel 1031 and the second flow channel 1032 intersecting and communicating with each other at a junction 105, and the delivery channel 103 being configured such that the first fluid 107 and the second fluid 108 meet at the junction 105 and generate at least one droplet 110 (hereinafter referred to as a first droplet 110), each of at least a portion of the at least one droplet 110 comprising a single cell from the cell suspension; and at least one collector 104 (hereinafter referred to as a first collector 104) configured to collect at least one first droplet 110. A portion 1031B of the first flow channel 1031 comprises the junction 105 and is divided into a first section (for example, the section above the junction 105 of 1031B in FIG. 1A) and a second section (for example, the section below the junction 105 of 1031B in FIG. 1A) by the junction 105, in each of the first section and the second section, an area of a first cross-section of each section gradually increases along a first direction away from the junction 105, the first cross-section is perpendicular to the first direction. The second flow channel 1032 comprises the junction 105 and is divided into a third section (for example, the section of 1032 which is on the left side of the junction 105 in FIG. 1A) and a fourth section (for example, the section of 1032 which is on the right side of the junction 105 in FIG. 1A) by the junction 105, in each of the third section and the fourth section, an area of a second cross-section of each section gradually increases along a second direction away from the junction 105, the second cross-section is perpendicular to the second direction. That is, in the portion 1031B of the first flow channel 1031, the first flow channel 1031 gradually becomes thicker in the upward direction from the junction 105; the first flow channel 1031 also gradually becomes thicker in the downward direction from the junction 105. In the second flow channel 1032, the second flow channel 1032 gradually becomes thicker in the left direction from the junction 105; the second flow channel 1032 also gradually becomes thicker in the right direction from the junction 105.

According to the above description, the first cross-section refers to the cross-section of the portion 1031B of the first flow channel 1031 in a direction perpendicular to the flow direction of the first fluid 107; the second cross-section refers to the cross-section of the second flow channel 1032 in a direction perpendicular to the flow direction of the second fluid 108.

With the structural design of the first flow channel 1031 and the second flow channel 1032 of the first chip 100, the first chip 100 is favorable for generating the first droplet 110 containing a single cell. The first droplet 110 containing a single cell can be prepared by the first chip 100. Because of the high degree of integration of the first chip 100, the preparation of the first droplet 110 containing a single cell can be automatically completed without manual operation by operators, so the degree of automation of operation can be effectively improved. Since the first fluid 107 and the second fluid 108 completely flow in the first delivery channel 103 and are completely isolated from the external environment, it is possible to avoid being polluted by aerosols, microorganisms and the like floating in the environment. In addition, because the whole preparation process is mild, and the single cell separated from the cell suspension is wrapped and protected by droplets, the cell survival rate can be effectively improved.

In the first chip 100 shown in FIG. 1A, the first container 101 includes an inlet 1, to which an external device (such as a micro flow pump) is connected and through which the first fluid 107 is injected into the first container 101. The first fluid 107 is a continuous phase (e.g., oil phase) liquid, which can be any suitable fluid such as mineral oil, perfluorinated oil, etc. Optionally, the first fluid 107 may be mixed with a surfactant, which is favorable for stabilizing the obtained first droplets 110, for example, inhibiting the subsequent coalescence of the obtained droplets 110. When the first fluid 107 is perfluorinated oil, the surfactant may be perfluorinated surfactant. The second container 102 includes a first sub-container 1021 and a second sub-container 1022 which are separated from each other. The first sub-container 1021 includes an inlet 2, to which an external device (such as a micro flow pump) is connected and through which the cell suspension 109-1 is injected into the first sub-container 1021. The second sub-container 1022 includes an inlet 3, to which an external device (such as a micro flow pump) is connected and through which the biochemical reaction reagent 109-2 is injected into the second sub-container 1022. Different biochemical reaction reagents can be adopted according to different biochemical reactions. The embodiment of the present disclosure does not specifically limit the chemical composition of biochemical reaction reagent 109-2. The first fluid 107 and the second fluid 108 including the cell suspension 109-1 and the biochemical reaction reagent 109-2 meet at the junction 105 of the first delivery channel 103 and generate a plurality of first droplets 110, which flow into the first collector 104 along the first delivery channel 103. The first collector 104 includes a plurality of outlets 4, which are used to connect with an external device to transfer a plurality of first droplets 110 in the first collector 104 to other containers for subsequent operation.

It should be noted that although it is shown in FIG. 1A that the cell suspension 109-1 is accommodated in the first sub-container 1021 and the biochemical reaction reagent 109-2 is accommodated in the second sub-container 1022 which is separated from the first sub-container 1021, this is only an example, and the embodiments of the present disclosure are not limited thereto. In an alternative embodiment, the cell suspension 109-1 and the biochemical reaction reagent 109-2 may be premixed and accommodated in the same container.

With continued reference to FIGS. 1A-1D, the first delivery channel 103 includes a first flow channel 1031 and a second flow channel 1032. The first flow channel 1031 communicates with the first container 101 and allows the first fluid 107 to flow therein. The second flow channel 1032 communicates with the second container 102 and allows the second fluid 108 to flow therein. The first flow channel 1031 and the second flow channel 1032 intersect and communicate at the junction 105. In a partial section of the first delivery channel 103 (for example, in the second portion 1031B of the first flow channel 1031 and the second flow channel 1032 of the first delivery channel 103), the area of the cross-section of the first delivery channel 103 first gradually decreases and then gradually increases, that is, in this section, the first delivery channel 103 becomes thicker, and then narrower, and thicker again. This will be described in detail below.

The first flow channel 1031 includes a first portion 1031A and a second portion 1031B. The first portion 1031A and the second portion 1031B of the first flow channel 1031 together enclose a closed pentagon, which is approximately axisymmetric about the horizontal axis where the junction 105 is located. A part of the first fluid 107 in the first container 101 flows to the junction 105 along the part of the first flow channel 1031 above the horizontal axis, and the other part of the first fluid 107 in the first container 101 also flows to the junction 105 along the part of the first flow channel 1031 below the horizontal axis.

Figure 2:
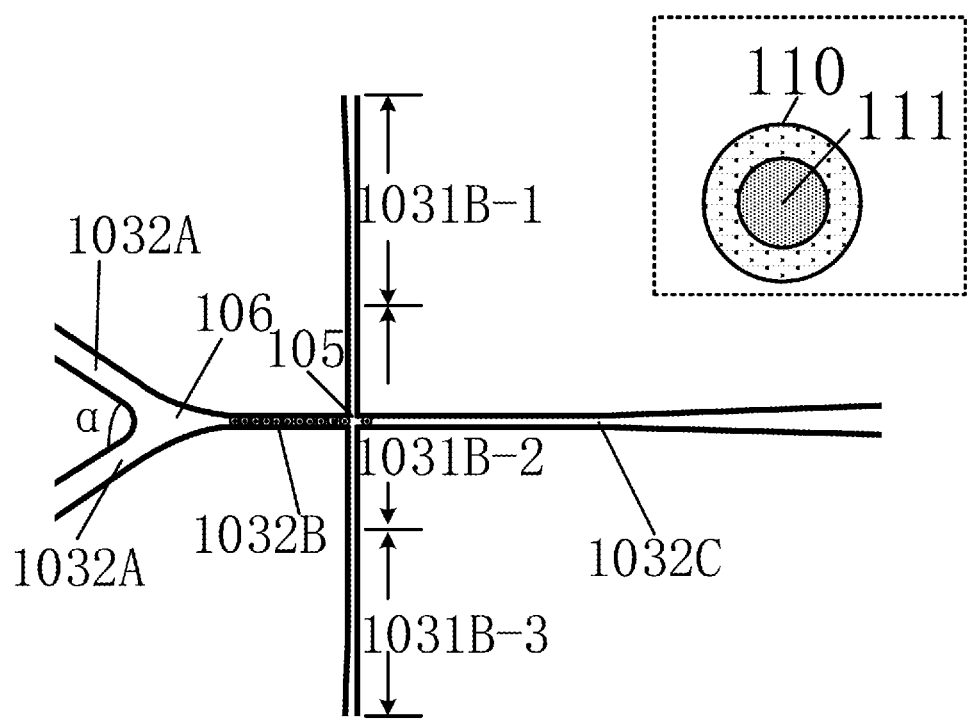
FIG. 2 schematically shows a partially enlarged diagram of the chip of FIG. 1A.

FIG. 2 is an enlarged view of area AA of FIG. 1A. As shown in FIG. 2, the second portion 1031B of the first flow channel 1031 includes a first sub-portion 1031B-1, a second sub-portion 1031B-2 and a third sub-portion 1031B-3 which are arranged in sequence along the first direction (the vertical direction in the figure), and the second sub-portion 1031B-2 is located between the first sub-portion 1031B-1 and the third sub-portion 1031B-3 and includes the junction 105. The first sub-portion 1031B-1 belongs to the first section described above, the third sub-portion 1031B-3 belongs to the second section described above, and the second sub-portion 1031B-2 spans the first section and the second section. The areas of the first cross-section of both the first sub-portion 1031B-1 and the third sub-portion 1031B-3 are larger than the area of the first cross-section of the second sub-portion 1031B-2, that is, along the direction from the first sub-portion 1031B-1 to the third sub-portion 1031B-3, the first flow channel 1031 is gradually thinner and then gradually thicker, such that the first flow channel 1031 has a thick shape in the top and bottom (i.e. the first sub-portion 1031B-1 and the third sub-portion 1031B-3) and a thin shape in the middle (i.e. the second sub-portion 1031B-2). With such shape design, when the first fluid 107 in the first flow channel 1031 flows from the first sub-portion 1031B-1 to the second sub-portion 1031B-2 or from the third sub-portion 1031B-3 to the second sub-portion 1031B-2, the flow velocity of the first fluid 107 in the first flow channel 1031 becomes larger as the flow channel becomes thinner, so that the pressure of the first fluid 107 can be increased. The first fluid 107 in the first sub-portion 1031B-1 and the third sub-portion 1031B-3 is promoted to flow to the junction 105 of the second sub-portion 1031B-2, and is collected at the junction 105. In this way, sufficient first fluid 107 can be provided to facilitate the subsequent formation of first droplets 110. The shapes of the first cross-section of the first sub-portion 1031B-1, the second sub-portion 1031B-2 and the third sub-portion 1031B-3 of the second portion 1031B of the first flow channel 1031 may be circular, square, rectangular, regular polygon, irregular shape, etc., which is not limited by the embodiments of the present disclosure.

The size of the first cross-section of the second sub-portion 1031B-2 of the first flow channel 1031 at the junction 105 is configured to allow the first fluid 107 with a specific particle size to flow therein, the specific particle size of the first fluid 107 is larger than the particle size of a single cell. That is, the width of the first cross-section of the second sub-portion 1031B-2 of the first flow channel 1031 at the junction 105 is larger than the particle size of a single cell. In an example, the particle size of each cell in the cell suspension is about 10 um, and the width of the cross section of the second sub-portion 1031B-2 of the first flow channel 1031 at the junction 105 is greater than 10 um, for example slightly greater than 10 um. Here, "slightly greater than 10 um" means that the width of the first cross-section of the second sub-portion 1031B-2 of the first flow channel 1031 at the junction 105 is greater than 10 μm but less than 20 μm, that is, the width is greater than the particle size of a single cell but less than the sum of the particle sizes of two cells. It should be noted that the phrase "the width of the first cross-section of the second sub-portion 1031B-2 of the first flow channel 1031 at the junction 105" can be understood as that when the shape of the first cross-section of the second sub-portion 1031B-2 of the first flow channel 1031 at the junction 105 is circular, the width of the first cross-section is the diameter of the circle; when the shape of the first cross-section of the second sub-portion 1031B-2 of the first flow channel 1031 at the junction 105 is square, the width of the first cross section is the side length of the square; when the shape of the first cross-section of the second sub-portion 1031B-2 of the first flow channel 1031 at the junction 105 is rectangular, the width of the first cross section is the length of the short side of the rectangle; when the shape of the first cross-section of the second sub-portion 1031B-2 of the first flow channel 1031 at the junction 105 is a regular polygon, the width of the first cross section is the distance between the farthest two vertices of the regular polygon. In an example, when the first cross-section of the second sub-portion 1031B-2 of the first flow channel 1031 at the junction 105 is circular and the shape of a single cell is spherical, the width of the first cross-section of the second sub-portion 1031B-2 of the first flow channel 1031 at the junction 105 is larger than the particle size of the single cell, which should be understood as the diameter of the second sub-portion 1031B-2 of the first flow channel 1031 at the junction 105 is larger than the diameter of the single cell. With such design, when the first fluid 107 in the first flow channel 1031 flows from the first sub-portion 1031B-1 to the second sub-portion 1031B-2 or from the third sub-portion 1031B-3 to the second sub-portion 1031B-2, the first fluid 107 can form a single row of fluid particles arranged in sequence near the junction 105, wherein the particle size of each particle in the single row of fluid particles is larger than the particle size of a single cell and smaller than the sum of particle sizes of two cells. In this way, the particle size of each particle formed by the first fluid 107 can be slightly larger than the particle size of a single cell, so that the single cell can be better wrapped and the encapsulation effect is better. Moreover, such design can also increase the flow rate of the first fluid 107 at the junction 105, which is beneficial to the formation of the first droplets 110.

With continued reference to FIGS. 1A-1D and FIG. 2, the second flow channel 1032 includes a first portion 1032A, a second portion 1032B, and a third portion 1032C which are sequentially arranged along a second direction (horizontal direction in the figure) different from the first direction. The first portion 1032A and the second portion 1032B belong to the third section described earlier, and the third portion 1032C belongs to the fourth section described earlier. A first end of the first portion 1032A of the second flow channel 1032 communicates with the second container 102, and a second end of the first portion 1032A of the second flow channel 1032 communicates with a first end of the second portion 1032B of the second flow channel 1032; a second end of the second portion 1032B of the second flow channel 1032 communicates with a first end of the third portion 1032C of the second flow channel 1032, and both the second end of the second portion 1032B of the second flow channel 1032 and the first end of the third portion 1032C of the second flow channel 1032 are at the junction 105; a second end of the third portion 1032C of the second flow channel 1032 communicates with the first collector 104. As shown in the figures, the first portion 1032A of the second flow channel 1032 includes a first branch and a second branch, the first branch communicates with the first sub-container 1021 of the second container 102 and is configured to allow the cell suspension 109-1 to flow therein, and the second branch communicates with the second sub-container 1022 of the second container 102 and is configured to allow the biochemical reaction reagent 109-2 to flow therein. The first branch and the second branch intersect and communicate with each other at the first point 106, and the angle α between the first branch and the second branch at the first point 106 is acute. In an example, the angle α between the first branch and the second branch at the first point 106 is about 60 degrees. The design of the angle between the first branch and the second branch can, on the one hand, ensure that the cell suspension 109-1 in the first branch and the biochemical reagent 109-2 in the second branch have enough forward (towards the junction 105) flow rate to buffer the pressure; on the other hand, ensure that the cell suspension 109-1 and the biochemical reaction reagent 109-2 can be fully mixed at the first point 106, and further, the dead volume of the mixed solution in the channel can be reduced and the liquid storage accuracy of the first branch and the second branch can be improved. It should be noted that the phrase "the angle α between the first branch and the second branch at the first point 106 is about 60 degrees" includes several situations such as the angle α between the first branch and the second branch at the first point 106 is greater than 60 degrees, the angle α between the first branch and the second branch at the first point 106 is less than 60 degrees, and the angle α between the first branch and the second branch at the first point 106 is equal to 60 degrees.

The areas of the second cross-section of both the first portion 1032A and the third portion 1032C of the second flow channel 1032 are larger than that of the second cross-section of the second portion 1032B of the second flow channel 1032. That is, the areas of the second cross-section of the first branch and the second branch of the first portion 1032A of the second flow channel 1032 are both larger than the area of the second cross-section of the second portion 1032B of the second flow channel 1032, and the area of the second cross-section of the third portion 1032C of the second flow channel 1032 is larger than the area of the second cross-section of the second portion 1032B of the second flow channel 1032. Along the direction from the first portion 1032A to the third portion 1032C of the second flow channel 1032, the second flow channel 1032 becomes thicker, then thinner, and then thicker again. Similar to the first flow channel 1031, the shapes of the second cross-sections of the first portion 1032A, the second portion 1032B and the third portion 1032C of the second flow channel 1032 may be circular, square, rectangular, regular polygon, irregular shape, etc., which is not limited by the embodiments of the present disclosure.

The size of the second cross-section of the second portion 1032B of the second flow channel 1032 is configured to allow the second fluid 108 with a specific particle size to flow therein, and the specific particle size of the second fluid 108 is larger than 1 time the particle size of a single cell and smaller than 2 times the particle size of a single cell. That is, the width of the second cross-section of the second portion 1032B of the second flow channel 1032 is larger than 1 time of the particle size of a single cell and smaller than 2 times of the particle size of a single cell. In an example, when the second cross-section of the second portion 1032B of the second flow channel 1032 is circular and the shape of a single cell is spherical, the width of the second cross-section of the second portion 1032B of the second flow channel 1032 is larger than 1 time the particle size of the single cell and smaller than 2 times the particle size of the single cell, which should be understood as the diameter of the second portion 1032B of the second flow channel 1032 is larger than 1 time the diameter of the single cell and smaller than 2 times the diameter of the single cell. In this case, the diameter of the second portion 1032B of the second flow channel 1032 may be 1.1 times, 1.2 times, 1.3 times, 1.4 times, 1.5 times, 1.6 times, 1.7 times, 1.8 times, 1.9 times, etc. the diameter of the single cell. When the cell suspension 109-1 and biochemical reaction reagent 109-2 are mixed at the first point 106 and flow forward (towards the junction 105), by making the width of the second cross-section of the second portion 1032B to be larger than 1 time the particle size of a single cell and smaller than 2 times the particle size of a single cell, so that the mixed solution is arranged in a single row of single cell strings in the second portion 1032B, as shown in FIG. 2. That is, the width of the second cross-section of the second portion 1032B of the second flow channel 1032 allows it to accommodate only one single cell, but not two cells side by side, in its width direction. When the single cell string of the single row moves to the junction 105, under the pressure of the first fluid 107 in the second portion 1031B of the first flow channel 1031, one cell in the cell string which is closest to the junction 105 (that is, the foremost cell in the cell string) is separated from the cell string, and the separated cell is merged with the single particle in the first fluid 107 at the junction 105, thereby forming the first droplet 110 comprising a single cell 111. The upper right corner of FIG. 2 shows an enlarged view of the first droplet 110 comprising a single cell 111 generated at the junction 105. As mentioned above, the first fluid 107 is the oil phase and the second fluid 108 (that is, the mixed solution of cell suspension 109-1 and biochemical reaction reagent 109-2) is the aqueous phase. Therefore, the first droplets 110 have a water-in-oil structure, that is, the first fluid 107 in the oil phase wraps the second fluid 108 in the aqueous phase.

As shown in the figure, the area of the second cross-section of the third portion 1032C of the second flow channel 1032 gradually increases along the direction from the first end to the second end, that is, the third portion 1032C of the second flow channel 1032 becomes gradually thicker along the direction from the first end to the second end. The purpose of this design is to make the first droplet 110 gradually larger when moving forward along the third portion 1032C of the second flow channel 1032, thus facilitating the stability of the droplet. The area of the first cross-section of the second sub-portion 1031B-2 of the first flow channel 1031 at the junction 105 is greater than or equal to the areas of the second cross-section of the second portion 1032B and the third portion 1032C of the second flow channel 1032 at the junction 105. In an example, the area of the first cross-section of the second sub-portion 1031B-2 of the first flow channel 1031 at the junction 105 is equal to the areas of the second cross-section of the second portion 1032B and the third portion 1032C of the second flow channel 1032 at the junction 105. With such design, the particle size of the single particle in the first fluid 107 can be approximately equal to that of the mixed solution comprising the single cell 111 (the mixed solution of cell suspension 109-1 and biochemical reaction reagent 109-2) at the junction 105, so that the size of the first droplet 110 can be accurately controlled.

Figure 3:
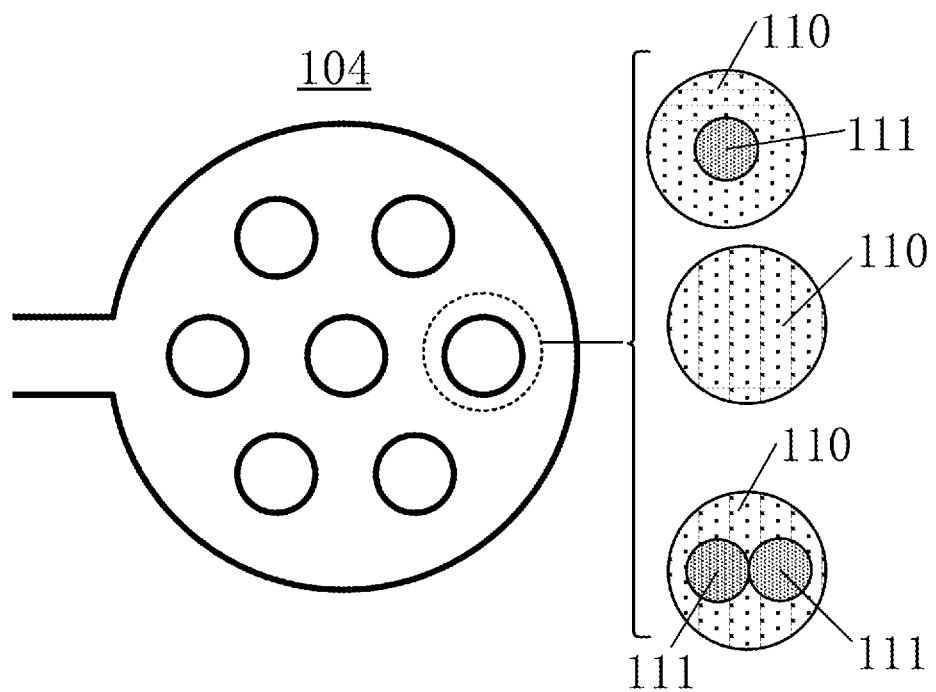
FIG. 3 schematically shows another partially enlarged diagram of the chip of FIG. 1A.

FIG. 3 is an enlarged view of the first collector 104 of the first chip 100 in FIG. 1A. The first droplets 110 finally flow into the first collector 104 along the third portion 1032C of the second flow channel 1032. According to the foregoing description, ideally, among the first droplets 110, each first droplet 110 comprises one single cell 111. However, in actual operation, due to factors such as the adhesion between cells in cell suspension, the flow rate of fluid, the surface design of flow channel, and the like, it is not completely guaranteed that each first droplet 110 comprises one single cell 111. As shown in FIG. 3, among the first droplets 110, one first droplet 110 may include one single cell 111 derived from the cell suspension 109-1, may not include a single cell 111 derived from the cell suspension 109-1 (i.e., "empty" droplet), or may include two cells 111 derived from the cell suspension 109-1. The structural design of the first chip 100 in the embodiments of the present disclosure (for example, the structures of the first flow channel 1031 and the second flow channel 1032, the design of the filter structure to be described later, etc.) is beneficial to promote that only one single cell 111 is included in each first droplet 110.

In some embodiments, the surface of the inner wall of the first delivery channel 103 is subjected to hydrophobic treatment, so it is hydrophobic. As mentioned above, the first delivery channel 103 includes the first flow channel 1031 configured to allow the first fluid 107 to flow therein and the second flow channel 1032 configured to allow the second fluid 108 to flow therein. The hydrophobic first flow channel 1031 can facilitate the flow of the first fluid 107 therein. The hydrophobic second flow channel 1032 can promote the smooth flow of the cell suspension 109-1 in the first branch of the first portion 1032A of the second flow channel 1032 without adhering to the inner wall surface, and can promote the smooth flow of the mixed solution of the cell suspension 109-1 and the biochemical reaction reagent 109-2 in the second portion 1032B and the third portion 1032C of the second flow channel 1032 without adhering to the inner wall surface. In this way, the dosage of the cell suspension 109-1 can be accurately controlled, which is beneficial to the uniform mixing of the cell suspension 109-1 and the biochemical reaction reagent 109-2, thus promoting the uniform generation of the first droplet 110. At the same time, this can also improve the utilization of the cell suspension 109-1 and avoid waste of the cell suspension 109-1.

Figure 4:
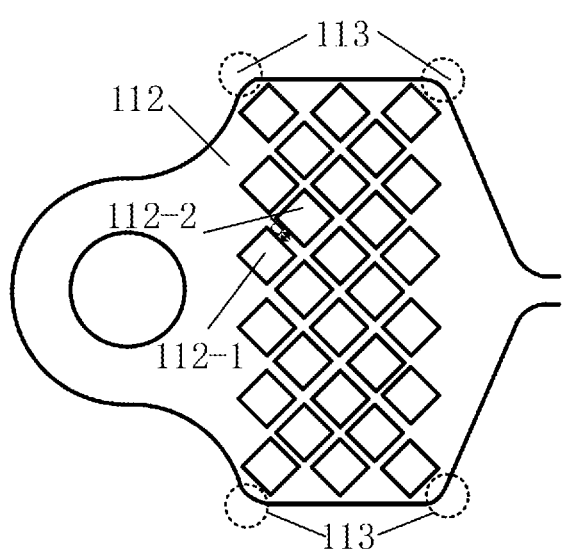
FIG. 4 schematically shows yet another partially enlarged diagram of the chip of FIG. 1A.

With continued reference to FIGS. 1A-1D, the contours of the first container 101, and the first sub-container 1021 and the second sub-container 1022 of the second container 102 include four chamfers. The shape of the four chamfers can be any suitable shape, for example, a circular arc shape. It should be understood that the embodiment of the present disclosure does not limit the specific size of the chamfer. FIG. 4 is an enlarged view of the first sub-container 1021 of the second container 102. Taking the first sub-container 1021 of the second container 102 as an example, as shown in FIG. 4, the contour of the first sub-container 1021 of the second container 102 includes four chamfers 113, and the shapes of the four chamfers 113 are circular arc shape. The arc-shaped chamfer design can reduce the dead volume of cell suspension 109-1 in the first sub-container 1021 and improve the liquid storage accuracy of the first sub-container 1021. Here, the "dead volume" refers to the uncontrollable volume in the process of reagent sampling. Specifically, if the four corners of the first sub-container 1021 are right angles instead of arc-shaped chamfers, the cell suspension 109-1 is not a right angle shape at the four right angles of the first sub-container 1021 due to the surface tension of the droplets, that is, the cell suspension 109-1 cannot perfectly match the shape of the first sub-container 1021 and hence cannot fill the space occupied by the four right angles of the first sub-container 1021. Therefore, the shape and volume of cell suspension 109-1 will change, and the change of shape and volume has certain randomness, thus leading to dead volume. This may lead to the fact that the first sub-container 1021 of the first chip 100 may accommodate a different volume of cell suspension 109-1 in each operation than in the last operation, resulting in the inability to accurately control the dosage of cell suspension 109-1. However, in the embodiment of the present disclosure, the four corners 113 of the first sub-container 1021 are designed as arc-shaped chamfers, so that the shape of the cell suspension 109-1 and the shape of the first sub-container 1021 can be perfectly matched, especially, the cell suspension 109-1 can fill the space occupied by the four arc-shaped chamfers of the first sub-container 1021, thus effectively reducing or even avoiding the difference in the accommodating volume of the first sub-container 1021, and improving the control accuracy of the cell suspension 109-1.

Similarly, the four arc-shaped chamfers of the first container 101 can reduce the dead volume of the first fluid 107 in the first container 101 and improve the liquid storage accuracy of the first container 101. The four arc-shaped chamfers of the second sub-container 1022 of the second container 102 can reduce the dead volume of the biochemical reaction reagent 109-2 in the second sub-container 1022 and improve the liquid storage accuracy of the second sub-container 1022.

With continued reference to FIGS. 1A-1D and FIG. 4, the first container 101 and the second container 102 of the first chip 100 are provided with the filter structure 112, that is, the first container 101, the first sub-container 1021 and the second sub-container 1022 of the second container 102 of the first chip 100 are provided with the filter structure 112. Since the structures of the filter structures 112 of the first container 101, the first sub-container 1021 and the second sub-container 1022 are completely the same, the structure and function of the filter structure 112 in the first sub-container 1021 shown in FIG. 4 will be described in detail below as an example.

As shown in FIG. 4, the filter structure 112 includes a plurality of microstructures spaced apart from each other, and the gap d between two adjacent microstructures 112-1 and 112-2 is larger than 1 time the particle size of a single cell and smaller than 2 times the particle size of a single cell. In some embodiments, the particle size of a single cell derived from cell suspension 109-1 is about 10 μm, and correspondingly, the gap d between two adjacent microstructures 112-1 and 112-2 is larger than 10 μm and smaller than 20 μm. The heights of the microstructures of the filter structure 112 can be completely the same, completely different, or only partially the same, and the specific heights can be flexibly designed according to product requirements, which are not specifically limited by the embodiments of the present disclosure. In some embodiments, the height of each microstructure is about 100-200 μm. In the direction parallel to the plane where the first sub-container 1021 is located, the shape of the cross section of each microstructure can be any suitable shape, such as diamond, square, rectangle, circle, ellipse, regular polygon, irregular shape, etc., which is not specifically limited by the embodiment of the present disclosure.

During the operation of the first chip 100, the cell suspension 109-1 in the first sub-container 1021 flows through the gap between adjacent microstructures of the filter structure 112, and then flows into the first branch of the first portion 1032A of the second flow channel 1032. Because the gap d between two adjacent microstructures is larger than 1 time the particle size of a single cell and smaller than 2 times the particle size of a single cell, when the cell suspension 109-1 flows through the gap between adjacent microstructures, on the one hand, the microstructures can prevent the oversized impurities in the cell suspension 109-1 (for example, the impurities with particle size larger than 2 times of the particle size of a single cell, such as dust and salting-out substances, etc.) from flowing into the subsequent flow channel, thereby avoiding the oversized impurities from blocking the flow channel and affecting the flow of the cell suspension 109; on the other hand, under the action of adjacent microstructures on the cell suspension 109-1 and the screening of the size of the cell suspension 109-1 by the gap between adjacent microstructures, a plurality of cells adhered to each other (for example, two cells, three cells or more cells that are adhered to each other) in the cell suspension 109-1 can be separated into a plurality of separated single cells, thereby facilitating the subsequent generation of the first droplet 110 containing the single cell and reducing the probability that a single first droplet 110 comprises two or more cells.

The structure of the filter structure 112 in the first container 101 and the second sub-container 1022 can refer to the above description of the filter structure in the first sub-container 1021, and for the sake of brevity, it will not be repeated here. During the operation of the first chip 100, the first fluid 107 in the first container 101 flows through the gap between adjacent microstructures of the filter structure 112, and then flows into the first flow channel 1031 of the first delivery channel 103. When the first fluid 107 flows through the gap between the adjacent microstructures of the filter structure 112, the microstructures can prevent the oversized impurities in the first fluid 107 (for example, impurities with a particle size larger than 2 times that of a single cell, such as dust, salting-out substances, etc.) from flowing into the first flow channel 1031, thereby preventing the oversized impurities from blocking the first flow channel 1031 and affecting the normal flow of the first fluid 107. During the operation of the first chip 100, the biochemical reaction reagent 109-2 in the second sub-container 1022 flows through the gap between adjacent microstructures of the filter structure 112, and then flows into the second branch of the first portion 1032A of the second flow channel 1032 of the first delivery channel 103. When the biochemical reaction reagent 109-2 flows through the gap between the adjacent microstructures of the filter structure 112, the microstructures can prevent the oversized impurities in the biochemical reaction reagent 109-2 (for example, impurities with a particle size larger than 2 times that of a single cell, such as dust, salting-out substances, etc.) from flowing into the second branch of the first portion 1032A of the second flow channel 1032, thereby preventing the oversized impurities from blocking the second flow channel 1032 and affecting the normal flow of the biochemical reaction reagent 109-2.

The first chip 100 described in any of the previous embodiments may be a microfluidic chip. Microfluidic chip has many advantages, such as controllable liquid flow, less sample consumption, fast detection speed, simple operation, multi-functional integration, small volume and portability. In addition to the advantages mentioned above, in the embodiment of the present disclosure, by optimizing the design of the first delivery channel 103 of the first chip 100, it is possible to promote the separation of a single cell from the cell suspension 109-1, so that each generated first droplet 110 can contain one single cell and the probability of two or more cells are comprised by a single first droplet 110 can be reduced. By optimizing the gap between adjacent microstructures of the filter structure 112, it is possible to further promote that each generated first droplet 110 contains one single cell. By designing the four corners of the first container 101 and the second container 102 as arc chamfers, the dead volume in the container can be avoided and the liquid storage accuracy of the container can be improved. By hydrophobic treatment of the inner wall surface of the first delivery channel 103, the fluid in the channel can be reduced or even prevented from adhering to the inner wall surface of the channel, so that the amount of fluid can be accurately controlled, the waste of reagents can be avoided, and the uniform generation of the first droplets 110 can be promoted. The first droplet 110 can constitute a microreactor for biochemical reaction of a single cell, and also constitute a droplet carrier for subsequent single cell sorting. In addition, because of the high degree of integration of the first chip 100, the preparation of the first droplet 110 comprising a single cell can be automatically completed without manual operation by an operator, so that the degree of automation of the operation can be effectively improved. Since the first fluid 107 and the second fluid 108 completely flow in the first delivery channel 103 and are completely isolated from the external environment, it is possible to avoid being polluted by aerosols, microorganisms and the like floating in the environment. In addition, because the whole preparation process is mild, and the single cell separated from the cell suspension is wrapped and protected by the droplet, the cell survival rate can be effectively improved.

Figure 5A:
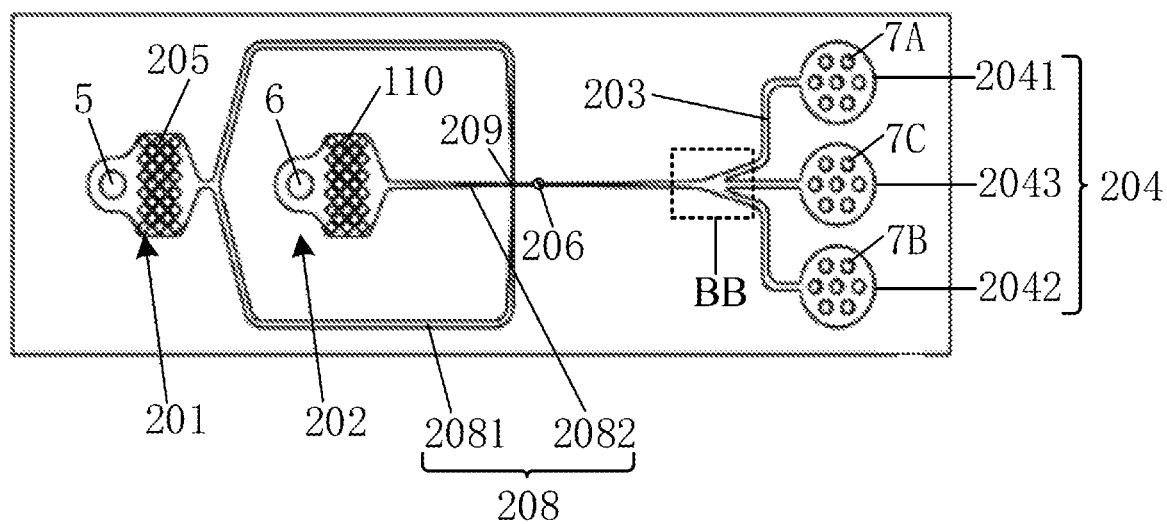
FIG. 5A schematically shows a front view of a chip according to another embodiment of the present disclosure.
Figure 5B:
FIG. 5B schematically shows a side view of a chip according to another embodiment of the present disclosure.
Figure 5C:
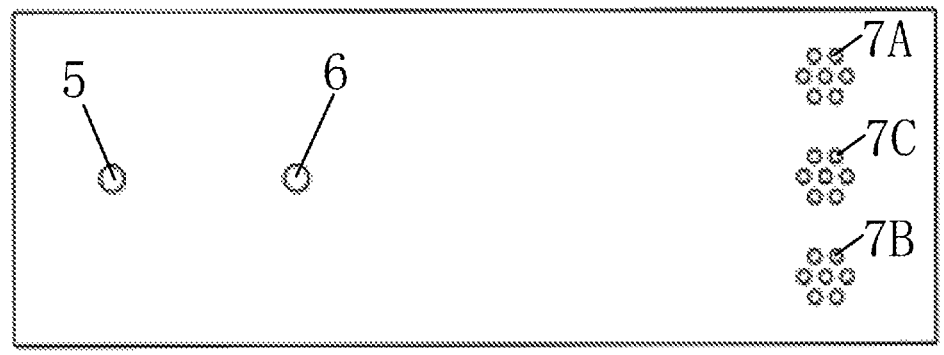
FIG. 5C schematically shows a rear view of a chip according to another embodiment of the present disclosure.
Figure 5D:
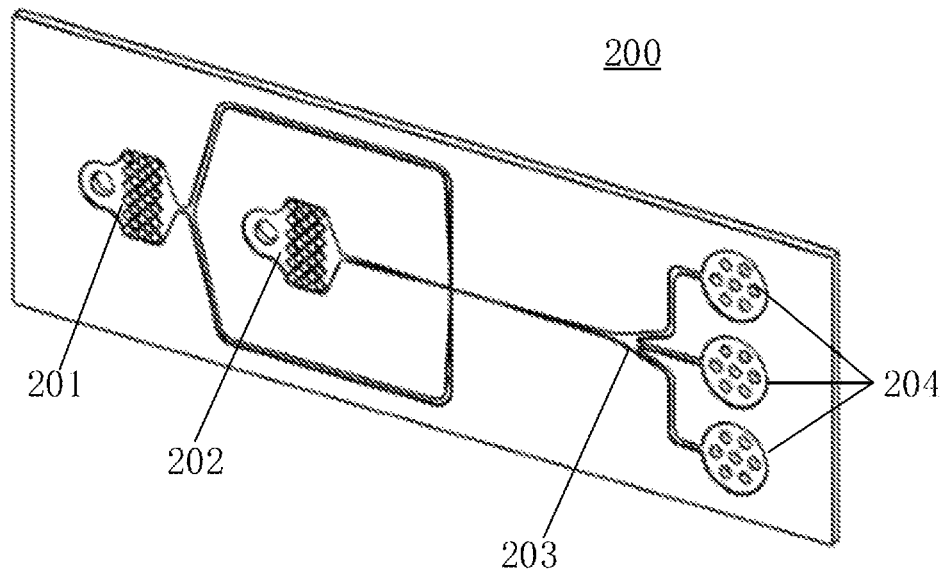
FIG. 5D schematically shows a trimetric view of a chip according to another embodiment of the present disclosure.

Other embodiments of the present disclosure provide a chip 200 (hereinafter referred to as a second chip 200), which can be used to sort target droplets. FIGS. 5A-5D show the second chip 200, FIG. 5A is a front view of the second chip 200, FIG. 5B is a side view of the second chip 200, FIG. 5C is a rear view of the second chip 200, and FIG. 5D is a trimetric view of the second chip 200. As shown in FIGS. 5A-5D, the second chip 200 includes: a third container 201 configured to accommodate a third fluid 205; a fourth container 202 configured to accommodate a fourth fluid including the cell suspension; a delivery channel 208 (hereinafter referred to as a second delivery channel 208) including a third flow channel 2081 and a fourth flow channel 2082, the third flow channel 2081 communicating with the third container 201 and the fourth flow channel 2082 communicating with the fourth container 202, the third flow channel 2081 and the fourth flow channel 2082 intersecting and communicating with each other at a junction 209, the second delivery channel 208 being configured such that the third fluid 205 and the fourth fluid meet at the junction 209 and generate at least one droplet 206 (hereinafter referred to as a second droplet 206), each of at least a portion of the at least one second droplet 206 comprising a single cell from the cell suspension; and at least one collector 204 (hereinafter referred to as a second collector 204) configured to collect at least one second droplet 206. A portion of the third flow channel 2081 (i.e., the vertical portion of the third flow channel 2081 in FIG. 5A) includes the junction 209 and is divided into a first section (e.g., the section of the third flow channel 2081 above the junction 209 in FIG. 5A) and a second section (e.g., the section of the third flow channel 2081 below the junction 209 in FIG. 5A) by the junction 209. In each of the first section and the second section, an area of a first cross-section of each section gradually increases along a first direction away from the junction 209, the first cross-section is perpendicular to the first direction. The fourth flow channel 2082 comprises the junction 209 and is divided into a third section (e.g., the section of 2082 which is on the left side of the junction 209 in FIG. 5A) and a fourth section (e.g., the section of 2082 which is on the right side of the junction 209 in FIG. 5A) by the junction 209, in each of the third section and the fourth section, an area of a second cross-section of each section gradually increases along a second direction away from the junction 209, the second cross-section is perpendicular to the second direction. That is, in the third flow channel 2081, the third flow channel 2081 gradually becomes thicker in the upward direction from the junction 209; the third flow channel 2081 also gradually becomes thicker in the downward direction from the junction 209. In the fourth flow channel 2082, the fourth flow channel 2082 gradually becomes thicker in the direction from the junction 209 to the left; the fourth flow channel 2082 also gradually becomes thicker in the direction from the junction 209 to the right.

It should be noted that the third fluid 205 and the fourth fluid here are only names used to describe the second chip 200 conveniently. In fact, the third fluid 205 may be the same as the first fluid 107 and the fourth fluid may be the same as the second fluid 108 (including cell suspension 109-1 and biochemical reaction reagent 109-2). Of course, the fourth fluid may not be exactly the same as the second fluid 108. In an example, the fourth fluid is the first droplet 110 described above.

It can be seen from the above description that the first cross-section of a portion of the third flow channel 2081 (i.e. the vertical portion of the third flow channel 2081 in FIG. 5A) refers to the cross section of the portion of the third flow channel 2081 in a direction perpendicular to the flow direction of the third fluid 205; the second cross section of the fourth flow channel 2082 refers to the cross section of the fourth flow channel 2082 in a direction perpendicular to the flow direction of the fourth fluid.

The second delivery channel 208 also includes a sorting channel 203 configured to sort out a target droplet including a single cell from at least one second droplet 206.

As shown in FIGS. 5A-5D, the third container 201 includes an inlet 5, to which an external device (such as a micro flow pump) is connected and through which the third fluid 205 is injected into the third container 201. The third fluid 205 is a continuous phase (e.g. oil phase) liquid, which may have the same chemical composition as the first fluid 107. The third fluid 205 may be any suitable fluid such as mineral oil and perfluorinated oil, for example. Optionally, the third fluid 205 may be mixed with a surfactant, which is beneficial to stabilize the second droplets 206 generated in the following process, for example, to inhibit the subsequent coalescence of the second droplets 206. When the third fluid 205 is perfluorinated oil, the surfactant may be perfluorinated surfactant.

The fourth container 202 includes an inlet 6 to which an external device (such as a micro-flow pump) is connected and through which the fourth fluid (such as the first droplet 110 described above) is injected into the fourth container 202. Before the first droplet 110 is injected into the second chip 200, the first droplet 110 can be transferred to another device for corresponding biochemical treatment (such as PCR amplification, dyeing, etc.), and then the treated first droplet 110 can be injected into the second container 202 of the second chip 200.

Similar to the first container 101 and the second container 102 of the first chip 100, the contours of the third container 201 and the fourth container 202 of the second chip 200 also include four chamfers, which may be arc-shaped or any other suitable shape. The chamfer design of the third container 201 and the fourth container 202 can reduce the dead volume of the third fluid 205 and the first droplet 110 in the third container 201 and the fourth container 202, respectively, so that the liquid storage accuracy of the third container 201 and the fourth container 202 can be improved.

Similar to the first container 101 and the second container 102 of the first chip 100, the third container 201 and the fourth container 202 are also provided with the filter structure (not shown in the figure). The filter structure in the third container 201 and the fourth container 202 includes a plurality of microstructures spaced apart from each other, and the gap between two adjacent microstructures is larger than 1 time of the particle size of the single first droplet 110 and smaller than 2 times of the particle size of the single first droplet 110. The heights of the plurality of microstructures of the filter structure can be completely the same, completely different or only partially the same, and the specific heights can be flexibly designed according to product requirements, which are not specifically limited by the embodiments of the present disclosure. In some embodiments, the height of each microstructure is about 100-200 µm. In the direction parallel to the plane where the third container 201 and the fourth container 202 are located, the shape of the cross section of each microstructure can be any suitable shape, such as rhombus, square, rectangle, circle, ellipse, regular polygon, irregular shape, etc., which is not specifically limited by the embodiment of the present disclosure.

During the operation of the second chip 200, the third fluid 205 in the third container 201 flows through the gap between the adjacent microstructures of the filter structure, and the filtered third fluid 205 then flows into the third flow channel 2081 of the second delivery channel 208. When the third fluid 205 flows through the gap between the adjacent microstructures of the filter structure, the microstructures can prevent the oversized impurities in the third fluid 205 (for example, impurities with a particle size larger than 2 times that of the single first droplet 110, such as dust, salting-out substances, etc.) from flowing into the third flow channel 2081, thereby preventing the oversized impurities from blocking the third flow channel 2081 and affecting the normal flow of the third fluid 205. The first droplets 110 in the fourth container 202 flow through the gap between the adjacent microstructures of the filter structure, and the filtered first droplets 110 then flow into the fourth flow channel 2082 of the second delivery channel 208. Since the gap between two adjacent microstructures is larger than 1 time of the particle size of the single first droplet 110 and smaller than 2 times of the particle size of the single first droplet 110, when the first droplet 110 flows through the gap between adjacent microstructures, on the one hand, the microstructures can prevent the potentially oversized impurities in the first droplet 110 (for example, impurities with the particle size larger than 2 times of the particle size of the single first droplet 110, such as dust, salting-out substances, etc.) from flowing into the fourth flow channel 2082, thereby preventing the oversized impurities from blocking the fourth flow channel 2082 and affecting the normal flow of the first droplets 110. On the other hand, under the action of the adjacent microstructures on the first droplets 110 and the screening of the size of the first droplets 110 by the gap between the adjacent microstructures, a plurality of droplet particles adhered to each other (for example, two droplet particles, three droplet particles or more droplet particles adhered to each other) that may exist in the first droplets 110 can be separated into a plurality of separate single droplets, so that when the single first droplet 110 merges with the third fluid 205, a single second droplet 206 may be generated.

The second delivery channel 208 includes the third flow channel 2081 and the fourth flow channel 2082. The third flow channel 2081 and the fourth flow channel 2082 intersect at the junction 209 and communicate with each other at the junction 209. The third flow channel 2081 communicates with the third container 201 and is configured to allow the third fluid 205 to flow therein, and the fourth flow channel 2082 communicates with the fourth container 202 and is configured to allow the first droplets 110 to flow therein. The third fluid 205 flows along the third flow channel 2081 to the junction 209 of the third flow channel 2081 and the fourth flow channel 2082, and the first droplet 110 flows along the fourth flow channel 2082 to the junction 209 of the third flow channel 2081 and the fourth flow channel 2082, the third fluid 205 and the first droplet 110 meet and generate the second droplet 206 at the junction 209.

Figure 6:
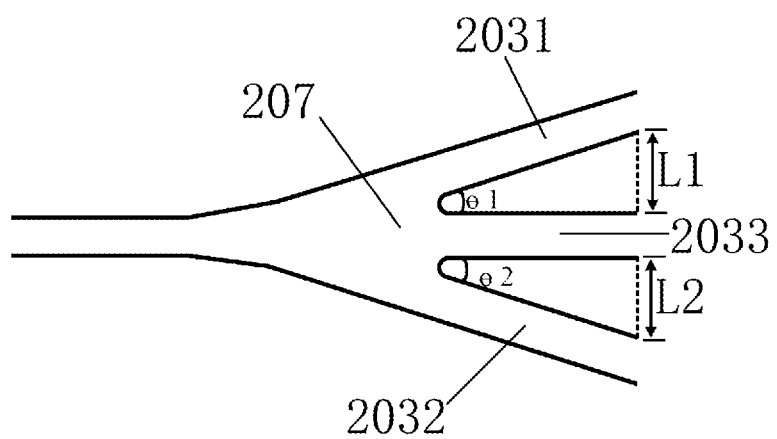
FIG. 6 schematically shows a partially enlarged diagram of the chip of FIG. 5A.

FIG. 6 is an enlarged view of the area BB of the sorting channel 203 shown in FIG. 5A. Referring to FIGS. 5A and 6, the sorting channel 203 includes a first branch 2031, a second branch 2032 and a third branch 2033, and the third branch 2033 is located between the first branch 2031 and the second branch 2032. The second collector 204 includes a first sub-collector 2041, a second sub-collector 2042 and a third sub-collector 2043. The first sub-collector 2041 includes an outlet 7A, the second sub-collector 2042 includes an outlet 7B and the third sub-collector 2043 includes an outlet 7C. The first sub-collector 2041 communicates with the first branch 2031 of the sorting channel 203, the second sub-collector 2042 communicates with the second branch 2032 of the sorting channel 203, and the third sub-collector 2043 communicates with the third branch 2033 of the sorting channel 203. The sorting channel 203 is provided with an electrode structure (not shown in the figure), which may include a positive electrode and a negative electrode, for example, for applying voltage to drive the second droplets 206 to deflect into the corresponding branches of the sorting channel 203, so as to sort out the target droplets from the second droplets 206. The second chip 200 may also include an optical device (not shown in the figure, such as a fluorescence microscope, etc.) for identifying the target droplets in the second droplets 206.

The sorting process of target droplets is as follows: the cell suspension 109-1 comprises a large number of cells. Among these numerous cells, there are a small number of target cells to be analyzed and detected, that is, the target cells (such as circulating tumor cells, rare cells, cancer cells in peripheral blood samples, etc.) to be sorted out in this application and other non-target cells. Because these target cells and non-target cells in the cell suspension contain different antibodies, the target cells will show different colors from the non-target cells under fluorescence microscope after fluorescent staining. The cell suspension 109-1 can be dyed or the first droplet 110 can be dyed. The embodiment of the present disclosure does not specifically limit the dyeing sequence. After the dyeing process, the first droplets 110 are injected into the fourth container 202 of the second chip 200, and the third fluid 205 and the first droplets 110 meet in the second delivery channel 208 to generate the second droplet 206. The second droplet 206 can be roughly divided into the following two categories: (a) the second droplet 206 contains a single target cell with a target color; (b) the second droplet 206 contains non-target cell(s) or no cells. The second droplet 206 moves along the second delivery channel 208 towards the second collector 204, and the optical device detects the optical signal (e.g., color) of the second droplet 206 in the second delivery channel 208 in real time. When the optical device detects that the second droplet 206 is in the above-mentioned situation (b), the circuit system will not be triggered to apply voltage to the electrode structure. The second droplet 206 flows into the third branch 2033 of the sorting channel 203 along the second delivery channel 208, and then flows into the third sub-collector 2043 of the second collector 204. When the optical device detects that the second droplet 206 is in the above-mentioned situation (a), the circuit system is immediately triggered to apply a voltage (for example, 800-1000 V) to the electrode structure at the sorting channel 203, and the second droplet 206 containing a single target cell is polarized. Under the action of the electric field, the second droplet 206 containing a single target cell deflects upward and flows into the first branch 2031 of the sorting channel 203 or deflects downward and flows into the second branch 2032 of the sorting channel 203, and then flows into the first sub-collector 2041 or the second sub-collector 2042 of the second collector 204, respectively. Thus, the second chip 200 realizes the sorting of the target droplets.

It should be noted that the fluorescent staining treatment of cell suspension is only an example of the embodiment of this disclosure, and the treatment methods of cell suspension are not limited to this, the treatment methods that can distinguish target cells from non-target cells in the cell suspension are within the scope of protection of this disclosure.

It should be noted that although FIG. 5A shows that the sorting channel 203 includes three branches and the second collector 204 correspondingly includes three sub-collectors, the embodiment of the present disclosure is not limited to this. In alternative embodiments, the sorting channel 203 may include at least two branches (for example, two branches, four branches or more branches), one of the at least two branches is configured to sort out non-target droplets from the plurality of second droplets 206, and the remaining branches of the at least two branches are configured to sort out target droplets from the plurality of second droplets 206. Accordingly, the second collector 204 may include at least two sub-collectors, which correspond to the at least two branches of the sorting channel 203 one by one, one of the at least two sub-collectors is communicated with one of the at least two branches of the sorting channel 203 and configured to collect non-target droplets, and the remaining sub-collectors of the at least two sub-collectors are respectively communicated with the remaining branches of the at least two branches of the sorting channel 203 and configured to collect target droplets.

With continued reference to FIG. 6, the first branch 2031, the second branch 2032 and the third branch 2033 of the sorting channel 203 intersect at a second point 207 and the third branch 2033 is located between the first branch 2031 and the second branch 2032. The first angle θ1 between the first branch 2031 and the third branch 2033 at the second point 207 and the second angle θ2 between the second branch 2032 and the third branch 2033 at the second point 207 are both greater than 10 degrees. The space between the first branch 2031 and the third branch 2033 of the sorting channel 203 defines a first right triangle, and the space between the second branch 2032 and the third branch 2033 of the sorting channel 203 defines a second right triangle. The first angle θ1 faces the first right-angled side of the first right triangle, and the second angle θ2 faces the second right-angled side of the second right triangle. The length L1 of the first right-angled side of the first right triangle and the length L2 of the second right-angled side of the second right triangle are both greater than or equal to the particle size of the single second droplet 206.

It should be noted that "defines" in the phrase "the space between the first branch 2031 and the third branch 2033 of the sorting channel 203 defines a first right triangle, and the space between the second branch 2032 and the third branch 2033 of the sorting channel 203 defines a second right triangle" means that: as shown in FIG. 5A, the third branch 2033 of the sorting channel 203 extends along the second direction (i.e. the horizontal direction in the figure), the first branch 2031 of the sorting channel is separated from the third branch 2033 at the second point 207 and extends upward at an inflection point, the second branch 2032 of the sorting channel is separated from the third branch 2033 at the second point 207 and extends downward at another inflection point. The inflection point of the first branch 2031 and the inflection point of the second branch 2032 are connected by a straight line, which intersects with the third branch 2033 at a point. The inflection point of the first branch 2031, the second point 207, the intersection point of the straight line and the third branch 2033 are connected to form a first right triangle, and the first angle θ1 faces the first right-angled side of the first right triangle, the length of the first right-angled side is L1, and the length L1 is greater than or equal to the particle size of the single second droplet 206. The inflection point of the second branch 2032, the second point 207 and the intersection point of the straight line and the third branch 2033 are connected to form the second right triangle, and the second angle θ2 faces the second right-angled side of the second right triangle, the length of the second right-angled side is L2, and the length L2 is greater than or equal to the particle size of the single second droplet 206.

By designing the angle between the branches of the sorting channel 203 to be greater than 10 degrees and the length of the right-angled side of the right triangle to be greater than or equal to the particle size of one second droplet 206, it is beneficial to sort the target droplets into the corresponding sub-collector. The reason is: if the slope of the fork between the branches of the sorting channel 203 is too small, the target droplets may not normally deflect upward or downward to the corresponding sub-collector, but may mistakenly enter the middle sub-collector 2043; if the slope of the fork between the branches of the sorting channel 203 is too large, in order to sort the target droplets, it is necessary to apply a larger voltage to make the target droplets flow into the corresponding sub-collectors, but the excessive voltage will crush or damage the second droplets 206, so that the sorting of the target droplets cannot be realized. Therefore, an appropriate slope of the fork of the sorting channel 203 is favorable for sorting out the target droplets from the second droplets 206.

The second chip 200 described in any of the previous embodiments may be a microfluidic chip. In the embodiment of the present disclosure, by using microfluidic chips as the first chip 100 and the second chip 200, the liquid flow path and its pump valve system can be effectively simplified. By controlling the liquid flow injected into the chip, the size of the formed second droplets 206 can be controlled in the range of several microns to tens of microns.

Figure 7:
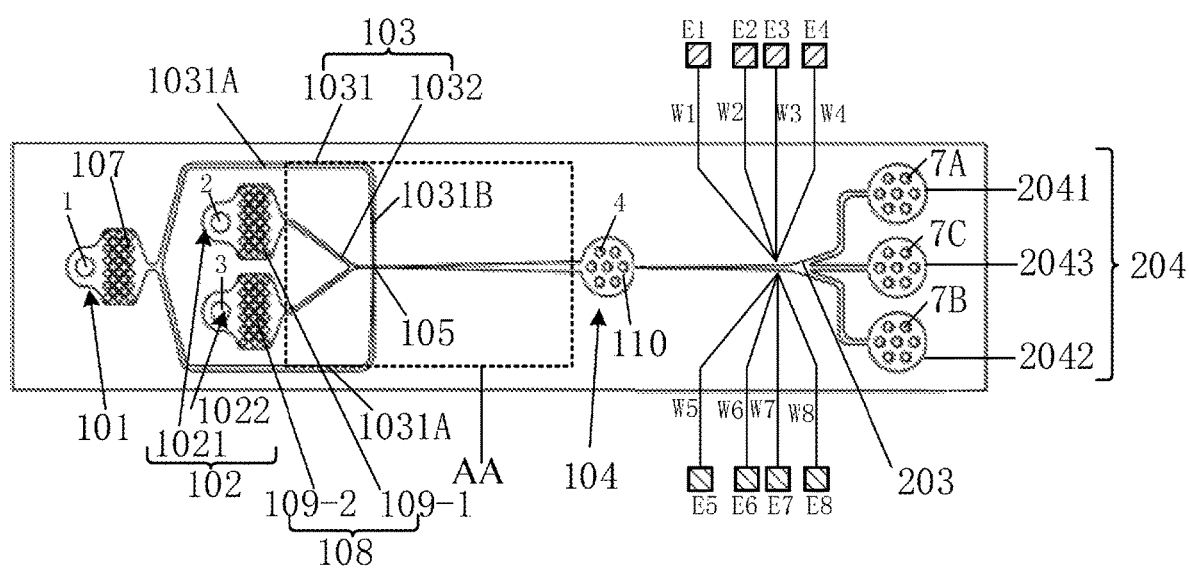
FIG. 7 schematically shows a front view of a chip according to yet another embodiment of the present disclosure.

Other embodiments of the present disclosure provide a chip 300A (hereinafter referred to as a third chip 300A), which can be used to simultaneously realize the preparation of droplet comprising a single cell and the sorting of target droplets. FIG. 7 shows the third chip 300A. The third chip 300A can be regarded as a combination of the first chip 100 and the second chip 200, but in the third chip 300A, the third container 201, the fourth container 202 and the second delivery channel 208 of the second chip 200 are removed. In FIG. 7, the same reference numerals as in FIGS. 1A and 5A indicate the same structures, so for the sake of brevity, the same structures in the third chip 300A as the first chip 100 and the second chip 200 will not be described again, and the differences will be described below.

As shown in FIG. 7, during the operation of the third chip 300A, the first fluid 107 and the second fluid 108 (including the cell suspension 109-1 and the biochemical reaction reagent 109-2) meet in the first delivery channel 103 and generate the first droplets 110, which flow into the first collector 104 along the third portion 1032C of the second flow channel 1032. The first droplet 110 has a water-in-oil structure. The first collector 104 is in direct communication with the sorting channel 203, that is, the first droplets 110 in the first collector 104 can flow into the sorting channel 203. Because the first droplet 110 has been treated by fluorescent staining in the early stage, the first droplet 110 can be roughly divided into the following two categories: (a) the first droplet 110 comprises a single target cell with a target color; (b) the first droplet 110 comprises non-target cell(s) or no cells. The plurality of first droplets 110 move along the sorting channel 203 towards the second collector 204, and the optical device detects the optical signal (e.g., color) of the first droplets 110 in real time. When the optical device detects that the first droplet 110 is in the above-mentioned situation (b), the circuit system will not be triggered to apply voltage to the electrode structure, and the first droplet 110 flows straight forward into the third branch 2033 of the sorting channel 203 and then into the third sub-collector 2043 of the second collector 204. When the optical device detects that the first droplet 110 is in the above-mentioned situation (a), the circuit system is immediately triggered to apply a voltage (for example, 800~1000V) to the electrode structure at the sorting channel 203, and the first droplet 110 comprising a single target cell is polarized. Under the action of the electric field, the first droplet 110 comprising the single target cell deflects upward and flows into the first branch 2031 of the sorting channel 203 or deflects downward and flows into the second branch 2032 of the sorting channel 203, and then flows into the first sub-collector 2041 or the second sub-collector 2042 of the second collector 204, respectively. Therefore, the third chip 300A can simultaneously achieve two purposes of preparing the first droplet 110 comprising a single cell and sorting out the target droplets from the first droplets 110. The target droplet contains a single target cell expected to be obtained in this application, such as circulating tumor cells, rare cells, cancer cells, etc. in peripheral blood samples.

As shown in FIG. 7, the third chip 300A is provided with an electrode structure at the sorting channel 203. Above the sorting channel 203, electrode structures E1, E2, E3 and E4 are arranged. Under the sorting channel 203, electrode structures E5, E6, E7 and E8 are provided. Each electrode structure is connected to a wire. As shown in the figure, one end of the wire W1 is electrically connected to the electrode structure E1, one end of the wire W2 is electrically connected to the electrode structure E2, one end of the wire W3 is electrically connected to the electrode structure E3, one end of the wire W4 is electrically connected to the electrode structure E4, and the other ends of wires W1, W2, W3 and W4 intersect at one point. The wires W1, W2 and W4 are substantially broken lines, and the wire W3 is substantially a straight line. One end of the wire W5 is electrically connected to the electrode structure E5, one end of the wire W6 is electrically connected to the electrode structure E6, one end of the wire W7 is electrically connected to the electrode structure E7, one end of the wire W8 is electrically connected to the electrode structure E8, and the other ends of wires W5, W6, W7 and W8 intersect at one point. The wires W5, W6 and W8 are substantially broken lines, and the wire W7 is substantially a straight line. During the operation of the third chip 300A, when the optical device detects that the first droplet 110 is in the above-mentioned situation (a), the circuit system is immediately triggered to apply a voltage to the electrode structures at the sorting channel 203, for example, to apply positive voltage (or negative voltage) to the electrode structures E1-E4 and to apply negative voltage (or positive voltage) to the electrode structures E5-E8, and the voltage difference between them may be 800~1000V, for example. The first droplet 110 comprising a single target cell is polarized. Under the action of the electric field, the first droplet 110 comprising a single target cell deflects upwards into the first branch 2031 of the sorting channel 203 or deflects downwards into the second branch 2032 of the sorting channel 203 based on the electric field direction, and then flows into the first sub-collector 2041 or the second sub-collector 2042 of the second collector 204, respectively.

The third chip 300A combines the first chip 100 with the second chip 200, and removes the third container 201, the fourth container 202 and the second delivery channel 208 of the second chip 200, thus achieving the two purposes of preparing the first droplet 110 comprising a single cell and sorting out the target droplets from the first droplets 110. Therefore, the third chip 300A not only has the respective technical effects of the first chip 100 and the second chip 200, but also simplifies the structure, further reduces the volume occupied by the chip, further improves the integration degree of the chip, and makes the chip lighter and easier to carry on the premise of realizing the preparation of the droplets and the sorting of the target droplets.

Figure 8A:
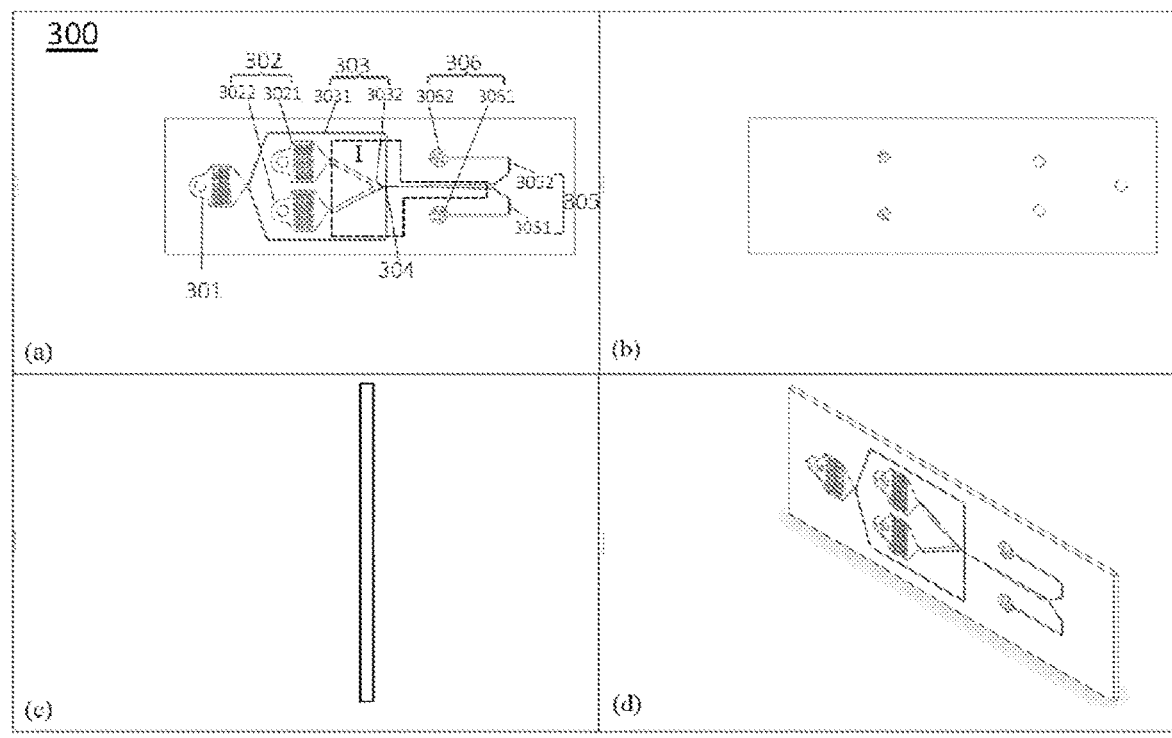
FIG. 8A shows a schematic structural diagram of a microfluidic chip according to an embodiment of the present disclosure.

FIG. 8A shows a schematic structural diagram of a microfluidic chip 300, wherein (a) is a front view of the microfluidic chip 300, (b) is a rear view of the microfluidic chip 300, (c) is a left view of the microfluidic chip 300, and (d) is a trimetric view of the microfluidic chip 300. The microfluidic chip 300 can not only prepare a droplet containing a single cell (a single target cell or a single non-target cell) from a cell suspension, but also can sort out a target droplet comprising a single target cell from the droplet. As shown in FIG. 8A, the microfluidic chip 300 comprises: a first container 301, a second container 302, a delivery channel 303, a sorting channel 305 and a collector 306. The first container 301 is configured to accommodate the first fluid, and the second container 302 is configured to accommodate the second fluid comprising the cell suspension. The delivery channel 303 comprises a first delivery channel 3031 and a second delivery channel 3032. The first delivery channel 3031 communicates with the first container 301 and the second delivery channel 3032 communicates with the second container 302. The first delivery channel 3031 and the second delivery channel 3032 intersect and communicate with each other at the junction 304. The shape of the delivery channel 303 is designed such that the first fluid and the second fluid meet at the junction 304. The sorting channel 305 is located downstream of the delivery channel 303, and the sorting channel 305 comprises a first sorting channel 3051 and a second sorting channel 3052. The collector 306 is located downstream of the sorting channel 305 and comprises a first collector 3061 and a second collector 3062, the first collector 3061 communicates with the first sorting channel 3051, and the second collector 3062 communicates with the second sorting channel 3052.

In some embodiments, the first sorting channel 3051 can be configured to sort first droplets and the second sorting channel 3052 can be configured to sort second droplets. In such a case, the first collector 3061 is configured to collect the first droplets, and the second collector 3062 is configured to collect the second droplets.

It should be noted that, herein, the term "first droplet" may refer to a non-target droplet, and the term "second droplet" may refer to a target droplet. The non-target droplet means that the droplet comprises non-target cells from the cell suspension, while the target droplet means that the droplet comprises a single target cell from the cell suspension. The cell suspension comprises a large number of cells, most of which are non-target cells and a small fraction of which are target cells (e.g., circulating tumor cells, rare cells, cancer cells, etc. in peripheral blood samples). Herein, the terms "first droplet" and "non-target droplet" are used interchangeably, and the terms "second droplet" and "target droplet" are used interchangeably.

The microfluidic chip 300 can not only prepare a droplet containing a single cell (a single target cell or a single non-target cell) from the cell suspension, but also can sort out the target droplet comprising a single target cell from the droplet. Therefore, the microfluidic chip 300 has a high degree of integration, and can automatically complete the preparation of a droplet containing a single cell and the sorting of a droplet containing a single target cell without manual operation by an operator, thereby effectively improving the degree of automation of the operation. In addition, since the first fluid and the second fluid only flow in the delivery channel 303 and are completely isolated from the external environment, contamination by aerosols, microorganisms, etc. floating in the environment can be avoided. Moreover, since the single cell isolated from the cell suspension is wrapped and protected by the droplet, the whole preparation process is relatively mild, and hence the cell viability can be effectively improved.

Figure 8B:
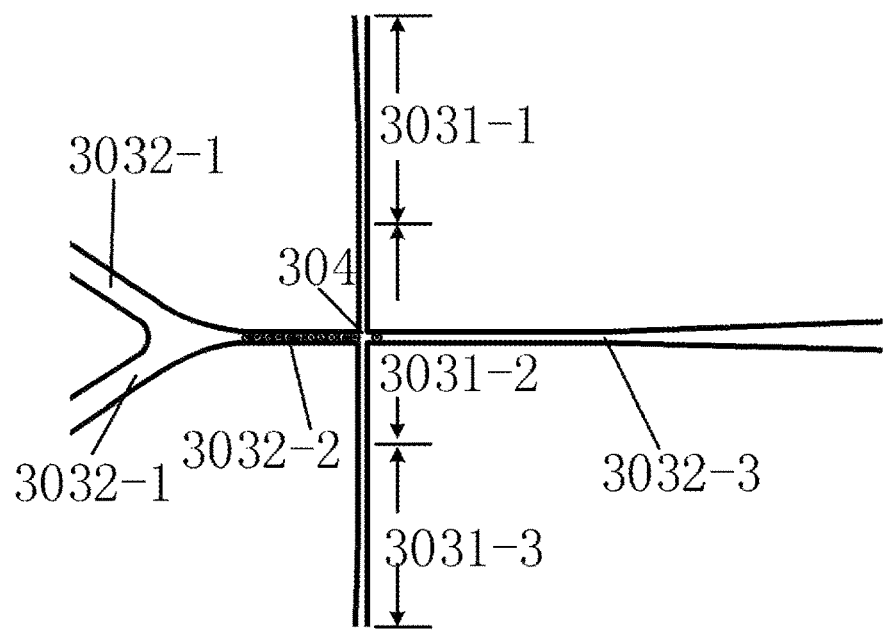
FIG. 8B shows an enlarged view of region I of the microfluidic chip of FIG. 8A.

FIG. 8B is an enlarged view of region I of the microfluidic chip 300 of FIG. 8A. Referring to FIGS. 8A and 8B, the delivery channel 303 of the microfluidic chip 300 comprises the first delivery channel 3031 and the second delivery channel 3032. The first delivery channel 3031 comprises a first sub-portion 3031-1, a second sub-portion 3031-2 and a third sub-portion 3031-3 arranged in sequence along the first direction, and the second delivery channel 3032 comprises a first sub-channel 3032-1, a second sub-channel 3032-2 and a third sub-channel 3032-3. The structures of the first delivery channel 3031 and the second delivery channel 3032 of the microfluidic chip 300 are exactly the same as those of the first flow channel 1031 and the second flow channel 1032 of the microfluidic chip 100. Therefore, for the specific details of the structures of the first delivery channel 3031 and the second delivery channel 3032 of the microfluidic chip 300, reference may be made to the description of the first flow channel 1031 and the second flow channel 1032 of the microfluidic chip 100 in FIG. 2. For the sake of brevity, they are not repeated here.

The microfluidic chip 300 may further comprise an optical recognition device and a driving electrode device (not shown in the figure), and the optical recognition device and the driving electrode device may be disposed near the third sub-channel 3032-3 of the second delivery channel 3032. The droplets generated at the junction 304 flow forward along the third sub-channel 3032-3, which communicates with the downstream sorting channel 305. As mentioned above, the cell suspension comprises a large number of cells, among which a large number of non-target cells and a small number of target cells (e.g. circulating tumor cells, rare cells, cancer cells, etc. in peripheral blood samples) are included. The cell suspension has been stained before being injected into the first sub-container 3021. Since the target cells and non-target cells in the cell suspension have different antibodies, after fluorescent staining, these target cells and non-target cells will show different colors under the optical recognition device. Therefore, a droplet can be roughly divided into the following three categories: (a) a droplet comprises a single target cell with a target color; (b) a droplet comprises non-target cell(s) (including two cases where a droplet comprises one or more non-target cells and a droplet comprises multiple target cells); or (c) a droplet comprises no cells. When the droplet moves forward along the third sub-channel 3032-3, the optical recognition device performs real-time detection on the optical signal (e.g., color) of the droplet in the third sub-channel 3032-3. When the optical recognition device detects that the droplet is in the above situation (b) or (c), it will not notify the circuit system, so the circuit system does not apply a voltage to the driving electrode, and the non-target droplet flows into the first sorting channel 3051 under the action of inertial force, and then flows into the first collector 3061. In an alternative embodiment, when the optical recognition device detects that the droplet is in the above situation (b) or (c), it can also notify the circuit system, and the circuit system applies a certain voltage to the driving electrode after receiving the notification, and the non-target droplet flows into the first sorting channel 3051 under the driving of dielectric force, and then flows into the first collector 3061. When the optical recognition device detects that the droplet is in the above situation (a), it immediately informs the circuit system to apply an appropriate voltage (e.g. 800~1000V) to the driving electrode, and the target droplet comprising the single target cell is polarized. Under the action of the electric field, the target droplet is deflected upward and flows into the second sorting channel 3052, and then flows into the second collector 3062. Therefore, the microfluidic chip 300 realizes the sorting of droplets, the non-target droplets are collected into the first collector 3061, and the target droplets are collected into the second collector 3062.

It should be noted that the staining treatment of the cell suspension is only an example of the embodiment of the present disclosure, and the treatment method of the cell suspension is not limited to this. As long as the target cells in the cell suspension can be distinguished from the non-target cells, the treatment methods are all within the protection scope of the present disclosure.

It should be noted that although FIG. 8A shows that the sorting channel 305 comprises two channels 3051 and 3052, the embodiments of the present disclosure are not limited thereto. In alternative embodiments, the sorting channel 305 may also comprise more channels (e.g., three channels, four channels, or even more), one channel of the plurality of channels is configured to sort out the non-target droplets from the droplets, and the remaining channels of the plurality of channels are configured to sort out target droplets from the droplets. Correspondingly, the collector 306 may comprise a plurality of collectors, the plurality of collectors are in one-to-one correspondence with the plurality of channels of the sorting channel 305, one of the plurality of collectors communicates with one of the plurality of channels of the sorting channel 305 and is configured to collect non-target droplets, and the remaining collectors of the plurality of collectors respectively communicate with the remaining channels of the plurality of channels of the sorting channel 305 and are configured to collect target droplets.

With continued reference to FIG. 8A, the beginning of the first sorting channel 3051 and the beginning of the second sorting channel 3052 are both communicated with the end of the delivery channel 303 (i.e., the end of the third sub-channel 3032-3 of the delivery channel 303), the end of the first sorting channel 3051 communicates with the first collector 3061, and the end of the second sorting channel 3052 communicates with the second collector 3062. The first sorting channel 3051 and the second sorting channel 3052 are bent from the end of the delivery channel 303 toward the junction 304, so that the first collector 3061 and the second collector 3062 are located between the junction 304 and the end of the delivery channel 303. In contrast to a situation where the first sorting channel 3051 and the second sorting channel 3052 extend straight in the horizontal direction (that is, the first sorting channel 3051 and the second sorting channel 3052 extend straight toward the right direction in the figure) and hence the first collector 3061 and the second collector 3062 are connected to their ends respectively, by making the first sorting channel 3051 and the second sorting channel 3052 fold back from the end of the delivery channel 303 toward the junction 304, the volume occupied by the microfluidic chip 300 can be reduced, and the microfluidic chip 300 can be more miniaturized, and the production costs can be saved.

It should be noted that, herein, the term "the end of the delivery channel 303" refers to the end of the third sub-channel 3032-3 of the delivery channel 303, that is, the terminal of the third sub-channel 3032-3 of the delivery channel 303, which is directly connected to the downstream sorting channel 305. The term "the beginning of the first sorting channel 3051 and the beginning of the second sorting channel 3052" refers to the first end of the first sorting channel 3051 and the first end of the second sorting channel 3052. The first ends of the first sorting channel 3051 and the second sorting channel 3052 are directly connected to the terminal of the third sub-channel 3032-3 of the upstream delivery channel 303, and the droplets flow from the terminal of the third sub-channel 3032-3 into the first end of the first sorting channel 3051 and the first end of the second sorting channel 3052, respectively. The term "the end of the first sorting channel 3051 and the end of the second sorting channel 3052" refers to the second end of the first sorting channel 3051 and the second end of the second sorting channel 3052. The second end of the first sorting channel 3051 is connected to the first collector 3061, and the second end of the second sorting channel 3052 is connected to the second collector 3062. The non-target droplets flow from the first end of the first sorting channel 3051 to the second end of the first sorting channel 3051, and then flow into the first collector 3061. The target droplets flow from the first end of the second sorting channel 3052 to the second end of the second sorting channel 3052, and then flow into the second collector 3062.

In some embodiments, the inner wall surface of the delivery channel 303 is hydrophobic treated and thus has hydrophobicity. As previously described, the delivery channel 303 comprises the first delivery channel 3031 configured to allow the first fluid to flow therein and the second delivery channel 3032 configured to allow the second fluid to flow therein. The hydrophobically-treated first delivery channel 3031 may facilitate the flow of the first fluid therein. The hydrophobically-treated second delivery channel 3032 may promote the cell suspension to flow smoothly in the first branch of the first sub-channel 3032-1 of the second delivery channel 3032 without sticking to the inner wall surface, and may promote the mixed solution of cell suspension and biochemical reagent to flow smoothly in the second sub-channel 3032-2 and the third sub-channel 3032-3 of the second delivery channel 3032 without sticking to the inner wall surface. In this way, the dosage of the cell suspension can be precisely controlled, which is conducive to the uniform mixing of the cell suspension and the biochemical reagent, thereby promoting the uniform generation of droplets. At the same time, this can also improve the utilization of the cell suspension and avoid the waste of the cell suspension.

In the microfluidic chip 300 shown in FIG. 8A, the first container 301 further comprises an inlet to which an external device (such as a box device described below) is connected and through which the first fluid is injected into the first container 301. The first sub-container 3021 of the second container 302 comprises an inlet to which an external device (such as a box device described below) is connected and through which the cell suspension is injected into the first sub-container 3021. The second sub-container 3022 of the second container 302 comprises an inlet to which an external device (such as a box device described below) is connected and through which the biochemical reaction reagent is injected into the second sub-container 3022. The first collector 3061 and the second collector 3062 respectively comprise an outlet, and the outlets are used to connect with an external device (such as a box device described below) to deliver the droplets in the first collector 3061 and the second collector 3062 into the external device.

Similar to the microfluidic chip 100, each of the first container 301, the first sub-container 3021, and the second sub-container 3022 of the microfluidic chip 300 also comprises the chamfer and the filter structure. For details and technical effects of the chamfer and filter structure, reference may be made to the description of FIG. 4, and for the sake of brevity, details are not repeated here.

Figure 9:
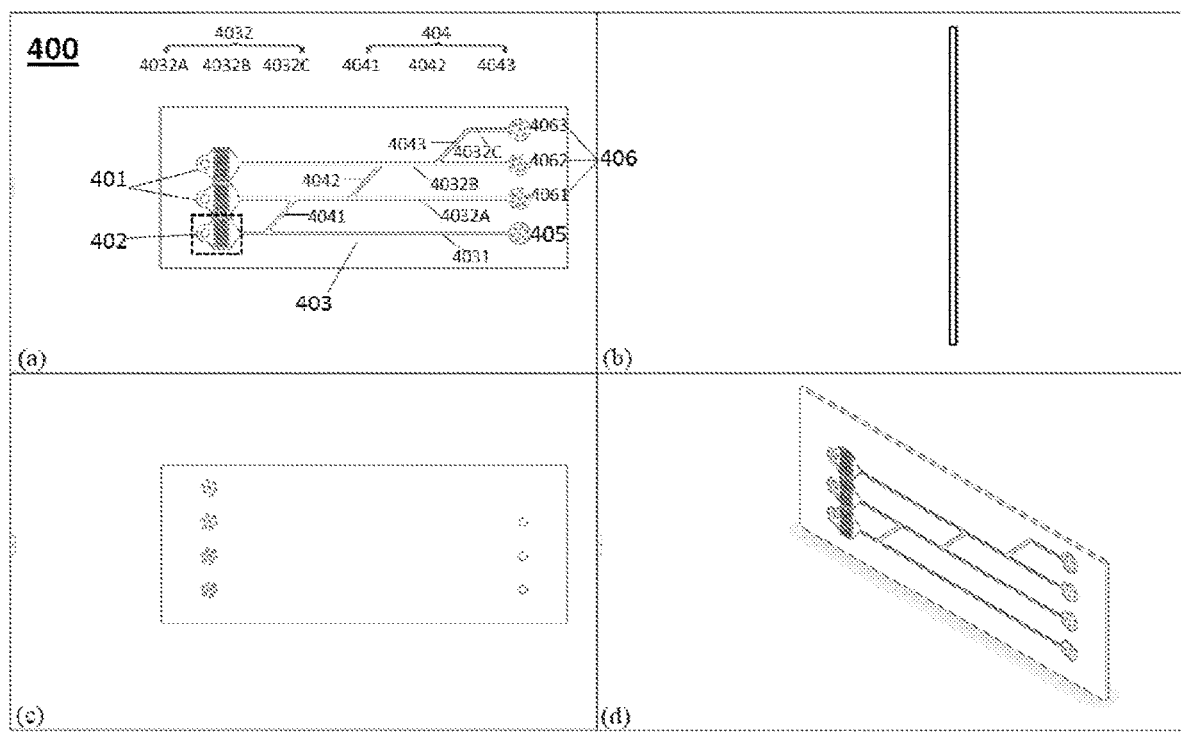
FIG. 9 shows a schematic structural diagram of a microfluidic chip according to another embodiment of the present disclosure.

FIG. 9 shows a schematic structural diagram of a microfluidic chip 400, wherein (a) is a front view of the microfluidic chip 400, (b) is a left view of the microfluidic chip 400, (c) is a rear view of the microfluidic chip 400, and (d) is a trimetric view of the microfluidic chip 400. The microfluidic chip 400 can be used to sort out a target droplet comprising a single target cell from the droplets. The microfluidic chip 400 can be used alone as an independent component to realize the sorting of target droplets, or can also be used to replace the sorting channel 305 and the collector 306 of the microfluidic chip 300, so as to realize the preparation of a droplet comprising a single cell and the sorting of the target droplets.

As shown in FIG. 9, the microfluidic chip 400 comprises a sorting channel 403, a connecting channel 404, and connectors 405 and 406. The sorting channel 403 comprises a first sorting channel 4031 and a second sorting channel 4032, and the second sorting channel 4032 comprises a first branch 4032A, a second branch 4032B, and a third branch 4032C which are cascaded. The connecting channel 404 comprises a first connecting channel 4041, a second connecting channel 4042 and a third connecting channel 4043. The connector comprises a first connector 405 and a second connector 406, and the second connector 406 comprises a first sub-connector 4061, a second sub-connector 4062, and a third sub-connector 4063. Optionally, the microfluidic chip 400 may further comprise two third containers 401 and one fourth container 402, each third container 401 is configured to accommodate the first fluid of the oil phase, and the fourth container 402 is configured to accommodate a large number of droplets, which comprise target droplets and non-target droplets, wherein each target droplet comprises a single target cell. The droplets can be prepared by other devices. As shown in the figure, the beginning of the first sorting channel 4031 communicates with the fourth container 402, the end of the first sorting channel 4031 communicates with the first collector 405, and the first sorting channel 4031 communicates with the first branch 4032A of the second sorting channel 4032 via the first connecting channel 4041. The beginning of the first branch 4032A of the second sorting channel 4032 communicates with the third container 401, the end of the first branch 4032A of the second sorting channel 4032 communicates with the first sub-collector 4061, and the first branch 4032A of the second sorting channel 4032 communicates with the second branch 4032B of the second sorting channel 4032 via the second connecting channel 4042. The beginning of the second branch 4032B of the second sorting channel 4032 communicates with the third container 401, the end of the second branch 4032B of the second sorting channel 4032 communicates with the second sub-collector 4062, and the second branch 4032B of the second sorting channel 4032 communicates with the third branch 4032C of the second sorting channel 4032 via the third connecting channel 4043. The beginning of the third branch 4032C of the second sorting channel 4032 communicates with the third connecting channel 4043, and the end of the third branch 4032C of the second sorting channel 4032 communicates with the third sub-collector 4063. The microfluidic chip 400 may further comprise a plurality of optical recognition devices and a plurality of driving electrode devices (not shown in the figure), so that the microfluidic chip 400 can realize cascaded sorting of target cells.

In the cell suspension, there may be only one type target cell, or there may be many different types of target cells. When there are multiple different types of target cells, these different types of target cells need to be sorted out and collected into different collectors for subsequent detection.

The process of sorting target droplets by using the microfluidic chip 400 is as follows: adding the first fluid into the third container 401, and adding the droplets prepared by using other devices (such as other microfluidic chips) into the fourth container 402. The droplets comprise target droplets and non-target droplets, wherein the target droplet comprises a single target cell. Suppose that a droplet may comprise four different types of cells, A, B, C, and D, where type A, B, and C cells are all target cells, and type D cell is non-target cell. Thus, the target droplet comprises: (a) a droplet comprising a single type A target cell, (b) a droplet comprising a single type B target cell, and (c) a droplet comprising a single type C target cell; the non-target droplet comprises: (d) a droplet comprising one or more type D non-target cells. The above droplets have been dyed in the early stage.

The droplets in the fourth container 402 flow into the first sorting channel 4031. At the connection position of the first sorting channel 4031 and the first connecting channel 4041, the first optical recognition device detects the optical signal (e.g., color) of the droplet in real-time. When the first optical recognition device detects that the droplet is in the above-mentioned situation (d), it will not notify the circuit system, and the circuit system will not apply a voltage to the first driving electrode device associated with the first optical recognition device. Therefore, the non-target droplet moves along the first sorting channel 4031 until it flows into the first collector 405. When the first optical recognition device detects that the droplet is in any of the above-mentioned situations (a)-(c), it immediately informs the circuit system to apply an appropriate voltage to the first driving electrode device, and the target droplet is polarized. Under the action of the electric field, the target droplet is deflected upward and flows into the first connecting channel 4041, and then flows into the first branch 4032A of the second sorting channel 4032 via the first connecting channel 4041. At the connecting position of the first branch 4032A and the second connecting channel 4042, the second optical recognition device performs real-time detection on the optical signal of the target droplet. When the second optical recognition device detects that the target droplet is in the above-mentioned situation (a), it will not notify the circuit system, and the circuit system will not apply a voltage to the second driving electrode device associated with the second optical recognition device. Therefore, the target droplet (a) continues to move along the first branch 4032A until it flows into the first sub-collector 4061, so that the target droplet containing a single type A target cell can be sorted from the droplets. When the second optical recognition device detects that the target droplet is in the above situation (b) or (c), it immediately informs the circuit system to apply an appropriate voltage to the second driving electrode device, and the target droplet (b) or (c) is polarized. Under the action of the electric field, the target droplet (b) or (c) is deflected upward and flows into the second connecting channel 4042, and then flows into the second branch 4032B via the second connecting channel 4042. At the connecting position of the second branch 4032B and the third connecting channel 4043, the third optical recognition device performs real-time detection on the optical signal of the target droplet (b) or (c). When the third optical recognition device detects that the target droplet is in the above-mentioned situation (b), it will not notify the circuit system, and the circuit system will not apply a voltage to the third driving electrode device associated with the third optical recognition device. Therefore, the target droplet (b) continues to move along the second branch 4032B until it flows into the second sub-collector 4062, so that the target droplet containing a single type B target cell can be sorted from the droplets. When the third optical recognition device detects that the target droplet is in the above-mentioned situation (c), it immediately informs the circuit system to apply an appropriate voltage to the third driving electrode device, and the target droplet (c) is polarized. Under the action of the electric field, the target droplet (c) is deflected upward and flows into the third connecting channel 4043, and then flows into the third branch 4032C via the third connecting channel 4043, and finally flows into the third sub-collector 4063, so that the target droplet containing a single type C target cell can be sorted from the droplets.

Using the microfluidic chip 400, three different types of target cells can be sorted out through a single sorting process, which greatly improves the speed and efficiency for sorting cells. Moreover, compared to using three different microfluidic chips to sort three different types of target cells, in the embodiment of the present disclosure, only one microfluidic chip 400 can be used to realize the sorting of three different types of target cells, which greatly saves the number of required microfluidic chips, thereby saving production costs.

When the microfluidic chip 400 is used to replace the sorting channel 305 and the collector 306 of the microfluidic chip 300, the fourth container 402 can be omitted. Alternatively, the beginning of the first sorting channel 4031 is connected to the end of the third sub-channel 3032-3 of the microfluidic chip 300, and other arrangements of the microfluidic chip 400 may remain unchanged. In this way, the droplets generated at the junction 304 flow into the first sorting channel 4031 along the third sub-channel 3032-3, and the droplets are then subjected to cascaded sorting as described above. With this design, using a microfluidic chip, not only a droplet containing a single cell can be prepared, but also such droplet can be cascaded-sorted to sort out many different types of target cells.

In actual operation, the oil-phase first fluid in the third container 401 can be pre-filled with the microfluidic chip 400, so that the droplets in the sorting channel 403 can flow more smoothly.

As shown in FIG. 9, one end of the first connecting channel 4041 is located between the beginning and the end of the first sorting channel 4031, and the other end of the first connecting channel 4041 is located between the beginning and the end of the first branch 4032A; one end of the second connecting channel 4042 is located between the beginning and the end of the first branch 4032A, the other end of the second connecting channel 4042 is located between the beginning and the end of the second branch 4032B, and the second connecting channel 4042 is closer to the collector in the second direction (i.e., the lateral direction in FIG. 9) than the first connecting channel 4041 (i.e., in the figure, the second connecting channel 4042 is offset to the right by a distance compared to the first connecting channel 4041). One end of the third connecting channel 4043 is located between the beginning and the end of the second branch 4032B, the other end of the third connecting channel 4043 communicates with the beginning of the third branch 4032C, and the third connecting channel 4043 is closer to the collector in the lateral direction than the second connecting channel 4042 (that is, in the figure, the third connecting channel 4043 is offset to the right by a distance compared to the second connecting channel 4042). In other words, in the second direction, the first connecting channel 4041 is located on the left side of the second connecting channel 4042, and the second connecting channel 4042 is located on the left side of the third connecting channel 4043. With this arrangement, the droplets can smoothly flow from the first sorting channel 4031 to the first branch 4032A, the second branch 4032B, and the third branch 4032C of the second sorting channel 4032 sequentially, thereby achieving cascaded sorting as described above. Further, the sorting channel 403 and the connecting channel 404 are configured so that the droplets flow from the first sorting channel 4031 through the connecting channel 404 into the first branch 4032A, the second branch 4032B, and the third branch 4032C of the second sorting channel 4032 in sequence, and the direction of flow of the droplets is irreversible. With such arrangement, the droplets flowing into the next branch are prevented from flowing back to the previous last branch, thereby avoiding the cross-liquid flow of different types of target cells.

It should be noted that although the second sorting channel 4032 of the microfluidic chip 400 shown in FIG. 9 comprises three branches 4032A, 4032B, and 4032C, this is only an example. The number of branches of the second sorting channel 4032 depends on the types of target cells to be sorted, which is not specifically limited in the embodiment of the present disclosure. For example, when N (N≥2) different types of target cells need to be sorted from the droplets, the microfluidic chip 400 may comprise N connecting channels, and the second sorting channel 4032 may comprise N cascaded branches, a connecting channel is provided between any two adjacent branches in the N cascaded branches, and the any two adjacent branches are communicated via the connecting channel. Correspondingly, the second collector 406 includes N sub-collectors, and the N cascaded branches of the second sorting channel 4032 are in one-to-one correspondence with the N sub-collectors, and one of the N cascaded branches communicates with a corresponding one of the N sub-collectors.

Figure 10:
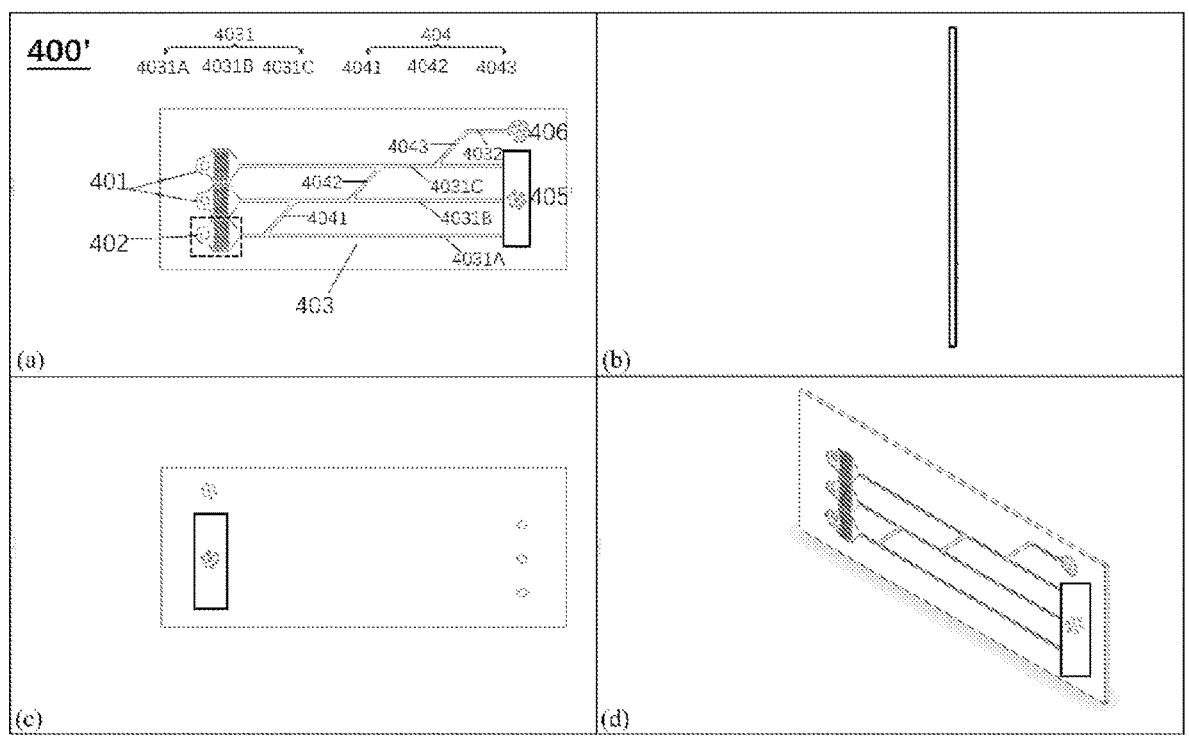
FIG. 10 shows a schematic structural diagram of a variant of the microfluidic chip of FIG. 9.

FIG. 10 shows a variant 400' of the microfluidic chip 400, wherein (a) is a front view of the microfluidic chip 400', (b) is a left view of the microfluidic chip 400', (c) is a rear view of the microfluidic chip 400', and (d) is a trimetric view of the microfluidic chip 400'. Compared with the microfluidic chip 400 shown in FIG. 9, the microfluidic chip 400' shown in FIG. 10 has a similar structure as the microfluidic chip 400 except for the sorting channel 403 and the collectors 405' and 406. The same reference numerals refer to the same components. Therefore, for the sake of brevity, the functions of these same components will not be described, reference may be made to the description of the microfluidic chip 400, and only different components will be described below.

The microfluidic chip 400' can be used to sort out a target droplet comprising a single target cell from the droplets. The microfluidic chip 400' can be used alone as an independent component to realize the sorting of target droplets, or can also be used to replace the sorting channel 305 and the collector 306 of the microfluidic chip 300, so as to realize the preparation of a droplet comprising a single cell and the sorting of target droplets.

As shown in FIG. 10, the microfluidic chip 400' comprises a sorting channel 403, a connecting channel 404, and collectors 405' and 406. The sorting channel 403 comprises a first sorting channel 4031 and a second sorting channel 4032, and the first sorting channel 4031 comprises a cascaded first branch 4031A, a second branch 4031B and a third branch 4031C. The connecting channel 404 comprises a first connecting channel 4041, a second connecting channel 4042 and a third connecting channel 4043. The collector comprises a first collector 405' and a second collector 406. Optionally, the microfluidic chip 400' may further comprise two third containers 401 and one fourth container 402, each third container 401 is configured to accommodate the first fluid of the oil phase, and the fourth container 402 is configured to accommodate a plurality of droplets comprising target droplets and non-target droplets, wherein each target droplet comprises a single target cell. As shown in FIG. 10, the beginning of the first branch 4031A of the first sorting channel 4031 communicates with the fourth container 402, and the end of the first branch 4031A of the first sorting channel 4031 communicates with the first collector 405', and the first branch 4031A and the second branch 4031B of the first sorting channel 4031 communicate via the first connecting channel 4041. The beginning of the second branch 4031B of the first sorting channel 4031 communicates with the third container 401, the end of the second branch 4031B of the first sorting channel 4031 communicates with the first collector 405', and the second branch 4031B and the third branch 4031C of the first sorting channel 4031 communicate via the second connecting channel 4042. The beginning of the third branch 4031C of the first sorting channel 4031 communicates with the third container 401, the end of the third branch 4031C of the first sorting channel 4031 communicates with the first collector 405', and the third branch 4031C of the first sorting channel 4031 communicates with the second sorting channel 4032 via the third connecting channel 4043. The beginning of the second sorting channel 4032 communicates with the third connecting channel 4043, and the end of the second sorting channel 4032 communicates with the second collector 406. The microfluidic chip 400' may further comprise a plurality of optical recognition devices and a plurality of driving electrode devices (not shown in the figure), so that the microfluidic chip 400' can realize cascaded sorting of target cells.

When one type of target cells is present in the cell suspension, there may be a situation where this type of target cells is so similar to non-target cells in the cell suspension that they are indistinguishable. Therefore, it is difficult to sort out the desired target cells from the cell suspension by only one sorting process, or the possibility of success of sorting out the desired target cells from the cell suspension by one sorting process is low. Therefore, unlike the microfluidic chip 400, the microfluidic chip 400' is not used to simultaneously sort out multiple different types of target cells, but is used to improve the purity of the sorted one type of target cells.

The process of sorting the target droplets by using the microfluidic chip 400' is as follows: adding the first fluid into the third container 401, and adding droplets prepared by other devices (for example, other microfluidic chips) into the fourth container 402. The droplets comprise target droplets and non-target droplets, wherein the target droplet comprises a single target cell. Suppose that the droplet comprises two different types of cells, E and F, where type E cells are target cells, type F cells are non-target cells, and the type E target cells are indistinguishable from the type F non-target cells. Thus, a target droplet comprises: (e) a droplet comprising a single type E target cell. A non-target droplet comprises: (f) a droplet comprising one or more type F non-target cells. The above droplets have been dyed in the early stage. The droplets in the fourth container 402 flow into the first branch 4031A of the first sorting channel 4031. At the connection position between the first branch 4031A and the first connecting channel 4041, the first optical recognition device detects the optical signal (e.g., color) of the droplet in real time. When the first optical recognition device detects that the droplet is in the above-mentioned situation (f), it will not notify the circuit system, and the circuit system will therefore not apply a voltage to the first driving electrode device associated with the first optical recognition device. Therefore, the non-target droplet continues to move along the first branch 4031A until it flows into the first collector 405'. When the first optical recognition device determines that the droplets are in the above-mentioned situation (e), it immediately informs the circuit system to apply an appropriate voltage to the first driving electrode device, and the above-mentioned droplets (actually they still comprise some non-target droplets) are polarized. Under the action of the electric field, the above-mentioned droplets are deflected upward and flow into the first connecting channel 4041, and then flow into the second branch 4031B through the first connecting channel 4041. At the connecting position of the second branch 4031B and the second connecting channel 4042, the second optical recognition device performs real-time detection on the optical signal of the droplets. When the second optical recognition device detects that the above-mentioned situation (f) still exists in the droplets, the circuit system will not be notified, and the circuit system will therefore not apply a voltage to the second driving electrode device associated with the second optical recognition device. Therefore, the sorted non-target droplets (f) continue to move along the second branch 4031B, and finally flow into the first collector 405'. When the second optical recognition device determines that the droplets are in the above-mentioned situation (e), it immediately informs the circuit system to apply an appropriate voltage to the second driving electrode device, and the droplets are polarized. Under the action of the electric field, the droplets deflect upward and flow into the second connecting channel 4042 and then flow into the third branch 4031C through the second connecting channel 4042. At the connecting position of the third branch 4031C and the third connecting channel 4043, the third optical recognition device performs real-time detection on the optical signal of the droplets (which actually still comprise a small amount of non-target droplets). When the third optical recognition device detects that the above-mentioned situation (f) still presents in the droplets, the circuit system will not be notified, and the circuit system will not apply a voltage to the third driving electrode device associated with the third optical recognition device. Therefore, the non-target droplets continue to move along the third branch 4031C, and then flow into the first collector 405'. When the third optical recognition device detects that the droplet is in the above-mentioned situation (e), it immediately informs the circuit system to apply an appropriate voltage to the third driving electrode device, and the target droplet (e) is polarized. Under the action of the electric field, the target droplet (e) is deflected upward and flows into the third connecting channel 4043, and then flows into the second sorting channel 4032 through the third connecting channel 4043, and finally flows into the second collector 406, the target droplet comprising a single type E target cell is sorted from the droplets.

Using the microfluidic chip 400', through multiple cascaded sorting of droplets, indistinguishable target droplets can be distinguished from the non-target droplets, which greatly improves the purity of the final collected target droplets. The possibility of non-target droplets being comprised in the collected target droplets is reduced or even excluded.

It should be noted that although the first sorting channel 4031 of the microfluidic chip 400' shown in FIG. 10 comprises three branches 4031A, 4031B and 4031C, this is only an example. The specific number of branches of the first sorting channel 4031 may be determined according to the difficulty of distinguishing target cells from non-target cells, which is not specifically limited in the embodiment of the present disclosure.

When the microfluidic chip 400' is used to replace the sorting channel 305 and the collector 306 of the microfluidic chip 300, the fourth container 402 may be omitted, and alternatively, the beginning of the first branch 4031A of the first sorting channel 4031 is connected to the end of the third sub-channel 3032-3 of the microfluidic chip 300, and other arrangements of the microfluidic chip 400' can remain unchanged. In this way, the droplets generated at the junction 304 flow along the third sub-channel 3032-3 into the first branch 4031A of the first sorting channel 4031, and then the droplets are subjected to cascaded sorting as described above. With such design, using a microfluidic chip, not only a droplet comprising a single cell can be prepared, but also a cascaded sorting can be performed on such droplets, so that indistinguishable target droplets can be distinguished from non-target droplets, which greatly improves the purity of the final collected target droplets.

Figure 11:
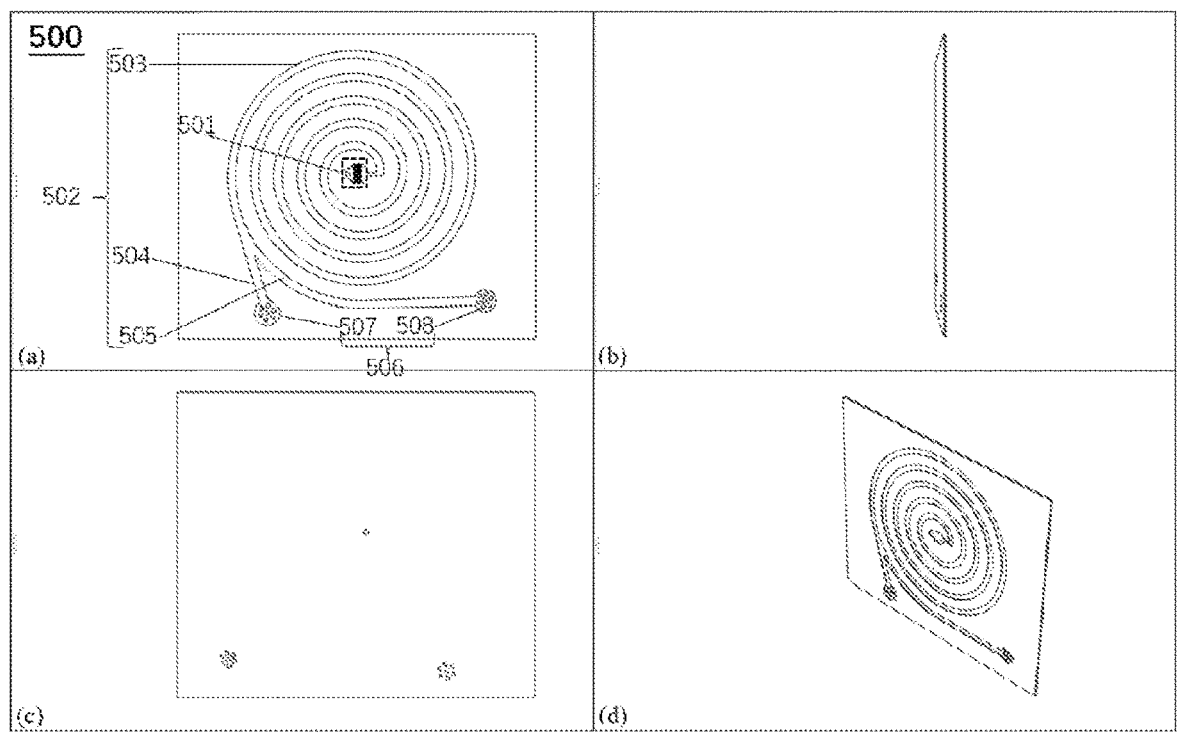
FIG. 11 shows a schematic structural diagram of a microfluidic chip according to yet another embodiment of the present disclosure.

FIG. 11 shows a schematic structural diagram of a microfluidic chip 500, wherein (a) is a front view of the microfluidic chip 500, (b) is a left view of the microfluidic chip 500, (c) is a rear view of the microfluidic chip 500, and (d) is a trimetric view of the microfluidic chip 500. The microfluidic chip 500 can be used to sort two types of droplets with different particle sizes from the droplets. The microfluidic chip 500 can be used alone as an independent component, or can be used to replace the sorting channel 305 and the collector 306 of the microfluidic chip 300, so that the preparation of a droplet comprising a single cell and the sorting of the target droplets can be realized.

As shown in FIG. 11, the microfluidic chip 500 comprises a sorting channel 502 and a collector 506, and the sorting channel 502 comprises a main channel 503, a first sorting channel 504, and a second sorting channel 505, the collector 506 comprises a first collector 507 and a second collector 508. The main channel 503 is helical in the plane where the microfluidic chip 500 is located. The end of the main channel 503 communicates with the first sorting channel 504 and the second sorting channel 505. The end of the first sorting channel 504 communicates with the first collector 507, and the end of the second sorting channel 505 communicates with the second collector 508. Optionally, the microfluidic chip 500 may further comprise a third container 501, the third container 501 is configured to accommodate droplets, the droplets comprise first type droplets and second type droplets with different particle sizes.

The cell suspension comprises cells with a smaller particle size and cells with a larger particle size, and when such a cell suspension is mixed with the first fluid and forms a plurality of droplets each comprising a single cell through the above-mentioned process, the droplets thus have different particle sizes. Here, droplets comprising cells with smaller particle size are referred to as the first type of droplets, and the first type of droplets have smaller particle size; droplets comprising cells with larger particle size are referred to as the second type of droplets, and the second type of droplets have a larger particle size. When the microfluidic chip 500 is used to sort the droplets, the droplets in the third container 501 flow into the helical main channel 503. Due to the difference in particle size of the droplets, the inertial force is different. At the end bifurcation of the main channel 503, the first type of droplets with smaller particle size are subject to less inertial force, so they follow along the extension direction of the main channel 503 into the first sorting channel 504 and then flow into the first collector 507. The second type of droplets with larger particle size are subjected to larger inertial force, and are thrown out of the main channel 503 under the action of the inertial force and enter the second sorting channel 505, and finally flow into the second collector 508.

FIG. 11 only shows one possible shape of the main channel 503 as an example, but the shape of the main channel 503 is not limited to this, as long as the shape of the main channel 503 can enable droplets with different particle sizes to enter different sorting channels under the action of different inertial forces.

The microfluidic chip 500 does not need to be provided with an optical recognition device and a driving electrode device, and only depends on the shape of the main channel 503 to distinguish droplets of different particle sizes. Since the optical recognition device and the driving electrode device are not required, not only the volume of the microfluidic chip 500 can be reduced, but also the production cost can be saved.

When the microfluidic chip 500 is used to replace the sorting channel 305 and the collector 306 of the microfluidic chip 300, the third container 501 can be omitted. Alternatively, the beginning of the main channel 503 is connected to the end of the third sub-channel 3032-3 of the microfluidic chip 300, and other arrangements of the microfluidic chip 500 may remain unchanged. In this way, the droplets generated at the junction 304 flow into the main channel 503 along the third sub-channel 3032-3, and then the sorting operation as described above is performed on the droplets. Through this design, a microfluidic chip can not only prepare a droplet comprising a single cell, but also distinguish droplets of different particle sizes.

The inventors of the present application found that, in conventional techniques, the first fluid and the second fluid (comprising cell suspension and biochemical reagents) described in the above embodiments need to be stored in external devices independent of the microfluidic chip, respectively. During the operation of the microfluidic chip, manual operation is required each time to connect the external device with the inlet of the microfluidic chip by using a flexible pipe, so as to inject the first fluid and the second fluid into the microfluidic chip in real time, and then through the corresponding processing of the microfluidic chip, the droplets are prepared and/or the target droplets are sorted from the droplets. Therefore, the preparation of droplets and/or the sorting of target droplets requires at least the presence of the external device for storing fluids, the flexible pipe, and the microfluidic chip. This makes the system bulky and not easy to carry. In addition, when the microfluidic chip is replaced to prepare different reagents, the external device needs to be cleaned to accommodate the new reagents adapted to the replaced microfluidic chip, but it is usually impossible to guarantee that the external device can be thoroughly cleaned, so the reagents remaining before are likely to remain in the external device, thereby causing contamination of the replaced new reagents.

In view of this, the embodiments of the present disclosure provide a box device adapted to a microfluidic chip, each microfluidic chip has a corresponding box device, and the box device can be combined with the microfluidic chip by using an appropriate bonding method. The box device can store reagents and release the reagents to the inlet of the microfluidic chip, and can receive and store the reagents flowing into the box device from the outlet of the microfluidic chip. Such a box device can provide a sterile environment as the cell suspension can be completely contained within the sealed box device before and after cell sorting.

Figure 12:
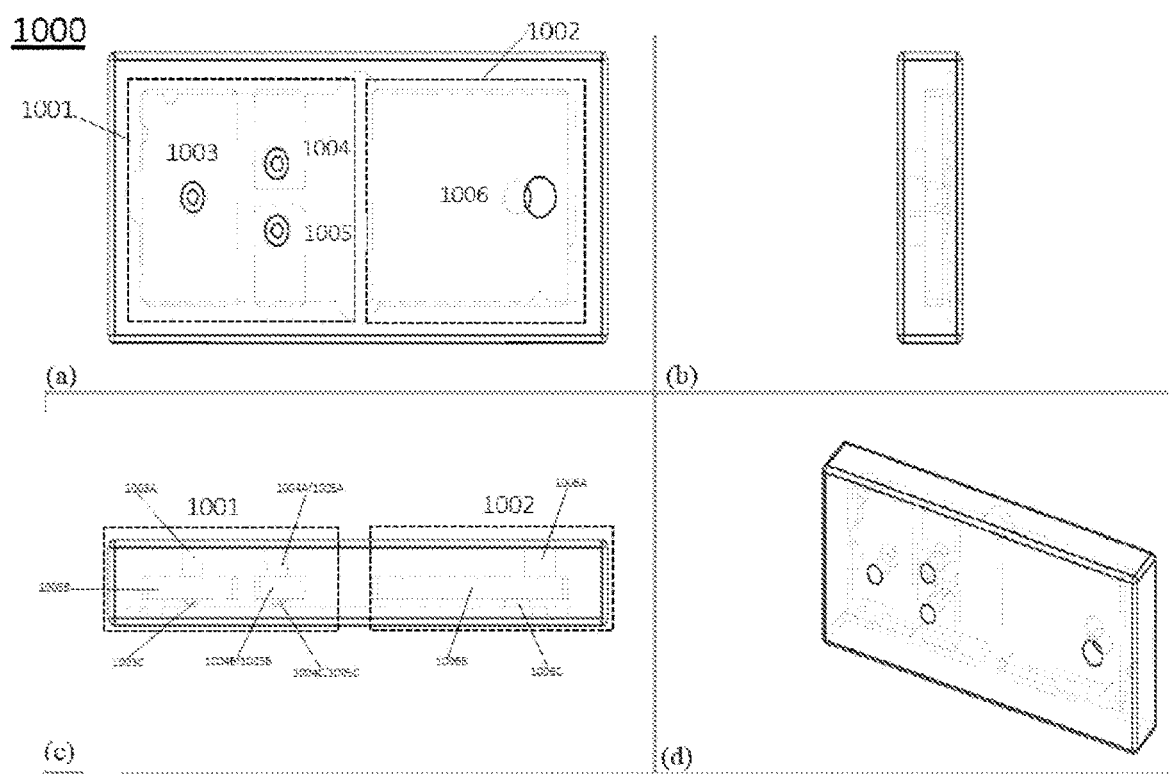
FIG. 12 shows a schematic structural diagram of a box device according to an embodiment of the present disclosure.

FIG. 12 shows a schematic structural diagram of a box device 1000 according to an embodiment of the present disclosure, wherein (a) is a front view of the box device 1000, (b) is a right view of the box device 1000, (c) is a top view of the box device 1000, and (d) is a trimetric view of the box device 1000. The box device 1000 is adapted to the microfluidic chip 100 described above, and the combination of the two can be used to prepare the droplet comprising a single cell.

Referring to FIG. 12 and FIG. 1A, the box device 1000 is configured to be used with the microfluidic chip 100, and the microfluidic chip 100 comprises inlets 1, 2, 3 and an outlet 4. The box device 1000 comprises: an accommodating cavity configured to accommodate the microfluidic chip 100; an inlet unit 1001 communicated with the inlets 1, 2, and 3 of the microfluidic chip 100, and the inlet unit 1001 being configured to store a first reagent and release the first reagent to the inlets 1, 2, and 3 of the microfluidic chip 100; and an outlet unit 1002 communicated with the outlet 4 of the microfluidic chip 100. The outlet unit 1002 is configured to receive and store the second reagent that is processed by the microfluidic chip 100 and flows into the outlet unit 1002 from the outlet 4 of the microfluidic chip 100. The second reagent comprises target droplets, each target droplet comprises a single target cell. The inlet unit 1001 comprises inlet holes 1003A/1004A/1005A and first storage cavities 1003B/1004B/1005B, each inlet hole is a through hole and communicates with the corresponding first storage cavity, and each inlet hole is recessed from the surface of the box device 1000 to the inside of the box device 1000, and the first storage cavity corresponding to the inlet hole is located on a side of the inlet hole away from the surface of the box device 1000.

By providing the box device 1000, each microfluidic chip 100 can be provided with a separate box device 1000, and the box device 1000 can store the injection reagent (i.e., the first reagent) required by the microfluidic chip 100 and the output reagent (i.e., the second reagent) processed by the microfluidic chip 100. Therefore, there is no need to provide an external storage device, which can greatly reduce the size of the device and make it easy to carry. In addition, since each microfluidic chip 100 is provided with a separate box device 1000, the box device 1000 stores the first reagent required by the microfluidic chip 100 and the second reagent produced by the microfluidic chip 100. Therefore, there is no risk of cross-contamination of the reagents in the external storage device due to the replacement of the microfluidic chip in the conventional technology. Further, the inlet unit 1001 comprises the inlet holes and the first storage cavities. Such a design can better guide the first reagent to flow from the inlet hole to the first storage cavity, and then flow into the inlet of the microfluidic chip 100 through the first storage cavity.

Continuing to refer to FIG. 12 and FIG. 1A, the inlet unit 1001 of the box device 1000 comprises a first inlet unit 1003, a second inlet unit 1004, and a third inlet unit 1005, and the inlet of the microfluidic chip 100 comprises a first inlet 1, a second inlet 2, and a third inlet 3, and the first reagent comprises a first sub-reagent (i.e., the first fluid), a second sub-reagent (i.e., the cell suspension), and a third sub-reagent (i.e., the biochemical reagent). The first inlet unit 1003 of the box device 1000 communicates with the first inlet 1 of the microfluidic chip 100, and the first inlet unit 1003 is configured to store the first sub-reagent and release the first sub-reagent to the first inlet 1 of the microfluidic chip 100. The second inlet unit 1004 of the box device 1000 communicates with the second inlet 2 of the microfluidic chip 100, and the second inlet unit 1004 is configured to store the second sub-reagent and release the second sub-reagent to the second inlet 2 of the microfluidic chip 100. The third inlet unit 1005 of the box device 1000 communicates with the third inlet 3 of the microfluidic chip 100, and the third inlet unit 1005 is configured to store the third sub-reagent and release the third sub-reagent to the third inlet 3 of the microfluidic chip 100. The outlet unit 1002 of the box device 1000 comprises an outlet unit 1006, and the second reagent received and stored by the outlet unit 1006 comprises target droplets and non-target droplets.

As shown in the figure, the first inlet unit 1003 comprises the inlet hole 1003A and the first storage cavity 1003B, the second inlet unit 1004 comprises the inlet hole 1004A and the first storage cavity 1004B, and the third inlet unit 1005 comprises the inlet hole 1005A and the first storage cavity 1005B. The first inlet unit 1003, the second inlet unit 1004, and the third inlet unit 1005 have the same structures, and the first inlet unit 1003 is taken as an example to describe the structure of each inlet unit below. Since the first inlet unit 1003, the second inlet unit 1004, and the third inlet unit 1005 have the same structure, the following description about the structure of the first inlet unit 1003 is also applicable to the second inlet unit 1004 and the third inlet unit 1005.

The first storage cavity 1003B of the first inlet unit 1003 is located inside the box device 1000, and the orthographic projection of the inlet hole 1003A on the box device 1000 falls within the orthographic projection of the first storage cavity 1003B on the box device 1000. For example, as shown in FIG. 12, the width of the inlet hole 1003A in the lateral direction is smaller than the width of the first storage cavity 1003B in the lateral direction. Through such an arrangement, the flow rate of the first sub-reagent in the inlet hole 1003A can be increased, and the first sub-reagent is promoted to flow from the inlet hole 1003A into the first storage cavity 1003B, and finally the first sub-reagent flows into the first inlet 1 of the microfluidic chip 100.

In some embodiments, the first inlet unit 1003 may further comprise a second storage cavity 1003C (similarly, the second inlet unit 1004 may further comprise a second storage cavity 1004C, and the third inlet unit 1005 may further comprise a second storage cavity 1005C), the second storage cavity 1003C is located on the side of the first storage cavity 1003B away from the inlet hole 1003A and communicates with the first storage cavity 1003B. The second storage cavity 1003C comprises a first opening communicated with the first storage cavity 1003B and a second opening opposite to the first opening. The orthographic projection of the second opening of the second storage cavity 1003C on the box device 1000 falls within the orthographic projection of the first opening on the box device 1000. In an example, as shown in FIG. 12, the second storage cavity 1003C has a bowl-like shape, that is, the second storage cavity 1003C has a shape that is wide at the top and narrow at the bottom. With such an arrangement, the second storage cavity 1003C can well collect the first sub-reagent flowing into it from the first storage cavity 1003B, and can guide the first sub-reagent to the first inlet 1 of the microfluidic chip 100. In some embodiments, the orthographic projection of the second opening of the second storage cavity 1003C on the box device 1000 falls within the orthographic projection of the inlet hole 1003A on the box device 1000.

Continuing to refer to FIG. 12, the outlet unit 1006 of the box device 1000 comprises the outlet hole 1006A and the third storage cavity 1006B. The outlet hole 1006A is a through hole and communicates with the third storage cavity 1006B, the outlet hole 1006A is recessed from the surface of the box device 1000 to the inside of the box device 1000, and the third storage cavity 1006B is located on a side of the outlet hole 1006A away from the surface of the box device 1000. In some embodiments, the third storage cavity 1006B is located inside the box device 1000, and the orthographic projection of the outlet hole 1006A on the box device 1000 falls within the orthographic projection of the third storage cavity 1006B on the box device 1000. For example, as shown in FIG. 12, the width of the outlet hole 1006A in the lateral direction is smaller than the width of the third storage cavity 1006B in the lateral direction. Through this arrangement, the third storage cavity 1006B mainly plays the role of storing the second reagent, and the outlet hole 1006A can better facilitate the transfer of the second reagent in the third storage cavity 1006B to the external device (if necessary).

In some embodiments, the outlet unit 1006 may further comprise a fourth storage cavity 1006C, which is located on a side of the third storage cavity 1006B away from the outlet hole 1006A and communicates with the third storage cavity 1006B. The fourth storage cavity 1006C can be used to connect the outlet 4 of the microfluidic chip 100 with the outlet unit 1006 of the box device 1000, and can guide the second reagent flowing out from the outlet 4 of the microfluidic chip 100 to the third storage cavity 1006B of the box device 1000. In some embodiments, the orthographic projection of the fourth storage cavity 1006C on the box device 1000 overlaps at most a part with the orthographic projection of the outlet hole 1006A on the box device 1000.

The general process of preparing a droplet containing a single cell using the box device 1000 and the microfluidic chip 100 can be described as follows:
(1) Pre-adding the first fluid, the cell suspension and the biochemical reagent to the first inlet unit 1003, the second inlet unit 1004 and the third inlet unit 1005 respectively. The first fluid is the oil phase, which may be mixed with surfactants.
(2) Connecting the inlet holes of the first inlet unit 1003, the second inlet unit 1004 and the third inlet unit 1005 of the box device 1000 to the flow pump through flexible pipes, and controlling the flow rate of fluid injected into the inlet units by adjusting the pressure of the flow pump.
(3) The first fluid in the first inlet unit 1003 flows into the first inlet 1 of the microfluidic chip 100 through the inlet hole 1003A, the first storage cavity 1003B and the second storage cavity 1003C; the cell suspension in the second inlet unit 1004 flows into the second inlet 2 of the microfluidic chip 100 through the inlet hole 1004A, the first storage cavity 1004B and the second storage cavity 1004C; the biochemical reagent in the third inlet unit 1005 flows into the third inlet 3 of the microfluidic chip 100 through the inlet hole 1005A, the first storage cavity 1005B and the second storage cavity 1005C. Note that the first fluid of the oil phase can be filled with the microfluidic chip 100 first, and then the cell suspension and biochemical reagents can be injected.
(4) The above-mentioned first fluid, cell suspension, and biochemical reagents meet at the junction 105 of the microfluidic chip 100 and generate droplets (i.e., the above-mentioned second reagent), and the droplets comprise target droplets and non-target droplets, where the target droplet includes a single target cell. The droplets flow into the first collector 104 through the delivery channel 103 of the microfluidic chip 100, and then flow into the outlet unit 1006 of the box device through the outlet 4 at the first collector 104. The outlet unit 1006 can store the droplets or can transfer the droplets to other equipment as needed.

Figure 13:
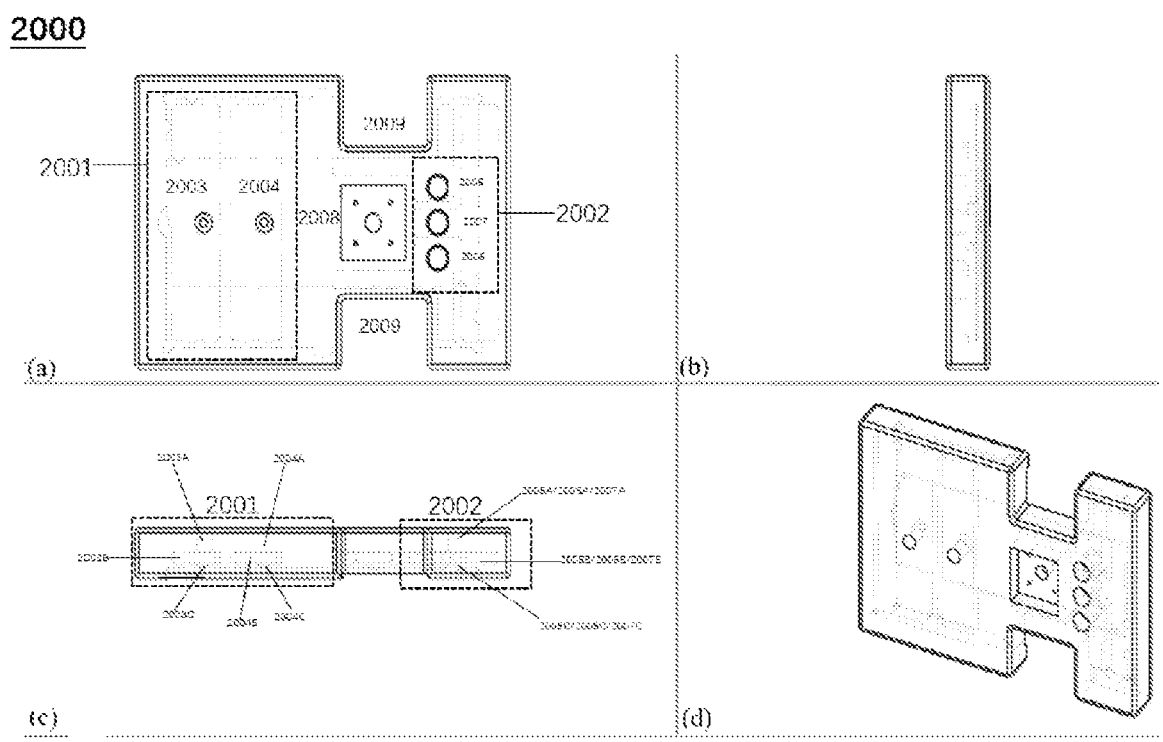
FIG. 13 shows a schematic structural diagram of a box device according to another embodiment of the present disclosure.

FIG. 13 shows a schematic structural diagram of a box device 2000 according to another embodiment of the present disclosure, wherein (a) is a front view of the box device 2000, (b) is a right view of the box device 2000, (c) is a top view of the box device 2000, and (d) is a trimetric view of the box device 2000. The box device 2000 is adapted to the microfluidic chip 200 described above, and the combination of the two can be used to sort droplets to obtain target droplets.

The box device 2000 comprises an inlet unit 2001 and an outlet unit 2002. The inlet unit 2001 communicates with the inlets of the microfluidic chip 200, and is configured to store a first reagent and release the first reagent to the inlets of the microfluidic chip 200, the first reagent is a plurality of droplets, at least a portion of the plurality of droplets comprises a single cell. The outlet unit 2002 communicates with the outlets of the microfluidic chip 200 and is configured to receive and store a second reagent which is processed by the microfluidic chip 200 and flows from the outlets of the microfluidic chip 200 into the outlet unit 2002, the second reagent comprises target droplets and non-target droplets, wherein the target droplet comprises a single target cell. The inlet unit 2001 comprises a first inlet unit 2003 and a second inlet unit 2004, and the outlet unit 2002 comprises a first outlet unit 2005, a second outlet unit 2006, and a third outlet unit 2007 located between the first outlet unit 2005 and the second outlet unit 2006. The inlets of the microfluidic chip 200 comprise a first inlet 5 and a second inlet 6. The first inlet unit 2003 communicates with the first inlet 5 of the microfluidic chip 200, and the first inlet unit 2003 is configured to store a first sub-reagent (i.e., the first fluid) and release the first sub-reagent to the first inlet 5 of the microfluidic chip 200. The second inlet unit 2004 communicates with the second inlet 6 of the microfluidic chip 200, and the second inlet unit 2004 is configured to store a second sub-reagent (that is, a droplet comprising a single cell) and release the second sub-reagent to the second inlet 6 of the microfluidic chip 200. The third outlet unit 2007 of the outlet unit 2002 is configured to receive and store non-target droplets, and the first outlet unit 2005 and the second outlet unit 2006 of the outlet unit 2002 are configured to receive and store target droplets.

The first inlet unit 2003 of the box device 2000 comprises an inlet hole 2003A, a first storage cavity 2003B, and a second storage cavity 2003C; the second inlet unit 2004 comprises an inlet hole 2004A, a first storage cavity 2004B, and a second storage cavity 2004C. The structures of the first inlet unit 2003 and the second inlet unit 2004 of the box device 2000 are exactly the same as that of the first inlet unit 1003 of the box device 1000. Therefore, the first inlet unit 2003 and the second inlet unit 2004 have the same technical effects as the first inlet unit 1003 of the box device 1000. For the sake of brevity, their structures and technical effects are not repeated here. The first outlet unit 2005 of the box device 2000 comprises an outlet hole 2005A, a third storage cavity 2005B and a fourth storage cavity 2005C, and the second outlet unit 2006 of the box device 2000 comprises an outlet hole 2006A, a third storage cavity 2006B and a fourth storage cavity 2006C, the third outlet unit 2007 of the box device 2000 comprises an outlet hole 2007A, a third storage cavity 2007B and a fourth storage cavity 2007C. The first outlet unit 2005, the second outlet unit 2006 and the third outlet unit 2007 have exactly the same structures. Except for the relative positions of the fourth storage cavity and the outlet hole, the structures of the first outlet unit 2005, the second outlet unit 2006 and the third outlet unit 2007 of the box device 2000 are the same as the structure of the outlet unit 1006 of the box device 1000, so the structure and technical effect of each outlet unit of the box device 2000 can refer to the structure and technical effect of the outlet unit 1006 of the box device 1000. In the box device 2000, taking the first outlet unit 2005 as an example, the orthographic projection of the fourth storage cavity 2005C on the box device 2000 falls within the orthographic projection of the outlet hole 2005A on the box device 2000.

The box device 2000 further comprises a first installation area 2008 and a second installation area 2009, the first installation area 2008 is configured to install the optical recognition device, and the second installation area 2009 is configured to install the driving electrode device. The optical recognition device and the driving electrode device are used to cooperate with the microfluidic chip 200 to realize the sorting of target droplets.

The general process of sorting target droplets using the box device 2000 and the microfluidic chip 200 can be described as follows:
(1) Pre-adding the first fluid and droplets each comprising a single cell to the first inlet unit 2003 and the second inlet unit 2004 respectively, and the droplets can be prepared by the above-mentioned box device 1000 and the microfluidic chip 100. The first fluid is the oil phase, which may be mixed with surfactants.
(2) Connecting the inlet hole 2003A of the first inlet unit 2003 and the inlet hole 2004A of the second inlet unit 2004 of the box device 2000 to the corresponding flow pumps through flexible pipes, and controlling the flow rate of fluid injected into the inlet unit by adjusting the pressure of the flow pumps.

(3) The first fluid in the first inlet unit 2003 flows into the first inlet 5 of the microfluidic chip 200 through the inlet hole 2003A, the first storage cavity 2003B and the second storage cavity 2003C. The droplets in the second inlet unit 2004 flow into the second inlet 6 of the microfluidic chip 200 through the inlet hole 2004A, the first storage cavity 2004B and the second storage cavity 2004C. Note that the microfluidic chip 200 can be filled with the first fluid of the oil phase first, and then the droplets are injected.

(4) The above-mentioned droplets are sorted at the sorting channel 203 of the microfluidic chip 200 and enter the corresponding sub-collectors, and the target droplets (each comprises a single target cell) are collected into the first sub-collector 2041 and the second sub-collector 2042, non-target droplets are collected into the third sub-collector 2043. The target droplets in the first sub-collector 2041 flow into the first outlet unit 2005 of the box device 2000 through the outlet 7A, the target droplets in the second sub-collector 2042 flow into the second outlet unit 2006 of the box device 2000 through the outlet 7B, and the non-target droplets in the third sub-collector 2043 flow into the third outlet unit 2007 of the box device 2000 through the outlet 7C. The first outlet unit 2005, the second outlet unit 2006, and the third outlet unit 2007 may store corresponding droplets or may transfer these droplets to other devices as required.

The box device 2000 is adapted to the microfluidic chip 200 to jointly realize the sorting of target droplets. Such a box device 2000 provides an environment for aseptic operation since the droplets are completely confined within the sealed box device 2000 and microfluidic chip 200 before and after sorting. Moreover, the existence of the box device 2000 makes the system composed of the box device 2000 and the microfluidic chip 200 more concise and convenient, and easy to carry.

Figure 14:
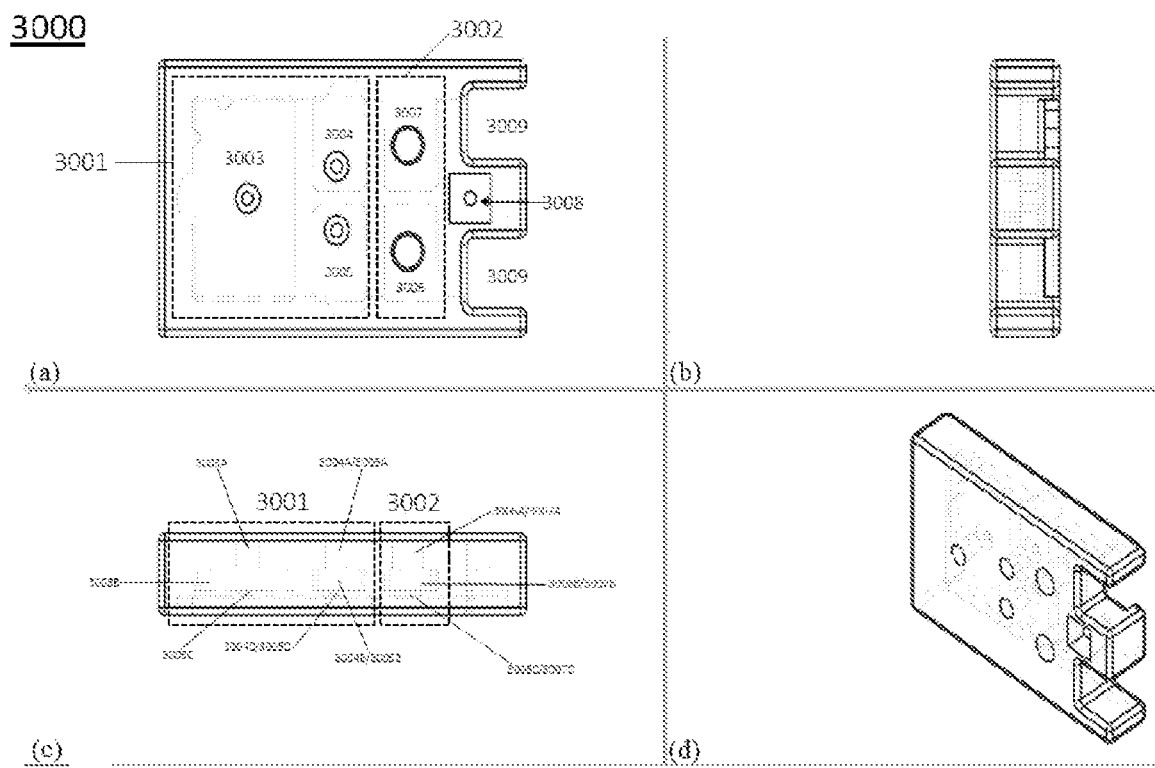
FIG. 14 shows a schematic structural diagram of a box device according to still another embodiment of the present disclosure.

FIG. 14 shows a schematic structural diagram of a box device 3000 according to yet another embodiment of the present disclosure, wherein (a) is a front view of the box device 3000, (b) is a right view of the box device 3000, (c) is a top view of the box device 3000, and (d) is a trimetric view of the box device 3000. The box device 3000 is adapted to the microfluidic chip 300 described above, and the combination of the two can be used to prepare droplets including a single cell and sort the droplets to obtain target droplets. For the preparation and sorting process of droplets, reference may be made to the description of the microfluidic chip 300.

The box device 3000 comprises an inlet unit 3001 and an outlet unit 3002. The inlet unit 3001 communicates with the inlets of the microfluidic chip 300 and is configured to store a first reagent and release the first reagent to the inlets of the microfluidic chip 300. The outlet unit 3002 communicates with the outlets of the microfluidic chip 300 and is configured to receive and store a second reagent which is processed by the microfluidic chip 300 and flows into the outlet unit 3002 from the outlets of the microfluidic chip 300, the second reagent comprises target droplets and non-target droplets, wherein the target droplet comprises a single target cell. The inlet unit 3001 comprises a first inlet unit 3003, a second inlet unit 3004 and a third inlet unit 3005. The outlet unit 3002 comprises a first outlet unit 3006 and a second outlet unit 3007. The inlets of the microfluidic chip 300 comprise a first inlet located at the first container 301, a second inlet located at the first sub-container 3021, and a third inlet located at the second sub-container 3022. The first inlet unit 3003 communicates with the first inlet of the microfluidic chip 300, and the first inlet unit 3003 is configured to store a first sub-reagent (i.e., the first fluid) and release the first sub-reagent to the first inlet of the microfluidic chip 300; the second inlet unit 3004 communicates with the second inlet of the microfluidic chip 300, and the second inlet unit 3004 is configured to store a second sub-reagent (i.e., the cell suspension) and release the second sub-reagent to the second inlet of the microfluidic chip 300; the third inlet unit 3005 communicates with the third inlet of the microfluidic chip 300, and the third inlet unit 3005 is configured to store a third sub-reagent (i.e., biochemical reagents) and release the third sub-reagent to the third inlet of the microfluidic chip 300. The first outlet unit 3006 of the outlet unit 3002 is configured to receive and store non-target droplets, and the second outlet unit 3007 of the outlet unit 3002 is configured to receive and store target droplets.

The first inlet unit 3003 of the box device 3000 comprises an inlet hole 3003A, a first storage cavity 3003B, and a second storage cavity 3003C; the second inlet unit 3004 comprises an inlet hole 3004A, a first storage cavity 3004B, and a second storage cavity 3004C; the third inlet unit 3005 comprises an inlet hole 3005A, a first storage cavity 3005B, and a second storage cavity 3005C. The structures of the first inlet unit 3003, the second inlet unit 3004 and the third inlet unit 3005 of the box device 3000 are exactly the same as that of the first inlet unit 1003 of the box device 1000. Therefore, the first inlet unit 3003, the second inlet unit 3004 and the third inlet unit 3005 of the box device 3000 have the same technical effects as the first inlet unit 1003 of the box device 1000. For the sake of brevity, their structures and technical effects are not repeated here. The first outlet unit 3006 of the box device 3000 comprises an outlet hole 3006A, a third storage cavity 3006B and a fourth storage cavity 3006C, and the second outlet unit 3007 of the box device 3000 comprises an outlet hole 3007A, a third storage cavity 3007B and a fourth storage cavity 3007C. Both the first outlet unit 3006 and the second outlet unit 3007 have exactly the same structures. Except for the relative position of the fourth storage cavity and the outlet, the structures of the first outlet unit 3006 and the second outlet unit 3007 of the box device 3000 are basically the same as that of the outlet unit 1006 of the box device 1000. Therefore, the structure and technical effect of each outlet unit of the box device 3000 may refer to the structure and technical effect of the outlet unit 1006 of the box device 1000. In the box device 3000, taking the first outlet unit 3006 as an example, the orthographic projection of the fourth storage cavity 3006C on the box device 3000 falls within the orthographic projection of the outlet hole 3006A on the box device 3000.

The box device 3000 further comprises a first installation area 3008 and a second installation area 3009, the first installation area 3008 is configured to install the optical recognition device, and the second installation area 3009 is configured to install the driving electrode device. The optical recognition device and the driving electrode device are used to cooperate with the microfluidic chip 300 to realize the sorting of target droplets. The first outlet unit 3006 and the second outlet unit 3007 are located between the inlet unit 3001 and the first installation area 3008 and the second installation area 3009. Similar to the microfluidic chip 300, through such an arrangement, the size of the box device 3000 can be reduced, the box device 3000 can be more miniaturized, and the cost can be saved.

The general process of preparing droplets and sorting the target droplets by using the box device 3000 and the microfluidic chip 300 can be described as follows:

(1) Pre-adding the first fluid, the cell suspension and the biochemical reagent to the first inlet unit 3003, the second inlet unit 3004 and the third inlet unit 3005 respectively. The first fluid is the oil phase, which may be mixed with surfactants.

(2) Connecting the inlet hole 3003A of the first inlet unit 3003, the inlet hole 3004A of the second inlet unit 3004, and the inlet hole 3005A of the third inlet unit 3005 of the box device 3000 to the corresponding flow pumps via the flexible pipes, and controlling the flow rate of the fluid injected into the inlet unit by adjusting the pressure of the flow pump.

(3) The first fluid in the first inlet unit 3003 flows into the first inlet of the microfluidic chip 300 through the inlet hole 3003A, the first storage cavity 3003B and the second storage cavity 3003C; the cell suspension in the second inlet unit 3004 flows into the second inlet of the microfluidic chip 300 through the inlet hole 3004A, the first storage cavity 3004B and the second storage cavity 3004C; the biochemical reagent in the third inlet unit 3005 flows into the third inlet of the microfluidic chip 300 through the inlet hole 3005A, the first storage cavity 3005B and the second storage cavity 3005C. Note that the microfluidic chip 300 can be filled with the first fluid of the oil phase first, and then the cell suspension and biochemical reagent can be injected.

(4) The first fluid, the cell suspension, and the biochemical reagent meet at the junction 304 of the microfluidic chip 300 to generate a droplet comprising a single cell, and then the droplets are sorted at the sorting channel 305 and enter the corresponding sub-collector. Non-target droplets are collected into the first sub-collector 3051, and target droplets (each comprises a single target cell) are collected into the second sub-collector 3052. The non-target droplets in the first sub-collector 3051 flow into the first outlet unit 3006 of the box device 3000 through the outlet, and the target droplets in the second sub-collector 3052 flow into the second outlet 3007 of the box device 3000 through the outlet. The first outlet unit 3006 and the second outlet unit 3007 can store corresponding droplets or can transfer these droplets to other devices as needed.

The box device 3000 is adapted to the microfluidic chip 300 to jointly realize the preparation of the droplet comprising a single cell and the sorting of target droplets. Such a box device 3000 provides an environment for aseptic operation since the droplets are completely confined within the sealed box device 3000 and microfluidic chip 300 before and after sorting. In addition, the existence of the box device 3000 makes the system composed of the box device 3000 and the microfluidic chip 300 more concise and convenient, and easy to carry.

Figure 15:
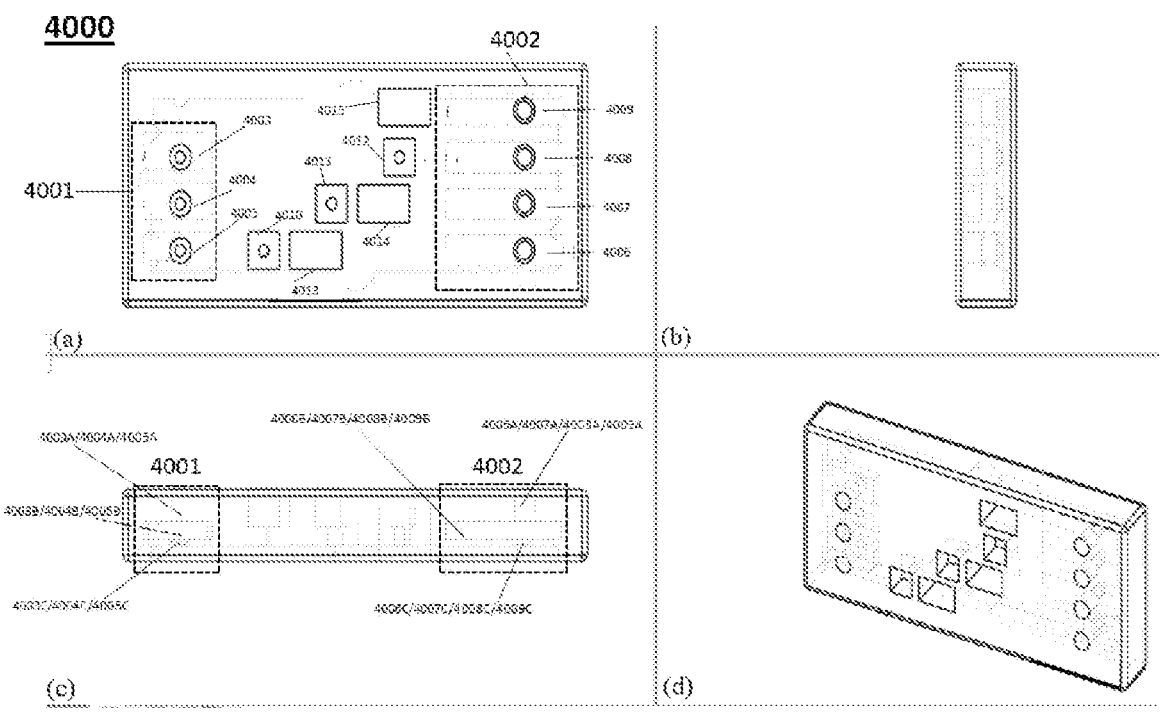
FIG. 15 shows a schematic structural diagram of a box device according to yet another embodiment of the present disclosure.

FIG. 15 shows a schematic structural diagram of a box device 4000 according to still another embodiment of the present disclosure, wherein (a) is a front view of the box device 4000, (b) is a right view of the box device 4000, (c) is a top view of the box device 4000, and (d) is a trimetric view of the box device 4000. The box device 4000 is adapted to the microfluidic chip 400 described above, and the combination of the two can be used for cascaded sorting of target droplets to obtain target droplets comprising different types of target cells. For the cascaded sorting process of droplets, reference may be made to the description about the microfluidic chip 400.

The box device 4000 comprises an inlet unit 4001 and an outlet unit 4002. The inlet unit 4001 communicates with the inlets of the microfluidic chip 400 and is configured to store a first reagent and release the first reagent to the inlets of the microfluidic chip 400. The outlet unit 4002 communicates with the outlets of the microfluidic chip 400 and is configured to receive and store a second reagent which is processed by the microfluidic chip 400 and flows into the outlet unit 4002 from the outlets of the microfluidic chip 400, the second reagent comprises target droplets and non-target droplets, wherein the target droplets comprise: a target droplet comprising a single type A target cell, a target droplet comprising a single type B target cell, and a target droplet comprising a single type C target cell; the non-target droplet is a droplet comprising a type D non-target cell. The inlet unit 4001 comprises a first inlet unit 4003, a second inlet unit 4004 and a third inlet unit 4005, and the outlet unit 4002 comprises a first outlet unit 4006 and second outlet units 4007, 4008 and 4009. The inlets of the microfluidic chip 400 comprise a first inlet and a second inlet located at the two third containers 401 and a third inlet located at the fourth container 402. The first inlet unit 4003 communicates with the first inlet of the microfluidic chip 400, and the first inlet unit 4003 is configured to store a first sub-reagent (i.e., the first fluid) and release the first sub-reagent to the first inlet of the microfluidic chip 400; the second inlet unit 4004 communicates with the second inlet of the microfluidic chip 400, and the second inlet unit 4004 is configured to store the first sub-reagent (i.e., the first fluid) and release the first sub-reagent to the second inlet of the microfluidic chip 400; the third inlet unit 4005 communicates with the third inlet of the microfluidic chip 400, and the third inlet unit 4005 is configured to store a second sub-reagent (i.e., a droplet comprising a single cell) and release the second sub-reagent to the third inlet of the microfluidic chip 400. The first outlet unit 4006 of the outlet unit 4002 is configured to receive and store non-target droplets, and the second outlet units 4007-4009 of the outlet unit 4002 are respectively configured to receive and store the target droplet comprising a single type A cell, the target droplet comprising a single type B cell, and the target droplet comprising a single type C cell.

The first inlet unit 4003 of the box device 4000 comprises an inlet hole 4003A, a first storage cavity 4003B, and a second storage cavity 4003C; the second inlet unit 4004 comprises an inlet hole 4004A, a first storage cavity 4004B, and a second storage cavity 4004C; the third inlet unit 4005 comprises an inlet hole 4005A, a first storage cavity 4005B, and a second storage cavity 4005C. The structures of the first inlet unit 4003, the second inlet unit 4004 and the third inlet unit 4005 of the box device 4000 are exactly the same as that of the first inlet unit 1003 of the box device 1000. The first inlet unit 4003, the second inlet unit 4004 and the third inlet unit 4005 of the box device 4000 have the same technical effect as the first inlet unit 1003 of the box device 1000. For the sake of brevity, their structures and technical effects are not repeated here. The first outlet unit 4006 of the box device 4000 comprises an outlet hole 4006A, a third storage cavity 4006B and a fourth storage cavity 4006C; the second outlet unit 4007 of the box device 4000 comprises an outlet hole 4007A, a third storage cavity 4007B and a fourth storage cavity 4007C; the second outlet unit 4008 of the box device 4000 comprises an outlet hole 4008A, a third storage cavity 4008B and a fourth storage cavity 4008C; the second outlet unit 4009 of the box device 4000 comprises an outlet hole 4009A, a third storage cavity 4009B, and a fourth storage cavity 4009C. The first outlet unit 4006 and the second outlet units 4007-4009 have exactly the same structures. Except for the relative positions of the fourth storage cavity and the outlet hole, the structures of the first outlet unit 4006 and the second outlet units 4007-4009 of the box device 4000 are basically the same as the structure of the outlet unit 1006 of the box device 1000. Therefore, the structure and technical effect of each outlet unit of the box device 4000 may refer to the structure and technical effect of the outlet unit 1006 of the box device 1000. In the box device 4000, taking the first outlet unit 4006 as an example, the orthographic projection of the fourth storage cavity 4006C on the box device 4000 falls within the orthographic projection of the outlet hole 4006A on the box device 4000.

The box device 4000 further comprises a first installation area and a second installation area located between the inlet unit 4001 and the outlet unit 4002. The first installation area is configured to mount a plurality of optical recognition devices, and the second installation area is configured to mount a plurality of driving electrode devices. The optical recognition devices and the driving electrode devices are used to cooperate with the microfluidic chip 400 to realize cascaded sorting of target droplets. Specifically, the first installation area comprises a first sub-installation unit 4010, a second sub-installation unit 4011, and a third sub-installation unit 4012, and the second installation area comprises a fourth sub-installation unit 4013, a fifth sub-installation unit 4014, a sixth sub-installation unit 4015. The first sub-installation unit 4010 is associated with the fourth sub-installation unit 4013, the second sub-installation 4011 is associated with the fifth sub-installation unit 4014, and the third sub-installation unit 4012 is associated with the sixth sub-installation unit 4015.

The general process of cascaded sorting of target droplets by using the box device 4000 and the microfluidic chip 400 can be described as follows:

(1) Pre-adding the first fluid to the first inlet unit 4003 and the second inlet unit 4004 respectively and pre-adding the droplet comprising a single cell to the third inlet unit 4005. The droplets can be prepared by the above-mentioned box device 1000 and the microfluidic chip 100. The first fluid is the oil phase, which may be mixed with surfactants.

(2) Connecting the inlet hole 4003A of the first inlet unit 4003, the inlet hole 4004A of the second inlet unit 4004, and the inlet hole 4005A of the third inlet unit 4005 of the box device 4000 to the corresponding flow pumps through flexible pipes, respectively. The flow rate of fluid injected into the inlet unit is controlled by adjusting the pressure of the flow pump.

(3) The first fluid in the first inlet unit 4003 flows into the first inlet of the microfluidic chip 400 through the inlet hole 4003A, the first storage cavity 4003B and the second storage cavity 4003C; the first fluid in the second inlet unit 4004 flows into the second inlet of the microfluidic chip 400 through the inlet hole 4004A, the first storage cavity 4004B and the second storage cavity 4004C; the droplets in the third inlet unit 4005 flow into the third inlet of the microfluidic chip 400 through the inlet hole 4005A, the first storage cavity 4005B and the second storage cavity 4005C. Note that the microfluidic chip 400 can be filled with the first fluid of the oil phase first, and then the droplets are injected.

(4) The above-mentioned droplets are sorted at the sorting channel 403 of the microfluidic chip 400 and enter the corresponding sub-collector, the non-target droplets comprising type D non-target cells are collected into the first collector 405, the target droplet comprising a single type A target cell is collected into the first sub-collector 4061, the target droplet comprising a single type B target cell is collected into the second sub-collector 4062, and the target droplet comprising a single type C target cell is collected into the third sub-collector 4063. The non-target droplets in the first collector 405 flow into the first outlet unit 4006 of the box device 4000 through the outlet, the target droplets in the first sub-collector 4061 flow into the second outlet unit 4007 of the box device 4000 through the outlet, the target droplets in the second sub-collector 4062 flow into the second outlet unit 4008 of the box device 4000 through the outlet, and the target droplets in the third sub-collector 4063 flow into the second outlet unit 4009 of the box device 4000 through the outlet. The first outlet unit 4006 and the second outlet units 4007-4009 can store the corresponding droplets or can transfer these droplets to other devices as needed.

The box device 4000 is adapted to the microfluidic chip 400 to jointly realize cascaded sorting of target droplets. Using the box device 4000 and the microfluidic chip 400, three different types of target cells can be sorted out through a single sorting process, which greatly improves the speed and efficiency of sorting cells. Moreover, compared to using three different microfluidic chips to sort three different types of target cells, the embodiment of the present disclosure can realize the sorting of three different types of target cells by using only one box device 4000 and microfluidic chip 400, which greatly saves the number of microfluidic chips and box devices required, thereby saving production costs.

The box device 4000 can be slightly modified to obtain a box device 4000', which can be adapted to the microfluidic chip 400' described above. Compared with the box device 4000, the variant box device 4000' only needs to change the number of outlet units, and other components do not need to be changed. In the box device 4000, the number of the first outlet unit 4006 is one, and the number of the second outlet unit is three. In the box device 4000', the number of the first outlet unit 4006 is one, and the number of the second outlet unit is one.

The first three steps for the cascaded sorting of target droplets using the box device 4000' and the microfluidic chip 400' are the same as the above-mentioned first three steps (1)-(3) for the cascaded sorting of target droplets using the box device 4000 and the microfluidic chip 400. For the sake of brevity, the description is not repeated here. Next, the description will be started from the fourth step.

(4) The droplets are sorted at the sorting channel 403 of the microfluidic chip 400' and enter the corresponding sub-collector, the non-target droplets comprising type F non-target cells are collected into the first collector 405' via the first sorting channels 4031A, 4031B, 4031C, and the target droplets comprising a single type E target cell are collected into the second collector 406. The non-target droplets in the first collector 405' flow into the first outlet unit of the box device 4000' through the outlet, and the target droplets in the second collector 406 flow into the second outlet of the box device 4000' through the outlet. The first outlet unit and the second outlet unit can store the corresponding droplets or can transfer these droplets to other equipment as needed.

The box device 4000' is adapted to the microfluidic chip 400' to jointly realize the cascaded sorting of target droplets. Using the box device 4000' and the microfluidic chip 400', through multiple cascaded sorting of droplets, indistinguishable target droplets can be distinguished from non-target droplets, which greatly improves the purity of the collected target droplets, and reduces or even eliminates the possibility that the collected target droplets comprise non-target droplets.

FIG. 16 shows a schematic structural diagram of a box device 5000 according to yet another embodiment of the present disclosure, wherein (a) is a front view of the box device 5000, (b) is a right view of the box device 5000, (c) is a top view of the box device 5000, and (d) is a trimetric view of the box device 5000. The box device 5000 is adapted to the microfluidic chip 500 described above, and the combination of the two can be used to sort droplets with different particle sizes. For the specific process of sorting droplets, reference may be made to the description about the microfluidic chip 500.

The box device 5000 comprises an inlet unit 5001 and an outlet unit 5002. The inlet unit 5001 communicates with the inlet of the microfluidic chip 500, and is configured to store a first reagent and release the first reagent to the inlet of the microfluidic chip 500. The first reagent is a plurality of droplets, at least a portion of the plurality of droplets comprises a single cell. The outlet unit 5002 communicates with the outlet of the microfluidic chip 500 and is configured to receive and store a second reagent which is processed by the microfluidic chip 500 and flows into the outlet unit 5002 from the outlet of the microfluidic chip 500, the second reagent comprises two types of droplets with different particle sizes. The inlet unit 5001 comprises an inlet unit 5003, and the outlet unit 5002 comprises a first outlet unit 5004 and a second outlet unit 5005. The inlet unit 5003 communicates with the inlet of the microfluidic chip 500, and the inlet unit 5003 is configured to store droplets and release the droplets to the inlet of the microfluidic chip 500. The first outlet unit 5004 of the outlet unit 5002 is configured to receive and store droplets with smaller particle size, and the second outlet unit 5005 of the outlet unit 5002 is configured to receive and store droplets with larger particle size.

The inlet unit 5003 of the box device 5000 comprises an inlet hole 5003A, a first storage cavity 5003B, and a second storage cavity 5003C. The structure of the inlet unit 5003 of the box device 5000 is exactly the same as that of the first inlet unit 1003 of the box device 1000. Therefore, the inlet unit 5003 of the box device 5000 has the same technical effect as the first inlet unit 1003 of the box device 1000. For the sake of brevity, its structure and technical effects are not repeated here. The first outlet unit 5004 of the box device 5000 comprises an outlet hole 5004A, a third storage cavity 5004B and a fourth storage cavity 5004C; the second outlet unit 5005 of the box device 5000 comprises an outlet hole 5005A, a third storage cavity 5005B and a fourth storage cavity 5005C. The first outlet unit 5004 and the second outlet unit 5005 have exactly the same structures. Except for the relative positions of the fourth storage cavity and the outlet hole, the structures of the first outlet unit 5004 and the second output unit 5005 of the box device 5000 are basically the same as the structure of the outlet unit 1006 of the box device 1000. Therefore, the structure and technical effect of each outlet unit of the box device 5000 may refer to the structure and technical effect of the outlet unit 1006 of the box device 1000. In the box device 5000, taking the first outlet unit 5004 as an example, the orthographic projection of the fourth storage cavity 5004C on the box device 5000 falls within the orthographic projection of the outlet hole 5004A on the box device 5000.

The general process of sorting target droplets by using the box device 5000 and the microfluidic chip 500 can be described as follows:
(1) Pre-adding a droplet comprising a single cell to the inlet unit 5003. The droplets can be prepared by the above-mentioned box device 1000 and the microfluidic chip 100. The first fluid is the oil phase, which may be mixed with surfactants.
(2) Connecting the inlet hole 5003A of the inlet unit 5003 of the box device 5000 to the flow pump through a flexible pipe, and controlling the flow rate of the fluid injected into the inlet unit by adjusting the pressure of the flow pump.
(3) The droplets in the inlet unit 5003 flow into the inlet of the microfluidic chip 500 through the inlet hole 5003A, the first storage cavity 5003B and the second storage cavity 5003C.
(4) The above-mentioned droplets flow in the main channel 503 of the microfluidic chip 500 and are sorted under the action of inertial force and then enter the corresponding collector. At the end bifurcation of the main channel 503, the first type of droplets with smaller particle size are subjected to less inertial force, so they enter the first sorting channel 504 along the extending direction of the main channel 503, and then flow into the first collector 507. The second type of droplets with larger particle size are subjected to larger inertial force, and are thrown out of the main channel 503 under the inertial force to enter the second sorting channel 505, and finally flow into the second collector 508. The first type of droplets in the first collector 507 flow into the first outlet unit 5004 of the box device 5000 through the outlet, and the second type of droplets in the second collector 508 flow into the second outlet unit 5005 of the box device 5000 through the outlet. The first outlet unit 5004 and the second outlet unit 5005 can store the corresponding droplets or can transfer the droplets to other devices as needed.

The box device 5000 is adapted to the microfluidic chip 500, and can sort droplets of different particle sizes. The box device 5000 does not need to leave an area for installing the optical recognition device and an area for installing the driving electrode device. The microfluidic chip 500 also does not need to be provided with an optical recognition device and a driving electrode device, but only depends on the shape of the main channel 503 to distinguish droplets of different particle sizes. Since the optical recognition device and the driving electrode device are not required, not only the size of the box device 5000 and the microfluidic chip 500 can be reduced, but also the production cost can be saved.

According to yet another aspect of the present disclosure, a microfluidic device is provided. FIG. 17 shows a block diagram of the microfluidic device. The microfluidic device comprises the chip as described in any of the preceding embodiments. Since the microfluidic device can have basically the same technical effect as the microfluidic chip described in the previous embodiment, for the sake of brevity, the description of the technical effect of the microfluidic device will not be repeated here.

Figure 18:
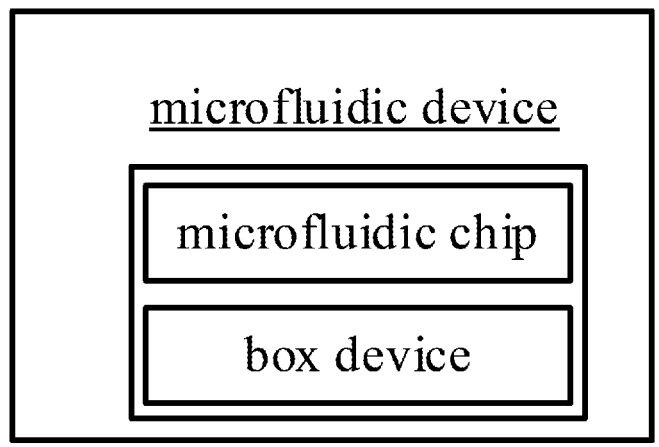
FIG. 18 shows a block diagram of another microfluidic device according to an embodiment of the present disclosure.

According to yet another aspect of the present disclosure, a microfluidic device is provided. FIG. 18 shows a block diagram of the microfluidic device. The microfluidic device comprises the microfluidic chip described in any of the preceding embodiments and the box device described in any of the preceding embodiments, the microfluidic chip being assembled with the corresponding box device. Since the microfluidic device can have basically the same technical effect as the microfluidic chip and box device described in the previous embodiments, for the sake of brevity, the description of the technical effects of the microfluidic device will not be described here.

Figure 19:
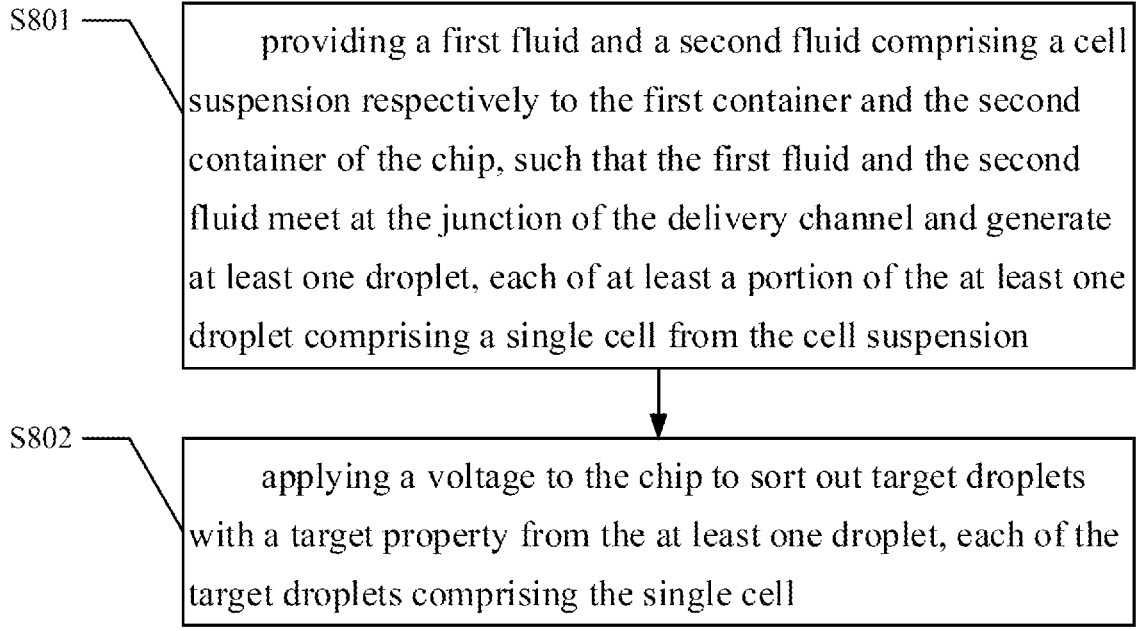
FIG. 19 shows a flowchart of a method for sorting target droplets according to an embodiment of the present disclosure.

According to yet another aspect of the present disclosure, a method for sorting target droplets is provided, and FIG. 19 shows a flow chart of the method 800. The method 800 will be described below by taking the third chip 300A in FIG. 7 as an example. The method 800 comprises the following steps:

step S801: providing a first fluid 107 and a second fluid 108 comprising a cell suspension 109-1 respectively to the first container 101 and the second container 102 of the third chip 300A described in any of the previous embodiments, such that the first fluid 107 and the second fluid 108 meet at the junction 105 of the delivery channel 103 and generate at least one droplet 110, each of at least a portion of the at least one droplet 110 comprising a single cell from the cell suspension 109-1; and step S802: applying a voltage to the third chip 300A described in any of the previous embodiments to sort out target droplets with a target property from the at least one droplet 110, each of the target droplets comprising the single cell.

In some embodiments, step S802 includes the following sub-steps: detecting an optical signal of the plurality of droplets 110 in real time with an optical device, in response to the optical device detecting a droplet 110 with a target optical signal, applying an instantaneous voltage of 800-1000V to the electrode structure of the third chip 300A described in any of the previous embodiments to sort out the target droplets with the target optical signal from the plurality of droplets 110, each of the target droplets comprising the single cell.

In some embodiments, before step S802, the method further includes transferring the plurality of first droplets 110 to other reaction vessels to perform polymerase chain reaction or fluorescent staining treatment.

In some embodiments, the first fluid 107 is oil phase, for example, any suitable oil such as mineral oil, perfluorinated oil, and the second fluid 108 is aqueous phase, and the droplet 110 has a water-in-oil structure.

Next, taking the first chip 100 and the second chip 200 as examples, the method of sorting target droplets will be described in more detail with a specific example.

Step S901: connecting the input pipes of the micro flow pump to the inlet 1 of the first container 101 of the first chip 100, the inlet 2 of the first sub-container 1021 of the second container 102 of the first chip 100 and the inlet 3 of the second sub-container 1022 of the second container 102 of the first chip 100, respectively, so as to inject the first fluid 107, the cell suspension 109-1 and the biochemical reaction reagent 109-2 into the first container 101, the first sub-container 1021 and the second sub-container 1022, respectively. The first fluid 107 is an oil phase, which may be mixed with a surfactant.

Step S902: adjusting the sampling speed of the first container 101 and the second container 102 to the first delivery channel 103 to control the oil-water flow rate and droplet generation effect. Generally, the flow rate of the first fluid 107 is higher than that of the cell suspension 109-1 and the biochemical reaction reagent 109-2.

Step S903: controlling the first container 101 so that the first fluid 107 first fills most areas of the first chip 100, and then controlling the first sub-container 1021 and the second sub-container 1022 so that the cell suspension 109-1 and the biochemical reaction reagent 109-2 flow into the first delivery channel 103. Controlling the first container 101 so that the first fluid 107 first fills most areas of the first chip 100 means controlling the first container 101 so that the first fluid 107 first fills the first flow channel 1031, the second portion 1032B and the third portion 1032C of the second flow channel 1032, of the first delivery channel 103 of the first chip 100, and optionally the first collector 104. Because the amount of cell suspension 109-1 is usually very small and precious, it is possible to fill a part of the first chip 100 with the first fluid 107 to achieve a better encapsulation effect.

Step S904: The first fluid 107 in the first container 101 flows through the gap between the microstructures of the filter structure 112 in the first container 101 to realize filtration, and then flows into the first flow channel 1031, so as to prevent the flow channel from being blocked by oversized impurities. The cell suspension 109-1 in the first sub-container 1021 flows through the gap between the microstructures of the filter structure 112 in the first sub-container 1021 to realize filtration, and then flows into the second flow channel 1032, so that on the one hand, it can prevent the flow channel from being blocked by oversized impurities, and on the other hand, a plurality of cells which are adhered to each other in the cell suspension 109-1 can be divided into a plurality of separate single cells. The biochemical reaction reagent 109-2 in the second sub-container 1022 flows through the gap between the microstructures of the filter structure 112 in the second sub-container 1022 to realize filtration, and then flows into the second flow channel 1032, so that it is possible to prevent the flow channel from being blocked by oversized impurities.

Step S905: The first fluid 107, the cell suspension 109-1 and the biochemical reaction reagent 109-2 meet at the junction 105 of the first delivery channel 103 and generate a plurality of first droplets 110, which move along the third portion 1032C of the second flow channel 1032 and tend to be stable as the diameter of the third portion 1032C of the second flow channel 1032 gradually widens. Eventually, the first droplet 110 flows into the first collector 104 along the third portion 1032C of the second flow channel 1032.

Step S906: collecting the first droplets 110 at the outlet 4 of the first collector 104 for a period of time (for example, 30 seconds, 1 minute, 2 minutes, etc.) and discarding them as waste liquid. This is because, in the initial operation stage of the first chip 100, the initial state of each component in the first chip 100 may be unstable (for example, the pressure is unstable), which may affect the encapsulation effect of the first chip 100 and is not conducive to the formation of the first droplets 110 with good quality. Therefore, the first droplets 110 generated in the initial stage are generally not used. When the parameters indicated by the first chip 100 reach a steady state, the first droplets 110 can be collected for subsequent operation.

Step S907: taking out the first droplets 110 collected by the first collector 104 and transferring it to other reaction containers, such as 96-well cell culture plate, PCR instrument, etc., so as to carry out required biochemical reactions (such as PCR amplification, incubation reaction, fluorescent staining of droplets, etc.).

Step S908: connecting the input pipes of the micro-flow pump to the inlet 5 of the third container 201 of the second chip 200 and the inlet 6 of the fourth container 202 of the second chip 200, respectively, so as to inject the third fluid 205 and the first droplets 110 prepared by the first chip 100 into the third container 201 and the fourth container 202, respectively. The third fluid 205 may be the same oil phase as the first fluid 107, and may be mixed with a surfactant.

Step S909: adjusting the sampling speed of the third container 201 and the fourth container 202 to the second delivery channel 208 to control the flow speed of droplets. Generally, the flow rate of the third fluid 205 is greater than that of the first droplet 110.

Step S910: similar to step S903, controlling the third container 201 so that the third fluid 205 first fills most areas of the second chip 200, and then controlling the fourth container 202 so that the first droplets 110 flow into the second delivery channel 208.

Step S911: the third fluid 205 in the third container 201 flows through the gap between the microstructures of the filter structure 112 in the third container 201 to realize filtration, and then flows into the third flow channel 2081 of the second delivery channel 208, so as to prevent the flow channel from being blocked by oversized impurities. The first droplets 110 in the fourth container 202 flow through the gap between the microstructures of the filter structure 112 in the fourth container 202 to realize filtration, and then flow into the fourth flow channel 2082 of the second delivery channel 208, so as to prevent the flow channel from being blocked by oversized impurities.

Step S912: the third fluid 205 and the first droplets 110 meet at the junction of the second delivery channel 208 and generate a plurality of second droplets 206. The second droplet 206 can be roughly divided into the following two categories: (a) the second droplet 206 comprises a single target cell with a target color; (b) the second droplet 206 comprises non-target cells or no cells.

Step S913: the second droplet 206 moves along the second delivery channel 208 towards the second collector 204, and the optical device detects the optical signal (e.g., color) of the second droplet 206 in the second delivery channel 208 in real time. When the optical device detects that the second droplet 206 is in the above-mentioned situation (b), the circuit system will not be triggered to apply a voltage to the electrode structure. The second droplets 206 flows straight into the third branch 2033 of the sorting channel 203 along the second delivery channel 208, and then flows into the third sub-collector 2043 of the second collector 204. When the optical device detects that the second droplet 206 is in the above-mentioned situation (a), the circuit system is immediately triggered to apply a voltage (for example, 800-1000 V) to the electrode structure at the sorting channel 203, and the second droplet 206 comprising a single target cell is polarized. Under the action of the electric field, the second droplet 206 comprising a single target cell deflects upward and flows into the first branch 2031 of the sorting channel 203 or deflects downward and flows into the second branch 2032 of the sorting channel 203, and then flows into the first sub-collector 2041 or the second sub-collector 2042 of the second collector 204, respectively. In this way, it is possible to sort the target droplets from the second droplets 206.

The method for sorting target droplets is realized based on the structure of the first chip 100 and the second chip 200 described in the previous embodiments, therefore, this method can have basically the same technical effect as the first chip 100 and the second chip 200 described in the previous embodiments. For the sake of brevity, the technical effects of the method for sorting target droplets will not be described repeatedly here.

In the description of the present disclosure, the orientation or positional relationship indicated by the terms "up", "down", "left" and "right" is based on the orientation or positional relationship shown in the drawings, which is only for the convenience of describing the present disclosure and does not require that the present disclosure must be constructed and operated in a specific orientation, so it cannot be understood as a limitation on the present disclosure.

In the description of this specification, the description with reference to the terms "an embodiment" and "another embodiment" means that the specific features, structures, materials or characteristics described in connection with this embodiment are included in at least one embodiment of the present disclosure. In this specification, the schematic expressions of the above terms do not necessarily refer to the same embodiments or examples. Furthermore, the specific features, structures, materials or characteristics described may be combined in a suitable manner in any one or more embodiments or examples. In addition, those skilled in the art can combine different embodiments or examples described in this specification and the features of different embodiments or examples without contradicting each other. In addition, it should be noted that in this specification, the terms "first" and "second" are only used for descriptive purposes, and cannot be understood as indicating or implying relative importance or implicitly indicating the number of indicated technical features.

As those skilled in the art will understand, although the steps of the method in the present disclosure are described in a specific order in the drawings, this does not require or imply that the steps must be performed in that specific order unless the context clearly indicates otherwise. Additionally or alternatively, multiple steps can be combined into one step and/or a step can be decomposed into multiple steps. In addition, other method steps can be inserted between the steps. The inserted step may represent an improvement of the method that described herein, or may be independent of the method. In addition, a given step may not be completely completed before the next step starts.

The above is only the specific embodiment of this disclosure, but the scope of protection of this disclosure is not limited to this. Any person familiar with the technical field can easily think of changes or substitutions within the technical scope disclosed in this disclosure, which should be covered by the protection scope of this disclosure. Therefore, the scope of protection of the present disclosure should be subject to the scope of protection of the claims.

The invention claimed is:

1. A chip comprising:
 a first container configured to accommodate a first fluid;
 a second container configured to accommodate a second fluid comprising a cell suspension;
 a delivery channel comprising a first flow channel and a second flow channel, the first flow channel communicating with the first container and the second flow channel communicating with the second container, the first flow channel and the second flow channel intersecting and communicating with each other at a junction, and the delivery channel configured such that the first fluid and the second fluid meet at the junction and generate at least one droplet, each of at least a portion of the at least one droplet comprising a single cell from the cell suspension; and
 at least one collector configured to collect the at least one droplet,
 wherein a portion of the first flow channel comprises the junction and is divided into a first section and a second section by the junction, in each of the first section and the second section, an area of a first cross-section of each section gradually increases along a first direction away from the junction, the first cross-section is perpendicular to the first direction, and wherein the second flow channel comprises the junction and is divided into a third section and a fourth section by the junction, in each of the third section and the fourth section, an area of a second cross-section of each section gradually increases along a second direction away from the junction, the second cross-section is perpendicular to the second direction.

2. The chip of claim 1, wherein the portion of the first flow channel comprises a first sub-portion, a second sub-portion comprising the junction, and a third sub-portion, the first sub-portion belongs to the first section, the third sub-portion belongs to the second section, the second sub-portion spans the first section and the second section and is between the first sub-portion and the third sub-portion, and the areas of the first cross-section of the first sub-portion and the third sub-portion are both larger than the area of the first cross-section of the second sub-portion.

3. The chip of claim 2, wherein a size of the first cross-section of the second sub-portion of the first flow channel at the junction is configured to allow the first fluid with a specific particle size to flow in the second sub-portion, the specific particle size of the first fluid is larger than a particle size of the single cell.

4. The chip of claim 2,
wherein the second flow channel comprises a first portion, a second portion and a third portion, the first portion and the second portion belong to the third section, and the third portion belongs to the fourth section,
wherein a first end of the first portion of the second flow channel is configured to communicate with the second container, a second end of the first portion of the second flow channel is configured to communicate with a first end of the second portion of the second flow channel, a second end of the second portion of the second flow channel is configured to communicate with a first end of the third portion of the second flow channel, both the second end of the second portion of the second flow channel and the first end of the third portion of the second flow channel are at the junction, and a second end of the third portion of the second flow channel is configured to communicate with the at least one collector, and
wherein the areas of the second cross-section of the first portion and the third portion of the second flow channel are both larger than the area of the second cross-section of the second portion of the second flow channel.

5. The chip of claim 4, wherein a size of the second cross-section of the second portion of the second flow channel is configured to allow the second fluid with a specific particle size to flow in the second portion of the second flow channel, the specific particle size of the second fluid is greater than 1 time of a particle size of the single cell and less than 2 times of the particle size of the single cell.

6. The chip of claim 4, wherein the area of the second cross-section of the third portion of the second flow channel gradually increases in a direction from the first end to the second end of the third portion of the second flow channel.

7. The chip of claim 4, wherein the area of the first cross-section of the second sub-portion of the first flow channel at the junction is greater than or equal to the areas of the second cross-section of the second portion and the third portion of the second flow channel at the junction.

8. The chip of claim 1, wherein the second container comprises at least one sub-container.

9. The chip of claim 8,
wherein the second fluid comprises a first reagent and a second reagent, the first reagent comprises the cell suspension; and
wherein the second container comprises a first sub-container and a second sub-container separated from each other, the first sub-container is configured to accommodate the first reagent, and the second sub-container is configured to accommodate the second reagent.

10. The chip of claim 9,
wherein a first portion of the second flow channel comprises a first branch and a second branch, the first branch is configured to communicate with the first sub-container, the second branch is configured to communicate with the second sub-container, and the first branch and the second branch intersect and are configured to communicate with each other at a first point, and
wherein an angle between the first branch and the second branch at the first point is an acute angle.

11. The chip of claim 1, wherein the at least one collector comprises a first collector configured to collect the at least one droplet via the delivery channel.

12. The chip of claim 1, wherein the at least one collector comprises a second collector, the second collector comprises at least two sub-collectors configured to collect the at least one droplet via the delivery channel.

13. The chip of claim 1,
wherein the at least one collector comprises a first collector and a second collector, the second collector comprises at least two sub-collectors, and
wherein the first collector is configured to communicate with the second collector, and the first collector is between the junction and the second collector.

14. The chip of claim 12, further comprising an electrode structure between the junction and the second collector.

15. The chip of claim 12,
wherein the delivery channel further comprises a sorting channel between the junction and the second collector,
wherein the sorting channel comprises at least two branches, one of the at least two branches is configured to sort out non-target droplets from the at least one droplet, and remaining branches of the at least two branches are configured to sort out target droplets from the at least one droplet, and
wherein the at least two sub-collectors of the second collector correspond to the at least two branches of the sorting channel one by one, one of the at least two sub-collectors is configured to communicate with one of the at least two branches of the sorting channel and is configured to collect the non-target droplets, and remaining sub-collectors of the at least two sub-collectors respectively are configured to communicate with the remaining branches of the at least two branches of the sorting channel and are configured to collect the target droplets.

16. The chip of claim 15,
wherein the at least two branches of the sorting channel comprise a first branch and a second branch configured to sort out the target droplets from the at least one droplet, and a third branch configured to sort out the non-target droplets from the at least one droplet, and
wherein the first branch, the second branch and the third branch intersect at a second point and the third branch is between the first branch and the second branch, both a first angle between the first branch and the third branch at the second point and a second angle between the second branch and the third branch at the second point are greater than 10°.

17. The chip of claim 16,
wherein a space between the first branch and the third branch of the sorting channel defines a first right triangle, and a space between the second branch and the third branch of the sorting channel defines a second right triangle, the first angle faces a first right-angled side of the first right triangle, and the second angle faces a second right-angled side of the second right triangle, and
wherein a length of the first right-angled side of the first right triangle and a length of the second right-angled side of the second right triangle are both greater than or equal to a particle size of a single droplet.

18. The chip of claim 1, wherein a surface of an inner wall of the delivery channel has hydrophobicity.

19. The chip of claim 1, wherein contours of both the first container and the second container comprise four chamfers.

20. The chip of claim 19, wherein a shape of each chamfer comprises an arc shape.

21. The chip of claim 1, wherein both the first container and the second container are provided with a filter structure, the filter structure comprises a plurality of microstructures, a gap between two adjacent microstructures of the plurality of microstructures is greater than 1 time of a particle size of the single cell and less than 2 times of the particle size of the single cell.

22. The chip of claim 1, wherein the chip is a microfluidic chip.

23. A microfluidic device comprising the chip of claim 1.

24. A method for sorting target droplets, comprising:
providing a first fluid and a second fluid comprising a cell suspension respectively to the first container and the second container of the chip of claim 1, such that the first fluid and the second fluid meet at the junction of the delivery channel and generate at least one droplet, each of at least a portion of the at least one droplet comprising a single cell from the cell suspension; and
applying a voltage to the chip to sort out target droplets with a target property from the at least one droplet, each of the target droplets comprising the single cell.

25. The method of claim 24,
wherein the chip further comprises an electrode structure between the junction and the at least one collector, and
wherein the step of applying a voltage to the chip of claim 1 to sort out target droplets with a target property from the at least one droplet comprises: detecting an optical signal of the at least one droplet in real time with an optical device, in response to the optical device detecting a droplet with a target optical signal, applying an instantaneous voltage of 800-1000V to the electrode structure to sort out the target droplets with the target optical signal from the at least one droplet, each of the target droplets comprising the single cell.

26. The method of claim 24, before the applying the voltage to the chip, further comprising:
transferring the at least one droplet in the chip to another reaction vessel for polymerase chain reaction or fluorescent staining.

27. The method of claim 24, wherein the first fluid is an oil phase, the second fluid is an aqueous phase, and the droplet has a water-in-oil structure.

* * * * *